United States Patent
Zhu et al.

(10) Patent No.: US 12,520,222 B2
(45) Date of Patent: Jan. 6, 2026

(54) COMMUNICATION METHOD AND RELATED DEVICE

(71) Applicant: HUAWEI TECHNOLOGIES CO., LTD., Guangdong (CN)

(72) Inventors: Yuanping Zhu, Shanghai (CN); Yulong Shi, Beijing (CN); Zhenzhen Cao, Boulogne Billancourt (FR); Jing Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 259 days.

(21) Appl. No.: 18/352,692

(22) Filed: Jul. 14, 2023

(65) Prior Publication Data

US 2023/0362779 A1    Nov. 9, 2023

Related U.S. Application Data

(63) Continuation of application No. PCT/CN2022/070998, filed on Jan. 10, 2022.

(30) Foreign Application Priority Data

Jan. 15, 2021   (CN) .......................... 202110057037.8
Apr. 1, 2021    (CN) .......................... 202110356248.1

(51) Int. Cl.
    *H04W 40/06*   (2009.01)
    *H04W 40/22*   (2009.01)
    *H04W 40/24*   (2009.01)

(52) U.S. Cl.
    CPC ........... *H04W 40/06* (2013.01); *H04W 40/22* (2013.01); *H04W 40/246* (2013.01)

(58) Field of Classification Search
    CPC .............. H04W 40/06; H04W 40/22; H04W 40/246; H04W 40/02; H04L 45/74

(Continued)

(56) References Cited

U.S. PATENT DOCUMENTS 9,860,881 B2 *   1/2018   Gaal ...................... H04W 72/51
11,533,749 B2 * 12/2022   Luo ....................... H04W 40/22

(Continued)

FOREIGN PATENT DOCUMENTS

CN   111865802 A * 10/2020 ............. H04L 61/00
CN   111901817 A   11/2020

(Continued)

OTHER PUBLICATIONS

Samsung (moderator), "Summary of offline discussion on topology redundancy," 3GPP TSG-RAN WG3 #110-e, R3-207101, Online, Nov. 2-12, 2020, 29 pages.

Qualcomm Incorporated, "IAB enhancements for inter-donor topological redundancy," 3GPP TSG-RAN WG3 Meeting #110-e, R3-206258, E-meeting, Nov. 2-12, 2020, 5 pages.

(Continued)

*Primary Examiner* — Mahendra R Patel
(74) *Attorney, Agent, or Firm* — Fish & Richardson P.C.

(57) ABSTRACT

Embodiments of this application relates to a communication method and a related device. In an example, a device receives a first data packet in a first network segment, the first data packet comprises a first backhaul adaptation protocol (BAP) routing identity, and the first BAP routing identity is used for transmission of the first data packet in the first network segment. The device further obtains a first correspondence. In response to determining that the first correspondence comprises the first BAP routing identity in the first data packet, the device determines that the first data packet meets a preset condition. In response to that the first data packet meets the preset condition, the device replaces the first BAP routing identity in the first data packet with a second BAP routing identity according to the first correspondence, to obtain a second data packet.

18 Claims, 17 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,864,085 | B2* | 1/2024 | Tesanovic | H04W 28/0284 |
| 2010/0272006 | A1* | 10/2010 | Bertrand | H04B 7/2606 |
| | | | | 370/315 |
| 2012/0224525 | A1* | 9/2012 | Wang | H04W 80/02 |
| | | | | 370/328 |
| 2022/0078663 | A1* | 3/2022 | Luo | H04L 47/283 |
| 2022/0263797 | A1* | 8/2022 | Liu | H04W 36/0009 |
| 2022/0393966 | A1* | 12/2022 | Eriksson | H04L 45/24 |
| 2023/0128486 | A1* | 4/2023 | Akl | H04W 40/22 |
| | | | | 370/329 |
| 2023/0171669 | A1* | 6/2023 | Hampel | H04W 40/22 |
| | | | | 370/329 |
| 2023/0379792 | A1* | 11/2023 | Muhammad | H04W 40/22 |
| 2023/0403067 | A1* | 12/2023 | Visa | H04L 45/24 |
| 2024/0146480 | A1* | 5/2024 | Ghanbarinejad | H04L 5/0051 |
| 2024/0224156 | A1* | 7/2024 | Hwang | H04W 76/19 |

FOREIGN PATENT DOCUMENTS

| | | | | |
|---|---|---|---|---|
| EP | 4266755 | A1 * | 10/2023 | ............ H04W 40/02 |
| WO | 2020191768 | A1 | 10/2020 | |
| WO | WO-2021211047 | A1 * | 10/2021 | ........ H04W 28/0231 |
| WO | WO-2022152079 | A1 * | 7/2022 | ............ H04W 40/02 |

OTHER PUBLICATIONS

Futurewei, "Solutions for Inter-Donor Routing and Bearer Mapping," 3GPP TSG-RAN WG2 Meeting #115 electronic, R2-2108482, Online, Aug. 16-27, 2021, 7 pages.

Ericsson, "Boundary IAB node behaviour for partial and full inter-donor migration," 3GPP TSG-RAN WG2 #115-e, R2-2108422, Electronic meeting, Aug. 16-27, 2021, 8 pages.

International Search Report and Written Opinion in International Appln. No. PCT/CN2022/070998, mailed on Mar. 29, 2022, 19 pages (with English translation).

3GPP TS 38.340 V16.3.0, "3rd Generation Partnership Project; Technical Specification Group Radio Access Network; NR; Backhaul Adaptation Protocol (BAP) specification(Release 16)," Dec. 2020, 22 pages.

Extended European Search Report in European Appln No. 22738960.8, dated Apr. 9, 2024, 14 pages.

* cited by examiner

COMMUNICATION METHOD AND RELATED DEVICE

CROSS-REFERENCE TO RELATED APPLICATION

This application is a continuation of International Application No. PCT/CN2022/070998, filed on Jan. 10, 2022, which claims priority to Chinese Patent Application No. 202110057037.8, filed on Jan. 15, 2021, and Chinese Patent Application No. 202110356248.1, filed on Apr. 1, 2021. All of the aforementioned patent applications are hereby incorporated by reference in their entireties.

TECHNICAL FIELD

This application relates to the communication field, and in particular, to a communication method and a related device.

BACKGROUND

A 3rd generation partnership project (3rd generation partnership project, 3GPP) R15 integrated access and backhaul (integrated access and backhaul, IAB) network architecture includes a donor node (IAB donor) and an IAB node. In the case of a central unit (central unit, CU)-distributed unit (distributed unit, DU) architecture, the IAB donor includes an IAB-donor-CU and an IAB-donor-DU. The IAB node may include two functional units: a mobile terminal (mobile terminal, MT) and a DU. The MT is used for communication between the IAB node and an upper-level node (or a parent node), and the DU is used for communication between the IAB and a lower-level node (or a child node).

Currently, each IAB node and a parent node of each IAB node in the IAB network are connected to a same donor node. The donor node manages topology, routing, quality of service (quality of service, QoS), and the like in the IAB network.

However, if the IAB network is managed by a plurality of donor nodes, how to control IAB nodes in the IAB network to implement normal transmission of a data packet is an urgent problem to be resolved.

SUMMARY

Embodiments of this application provide a communication method and a related device, to implement normal transmission of a data packet in plurality of network segments in a scenario in which the plurality of network segments in an IAB network are managed by a plurality of IAB donor nodes.

According to a first aspect, an embodiment of this application provides a communication method. The method may be performed by a first IAB node, or may be performed by a component (for example, an IAB-DU, an IAB-MT, a processor, a chip, or a chip system) of the first IAB node. The method is applied to an integrated access and backhaul IAB network, and the IAB network includes a first network segment and a second network segment. The first network segment is managed by a first donor node, the second network segment is managed by a second donor node, and the first donor node is different from the second donor node. The method includes: The first IAB node receives a first data packet in the first network segment. The first data packet includes a first backhaul adaptation protocol BAP routing identity, and the first BAP routing identity is used for transmission of the first data packet in the first network segment. The first IAB node obtains a first correspondence; replaces the first BAP routing identity in the first data packet with a second BAP routing identity according to the first correspondence, to obtain a second data packet; and sends the second data packet to a next-hop node in the second network segment. The next-hop node is a parent node or a child node of the first IAB node.

In embodiments of this application, in a scenario in which the IAB network is managed by a plurality of IAB donor nodes, the BAP routing identity of the data packet in the first network segment is replaced with the BAP routing identity in the second network segment by using the first IAB node, so that the data packet can be normally transmitted in the second network segment. This avoids or minimizes abnormal data packet transmission because the IAB network is managed by the plurality of IAB donor nodes, and ensures that a data packet can be correctly routed in the IAB network obtained through stitching network segments managed by the plurality of different donor nodes.

Optionally, in a possible implementation of the first aspect, the foregoing step further includes: The first IAB node obtains a second correspondence. That the first IAB node sends the second data packet to a next-hop node in the second network segment includes: The first IAB node determines, according to the second correspondence, to send the second data packet to the next-hop node in the second network segment over a first backhaul radio link control RLC channel of an egress link.

In this possible implementation, when egress mapping of the two network segments is managed by different donor nodes, the first IAB node may obtain correct egress mapping of the second network segment according to the second correspondence, to implement normal transmission of the data packet in the second network segment.

Optionally, in a possible implementation of the first aspect, before the first IAB node replaces the first BAP routing identity in the first data packet with the second BAP routing identity according to the first correspondence, to obtain the second data packet, the method further includes: The first IAB node determines that a BAP address of the first BAP routing identity in the first data packet is a BAP address of the first IAB node, and determines that the first data packet meets a preset condition. That the first IAB node determines that the first data packet meets a preset condition includes at least one of the following: When the first data packet includes indication information, the first IAB node determines, based on the indication information, that the first data packet meets the preset condition; or if the first correspondence further includes the first BAP routing identity in the first data packet, the first IAB node determines that the first data packet meets the preset condition.

In this possible implementation, the first IAB sets the condition before replacing the BAP routing identity, to reduce invalid processing performed on a data packet that needs to be received and processed by a BAP upper-layer protocol layer, and save network resources. Further, whether the first data packet meets the condition may be determined based on the indication information, or determined by using whether the first correspondence includes the first BAP routing identity.

Optionally, in a possible implementation of the first aspect, before the first IAB node replaces the first BAP routing identity in the first data packet with the second BAP routing identity according to the first correspondence, to obtain the second data packet, the method further includes: The first IAB node determines that the BAP address of the first BAP routing identity in the first data packet is the BAP address of the first IAB node.

In this possible implementation, in comparison with a manner of determining, based on the preset condition, whether to generate the second data packet, in the method, a condition related to the BAP address is added, so that determining of the first IAB node is more accurate.

Optionally, in a possible implementation of the first aspect, the indication information in the foregoing step includes a destination Internet protocol IP address of the first data packet, and when the destination IP address of the first data packet is not an IP address of the first IAB node, the first IAB node determines that the first data packet meets the preset condition.

In this possible implementation, an implicit preset condition is provided, to reduce invalid processing performed on a data packet that needs to be received and processed by a BAP upper-layer protocol layer, and save network resources.

Optionally, in a possible implementation of the first aspect, in the foregoing step, the first network segment includes the first IAB node and an upstream node of the first IAB node, and the second network segment includes the first IAB node and a downstream node of the first IAB node. That the first IAB node receives a first data packet in the first network segment includes: The first IAB node receives the first data packet sent by the upstream node in the first network segment. That the first IAB node sends the second data packet to a next-hop node in the second network segment includes: The first IAB node sends the second data packet to the downstream node in the second network segment. A BAP address of the second BAP routing identity is a BAP address of the downstream node.

In this possible implementation, when a downlink data packet is transmitted across network segments, a BAP routing identity of the downlink data packet in the first network segment is replaced with the BAP routing identity in the second network segment by using the first IAB node, so that the downlink data packet can be normally transmitted in the second network segment. This avoids or minimizes abnormal data packet transmission because the IAB network is managed by the plurality of IAB donor nodes, and ensures that the downlink data packet can be normally transmitted across network segments in the IAB network obtained through stitching network segments managed by the plurality of different donor nodes.

Optionally, in a possible implementation of the first aspect, in the foregoing step, the first network segment includes the first IAB node and a downstream node of the first IAB node, and the second network segment includes the first IAB node and an upstream node of the first IAB node. That the first IAB node receives a first data packet in the first network segment includes: The first IAB node receives the first data packet sent by the downstream node in the first network segment. That the first IAB node sends the second data packet to a next-hop node in the second network segment includes: The first IAB node sends the second data packet to the upstream node in the second network segment. A BAP address of the second BAP routing identity is a BAP address of the second donor node.

In this possible implementation, when an uplink data packet is transmitted across network segments, a BAP routing identity of the uplink data packet in the first network segment is replaced with the BAP routing identity in the second network segment by using the first IAB node, so that the uplink data packet can be normally transmitted in the second network segment. This avoids or minimizes abnormal data packet transmission because the IAB network is managed by the plurality of IAB donor nodes, and ensures that the uplink data packet can be normally transmitted across network segments in the IAB network obtained through stitching network segments managed by the plurality of different donor nodes.

Optionally, in a possible implementation of the first aspect, the upstream node of the first IAB node in the foregoing step is the parent node of the first IAB node. Before the first IAB node sends the second data packet to the upstream node in the second network segment, the method further includes: The first IAB node determines that the BAP address of the first BAP routing identity in the first data packet is the BAP address of the first IAB node.

In this possible implementation, the BAP routing identity is limited to be a BAP address, and the first IAB node may perform replacement in a simpler manner.

Optionally, in a possible implementation of the first aspect, in the foregoing step, the first BAP routing identity includes a first BAP address and/or a first path identity, and the second BAP routing identity includes a second BAP address and/or a second path identity.

In this possible implementation, the BAP routing identity is limited to be a BAP address, and the first IAB node may perform replacement in a simpler manner.

Optionally, in a possible implementation of the first aspect, the first correspondence in the foregoing step is configured by the first donor node or the second donor node. That the first IAB node obtains a first correspondence includes any one of the following: The first IAB node obtains the first BAP routing identity and the second BAP routing identity. There is a correspondence between the first BAP routing identity and the second BAP routing identity. The first IAB node obtains IP header information of the first data packet and the second BAP routing identity. There is a correspondence between the IP header information and the second BAP routing identity, and the IP header information includes at least one of a target IP address, a differentiated services code point DSCP, and a flow label.

In this possible implementation, a plurality of cases in which the first IAB node obtains the first correspondence are provided, so that the first IAB node can determine the second BAP routing identity, and further complete BAP routing identity conversion in different network segments.

Optionally, in a possible implementation of the first aspect, that the first IAB node obtains a second correspondence in the foregoing step includes any one of the following: The first IAB node obtains the first BAP routing identity and the first backhaul RLC channel of the egress link of the first IAB node, where there is a correspondence between the first BAP routing identity and the first backhaul RLC channel of the egress link of the first IAB node. The first IAB node obtains the second BAP routing identity and the first backhaul RLC channel of the egress link of the first IAB node, where there is a correspondence between the second BAP routing identity and the first backhaul RLC channel of the egress link of the first IAB node. The first IAB node obtains IP header information of the first data packet and the first backhaul RLC channel of the egress link of the first IAB node, where there is a correspondence between the IP header information of the first data packet and the first backhaul RLC channel of the egress link of the first IAB node, and the IP header information includes at least one of a target IP address, a differentiated services code point DSCP, and a flow label. The first IAB node obtains a second backhaul RLC channel of an ingress link of the first IAB node and the first backhaul RLC channel of the egress link of the first IAB node, where there is a correspondence between the second backhaul RLC channel of the ingress link of the first IAB node and the first backhaul RLC channel of the egress link of the first IAB node.

In this possible implementation, a plurality of cases in which the first IAB node obtains the second correspondence are provided, so that the first IAB node can determine an egress link of the second network segment, and further implement normal transmission of a data packet in the second network segment.

According to a second aspect, an embodiment of this application provides a communication method. The method may be performed by a first IAB node, or may be performed by a component (for example, an IAB-DU, an IAB-MT, a processor, a chip, or a chip system) of the first IAB node. The method is applied to an integrated access and backhaul IAB network, and the method includes: The first IAB node obtains a second correspondence; and determines, according to the second correspondence, to send a second data packet to a next-hop node in a second network segment over a first backhaul RLC channel of an egress link.

In embodiments of this application, the first IAB node determines, according to the second correspondence, to send the second data packet to the next-hop node in the second network segment over the first backhaul RLC channel of the egress link, to ensure that the second data packet can be normally transmitted in the second network segment.

Optionally, in a possible implementation of the second aspect, the IAB network includes a first network segment and the second network segment, the first network segment is managed by a first donor node, the second network segment is managed by a second donor node, and the first donor node is different from the second donor node. Before the first IAB node obtains the second correspondence in the foregoing step, the method further includes: The first IAB receives a first data packet in the first network segment. The first data packet includes a first backhaul adaptation protocol BAP routing identity, and the first BAP routing identity is used for transmission of the first data packet in the first network segment.

In this possible implementation, in a scenario in which the IAB network is managed by a plurality of IAB donor nodes, the first IAB node determines, according to the second correspondence, to send the second data packet to the next-hop node in the second network segment over the first backhaul RLC channel of the egress link. This avoids or minimizes abnormal egress mapping because the IAB network is managed by the plurality of IAB donor nodes, and ensures that a data packet can be normally transmitted in the IAB network obtained through stitching network segments managed by the plurality of different donor nodes.

Optionally, in a possible implementation of the second aspect, in the foregoing step, the second data packet includes a second BAP routing identity, and the second BAP routing identity is used for transmission of the second data packet in the second network segment.

In this possible implementation, each donor node is allowed to control only routing of a data packet in a network segment managed by the donor node, and then a boundary node of two network segments performs a proxy operation at a BAP layer or an IP layer. This avoids or minimizes abnormal egress mapping because the IAB network is managed by the plurality of IAB donor nodes, and ensures that a data packet can be normally transmitted in the IAB network obtained through stitching network segments managed by the plurality of different donor nodes.

Optionally, in a possible implementation of the second aspect, in the foregoing step, the first data packet and the second data packet are a same data packet, and the first BAP routing identity is the same as the second BAP routing identity.

In this possible implementation, to be specific, the IAB network includes one network segment, and the backhaul RLC channel of the egress link is determined according to the second correspondence, to determine an accurate channel for transmitting a data packet.

Optionally, in a possible implementation of the second aspect, the foregoing step further includes: The first IAB node obtains a first correspondence; and replaces the first BAP routing identity in the first data packet with the second BAP routing identity according to the first correspondence, to obtain the second data packet.

In this possible implementation, each donor node controls only routing of a data packet in a network segment managed by the donor node, and a boundary node (namely, the first IAB node) of two network segments performs a proxy operation at a BAP layer or an IP layer. The donor node replaces the first BAP routing identity, included in the received data packet, for routing in the first network segment with the second BAP routing identity for routing in the second network segment. In the routing stitch manner, it is ensured that data packets can be properly and correctly routed in new network topology management across a plurality of donor gNBs.

According to a third aspect, an embodiment of this application provides a communication method. The method may be performed by a first donor node, or may be performed by a component (for example, a DU, a CU, a processor, a chip, or a chip system) of the first donor node. The method is applied to an integrated access and backhaul IAB network. The IAB network includes a first network segment and a second network segment, the first network segment is managed by the first donor node, the second network segment is managed by a second donor node, and the first donor node is different from the second donor node. The method includes: The first donor node obtains a first BAP routing identity and a second BAP routing identity. There is a correspondence between the first BAP routing identity and the second BAP routing identity, the first BAP routing identity is used for transmission of a data packet in the first network segment, and the second BAP routing identity is used for transmission of the data packet in the second network segment. The first donor node sends the first BAP routing identity and the second BAP routing identity to a first IAB node, where the first IAB node is located in the first network segment and the second network segment. Alternatively, the first donor node obtains IP header information and a second BAP routing identity of a data packet, where there is a correspondence between the IP header information and the second BAP routing identity of the data packet, and the second BAP routing identity is used for transmission of the data packet in the second network segment; and sends the IP header information and the second BAP routing identity of the data packet to a first IAB node, where the first IAB node is located in the first network segment and the second network segment.

In embodiments of this application, in a scenario in which the IAB network is managed by a plurality of IAB donor nodes, the first correspondence is configured by the first donor node for the first IAB node, so that the data packet can be normally transmitted in the second network segment. This avoids or minimizes abnormal data packet transmission because the IAB network is managed by the plurality of IAB donor nodes, and ensures that a data packet can be correctly routed in the IAB network obtained through stitching network segments managed by the plurality of different donor nodes.

Optionally, in a possible implementation of the third aspect, the foregoing step further includes: The first donor node obtains the first BAP routing identity and a first backhaul RLC channel of an egress link of the first IAB node, where there is a correspondence between the first BAP routing identity and the first backhaul RLC channel of the egress link of the first IAB node; and sends the first BAP routing identity and the first backhaul RLC channel of the egress link of the first IAB node to the first IAB node.

Alternatively, the first donor node obtains the second BAP routing identity and a first backhaul RLC channel of an egress link of the first IAB node, where there is a correspondence between the second BAP routing identity and the first backhaul RLC channel of the egress link of the first IAB node; and sends the second BAP routing identity and the first backhaul RLC channel of the egress link of the first IAB node to the first IAB node.

Alternatively, the first donor node obtains IP header information of a first data packet and a first backhaul RLC channel of an egress link of the first IAB node, where there is a correspondence between the IP header information of the first data packet and the first backhaul RLC channel of the egress link of the first IAB node; and sends the IP header information of the first data packet and the first backhaul RLC channel of the egress link of the first IAB node to the first IAB node.

Alternatively, the first donor node obtains a second backhaul RLC channel of an ingress link of the first IAB node and a first backhaul RLC channel of an egress link of the first IAB node, where there is a correspondence between the second backhaul RLC channel of the ingress link of the first IAB node and the first backhaul RLC channel of the egress link of the first IAB node; and sends the second backhaul RLC channel of the ingress link of the first IAB node and the first backhaul RLC channel of the egress link of the first IAB node to the first IAB node.

In this possible implementation, in a scenario in which the IAB network is managed by a plurality of IAB donor nodes, the second correspondence is configured by the first donor node for the first IAB node, so that correct egress mapping can be determined for the data packet in the second network segment. This avoids or minimizes abnormal data packet transmission because the IAB network is managed by the plurality of IAB donor nodes, and ensures that a data packet can be normally transmitted in the IAB network obtained through stitching network segments managed by the plurality of different donor nodes.

Optionally, in a possible implementation of the third aspect, the foregoing step further includes: The first donor node sends configuration information to an access IAB node, where the configuration information indicates to use a BAP address of the first IAB node as a destination BAP address of an uplink data packet.

In this possible implementation, for uplink transmission, the first donor node sends the configuration information to the access node, so that the access node adds the BAP address of the first IAB node to a BAP layer of an uplink data packet. This implements normal transmission of the uplink data packet in the first network segment, and enables the first IAB node to normally replace the BAP routing identity subsequently.

Optionally, in a possible implementation of the third aspect, in the foregoing step, the first network segment includes the first IAB node and a downstream node of the first IAB node, and the second network segment includes the first IAB node and an upstream node of the first IAB node. The method further includes: The first donor node obtains a third correspondence and a fourth correspondence. The third correspondence is a correspondence between an IP address of a distributed unit DU in the first IAB node and a BAP address of a mobile terminal MT in the first IAB node, and the fourth correspondence is a correspondence between the BAP address of the MT in the first IAB node and an IP address of a DU in the downstream node of the first IAB node. The first donor node sends the third correspondence and the fourth correspondence to the second donor node, where the third correspondence and the fourth correspondence are used by the second donor node to determine the first BAP routing identity.

In this possible implementation, after obtaining the third correspondence and the fourth correspondence, the first donor node sends the third correspondence and the fourth correspondence to the second donor node, so that the second donor node can provide a correct first BAP routing identity for a DU part in the second donor node.

Optionally, in a possible implementation of the third aspect, in the foregoing step, the first network segment includes the first IAB node and the downstream node of the first IAB node, and the second network segment includes the first IAB node and the upstream node of the first IAB node. The method further includes: The first donor node determines a third BAP routing identity used for downlink transmission of the data packet in the first network segment, where the second BAP routing identity includes the third BAP routing identity; and sends the third BAP routing identity to the second donor node.

In this possible implementation, after configuring the BAP routing identity in the first network segment, the first donor node notifies the second donor node, so that the second donor node configures the first correspondence for the first IAB node.

Optionally, in a possible implementation of the third aspect, in the foregoing step, the first network segment includes the first IAB node and the downstream node of the first IAB node, and the second network segment includes the first IAB node and the upstream node of the first IAB node. The method further includes: The first donor node receives a fourth BAP routing identity sent by the second donor node, where the fourth BAP routing identity is used for uplink transmission of the data packet in the second network segment, and the second BAP routing identity includes the fourth BAP routing identity.

In this possible implementation, the first donor node receives the BAP routing identity that is used in the second network segment and that is sent by the second donor node, so that the first donor node configures the first correspondence for the IAB node.

According to a fourth aspect, an embodiment of this application provides a communication method. The method may be performed by a second donor node, or may be performed by a component (for example, a DU, a CU, a processor, a chip, or a chip system) of the second donor node. The method is applied to an integrated access and backhaul IAB network, the IAB network includes a first network segment and a second network segment, the first network segment is managed by a first donor node, the second network segment is managed by a second donor node, the first donor node is different from the second donor node, and a first IAB node is located in the first network segment and the second network segment. The method includes:

The second donor node obtains a first BAP routing identity and a second BAP routing identity, where there is a correspondence between the first BAP routing identity and the second BAP routing identity, the first BAP routing identity is used for transmission of a data packet in the first network segment, and the second BAP routing identity is used for transmission of the data packet in the second network segment; and sends the first BAP routing identity and the second BAP routing identity to the first IAB node, where the first IAB node is located in the first network segment and the second network segment.

Alternatively, the second donor node obtains IP header information and a second BAP routing identity of a data packet, where there is a correspondence between the IP header information and the second BAP routing identity of the data packet, and the second BAP routing identity is used for transmission of the data packet in the second network segment; and sends the IP header information and the second BAP routing identity of the data packet to the first IAB node, where the first IAB node is located in the first network segment and the second network segment.

In embodiments of this application, in a scenario in which the IAB network is managed by a plurality of IAB donor nodes, a first correspondence is configured by the second donor node for the first IAB node, so that the data packet can be normally transmitted in the second network segment. This avoids or minimizes abnormal data packet transmission because the IAB network is managed by the plurality of IAB donor nodes, and ensures that a data packet can be correctly routed in the IAB network obtained through stitching network segments managed by the plurality of different donor nodes.

Optionally, in a possible implementation of the fourth aspect, the foregoing step further includes:

The second donor node obtains the first BAP routing identity and a first backhaul RLC channel of an egress link of the first IAB node, where there is a correspondence between the first BAP routing identity and the first backhaul RLC channel of the egress link of the first IAB node; and sends the first BAP routing identity and the first backhaul RLC channel of the egress link of the first IAB node to the first IAB node.

Alternatively, the second donor node obtains the second BAP routing identity and a first backhaul RLC channel of an egress link of the first IAB node, where there is a correspondence between the second BAP routing identity and the first backhaul RLC channel of the egress link of the first IAB node; and sends the second BAP routing identity and the first backhaul RLC channel of the egress link of the first IAB node to the first IAB node.

Alternatively, the second donor node obtains IP header information of a first data packet and a first backhaul RLC channel of an egress link of the first IAB node, where there is a correspondence between the IP header information of the first data packet and the first backhaul RLC channel of the egress link of the first IAB node; and sends the IP header information of the first data packet and the first backhaul RLC channel of the egress link of the first IAB node to the first IAB node.

Alternatively, the second donor node obtains a second backhaul RLC channel of an ingress link of the first IAB node and a first backhaul RLC channel of an egress link of the first IAB node, where there is a correspondence between the second backhaul RLC channel of the ingress link of the first IAB node and the first backhaul RLC channel of the egress link of the first IAB node; and sends the second backhaul RLC channel of the ingress link of the first IAB node and the first backhaul RLC channel of the egress link of the first IAB node to the first IAB node.

In this possible implementation, in a scenario in which the IAB network is managed by a plurality of IAB donor nodes, a second correspondence is configured by the second donor node for the first IAB node, so that correct egress mapping can be determined for the data packet in the second network segment. This avoids or minimizes abnormal data packet transmission because the IAB network is managed by the plurality of IAB donor nodes, and ensures that a data packet can be normally transmitted in the IAB network obtained through stitching network segments managed by the plurality of different donor nodes.

Optionally, in a possible implementation of the fourth aspect, the foregoing step further includes: The second donor node sends configuration information to an access IAB node, where the configuration information indicates to use a BAP address of the first IAB node as a destination BAP address of an uplink data packet.

In this possible implementation, for uplink transmission, the second donor node sends the configuration information to the access node, so that the access node adds the BAP address of the first IAB node to a BAP layer of an uplink data packet. This implements normal transmission of the uplink data packet in the first network segment, and enables the first IAB node to normally replace the BAP routing identity subsequently.

Optionally, in a possible implementation of the fourth aspect, in the foregoing step, the first network segment includes the first IAB node and a downstream node of the first IAB node, and the second network segment includes the first IAB node and an upstream node of the first IAB node. The method further includes: The second donor node receives a third correspondence and a fourth correspondence that are sent by the first donor node. The third correspondence is a correspondence between an IP address of a distributed unit DU in the first IAB node and a BAP address of a mobile terminal MT in the first IAB node, and the fourth correspondence is a correspondence between the BAP address of the MT in the first IAB node and an IP address of a DU in the downstream node of the first IAB node. The second donor node determines the first BAP routing identity according to the third correspondence and the fourth correspondence.

In this possible implementation, the second donor node receives the third correspondence and the fourth correspondence, so that the second donor node can provide a correct first BAP routing identity for a DU part in the second donor node.

Optionally, in a possible implementation of the fourth aspect, in the foregoing step, the first network segment includes the first IAB node and the downstream node of the first IAB node, and the second network segment includes the first IAB node and the upstream node of the first IAB node. The method further includes: The second donor node receives a third BAP routing identity sent by the first donor node, where the third BAP routing identity is used for downlink transmission of the data packet in the first network segment, and the second BAP routing identity includes the third BAP routing identity.

In this possible implementation, the second donor node receives the BAP routing identity that is used in the first network segment and that is sent by the first donor node, so that the second donor node configures the first correspondence for the IAB node.

Optionally, in a possible implementation of the fourth aspect, in the foregoing step, the first network segment includes the first IAB node and the downstream node of the first IAB node, and the second network segment includes the first IAB node and the upstream node of the first IAB node. The method further includes: The second donor node determines a fourth BAP routing identity used for uplink transmission of the data packet in the second network segment, where the second BAP routing identity includes the fourth BAP routing identity; and sends the fourth BAP routing identity to the first donor node.

In this possible implementation, after configuring the BAP routing identity in the second network segment, the second donor node notifies the first donor node, so that the first donor node configures the first correspondence for the first IAB node.

According to a fifth aspect, an embodiment of this application provides a communication apparatus. The communication apparatus may be a first IAB node, or a component (for example, an IAB-DU, an IAB-MT, a processor, a chip, or a chip system) of the first IAB node. The communication apparatus performs the method in any one of the first aspect or the possible implementations of the first aspect, or the method in any one of the second aspect or the possible implementations of the second aspect.

According to a sixth aspect, an embodiment of this application provides a communication apparatus. The communication apparatus may be a first donor node or a component (for example, a DU, a CU, a processor, a chip, or a chip system) of the first donor node. The communication apparatus performs the method in any one of the third aspect or the possible implementations of the third aspect.

According to a seventh aspect, an embodiment of this application provides a communication apparatus. The communication apparatus may be a second donor node or a component (for example, a DU, a CU, a processor, a chip, or a chip system) of the second donor node. The communication apparatus performs the method in any one of the fourth aspect or the possible implementations of the fourth aspect.

According to an eighth aspect, an embodiment of this application provides a computer-readable storage medium. The computer-readable storage medium stores instructions, and when the instructions are executed by a computer, the computer is enabled to perform the method in any one of the first aspect or the possible implementations of the first aspect, the method in any one of the second aspect or the possible implementations of the second aspect, the method in any one of the third aspect or the possible implementations of the third aspect, or the method in any one of the fourth aspect or the possible implementations of the fourth aspect.

According to a ninth aspect, an embodiment of this application provides a computer program product. When the computer program product is executed by a computer, the computer is enabled to perform the method in any one of the first aspect or the possible implementations of the first aspect, the method in any one of the second aspect or the possible implementations of the second aspect, the method in any one of the third aspect or the possible implementations of the third aspect, or the method in any one of the fourth aspect or the possible implementations of the fourth aspect.

According to a tenth aspect, an embodiment of this application provides a communication apparatus including a processor. The processor is coupled to a memory, the memory is configured to store a program or instructions, and when the program or the instructions are executed by the processor, the apparatus implements the method in any one of the first aspect or the possible implementations of the first aspect or the method in any one of the second aspect or the possible implementations of the second aspect.

According to an eleventh aspect, an embodiment of this application provides a communication apparatus including a processor. The processor is coupled to a memory, the memory is configured to store a program or instructions, and when the program or the instructions are executed by the processor, the apparatus implements the method in any one of the third aspect or the possible implementations of the third aspect.

According to a twelfth aspect, an embodiment of this application provides a communication apparatus including a processor. The processor is coupled to a memory, the memory is configured to store a program or instructions, and when the program or the instructions are executed by the processor, the apparatus implements the method in any one of the fourth aspect or the possible implementations of the fourth aspect.

According to a thirteenth aspect, an embodiment of this application provides a communication system, including at least one of the communication apparatus in the fifth aspect, the communication apparatus in the sixth aspect, and the communication apparatus in the seventh aspect.

According to a fourteenth aspect, an embodiment of this application provides a communication system, including at least one of the communication apparatus in the tenth aspect, the communication apparatus in the eleventh aspect, and the communication apparatus in the twelfth aspect.

According to a fifteenth aspect, an embodiment of this application provides a communication method. The method may be performed by an IAB node, or may be performed by a component (for example, an IAB-DU, an IAB-MT, an IAB donor, a processor, a chip, or a chip system) of the IAB node. The method is applied to an integrated access and backhaul IAB network, and the method includes: The IAB node receives a data packet, and determines, based on a type of the data packet and/or an attribute of the IAB node, that the data packet is abnormal.

Optionally, in a possible implementation of the fifteenth aspect, the type of the data packet includes uplink and downlink. In other words, the data packet includes an uplink data packet and/or a downlink data packet.

Optionally, in a possible implementation of the fifteenth aspect, the data packet includes a parent node data packet and/or a child node data packet. The parent node data packet is a data packet sent by a parent node of the IAB node, and the child node data packet is a data packet sent by a child node of the IAB node.

Optionally, in a possible implementation of the fifteenth aspect, the data packet includes an upstream data packet and/or a downstream data packet. The upstream data packet is a data packet sent by an upstream node of the IAB node, and the downstream data packet is a data packet sent by a downstream node of the IAB node.

Optionally, in a possible implementation of the fifteenth aspect, that the IAB node receives a data packet, and determines, based on a type of the data packet and/or an attribute of the IAB node, that the data packet is abnormal includes at least one of the following:

1. The IAB node receives the uplink data packet. If a BAP layer header of the uplink data packet carries a BAP address of the IAB node, the IAB node determines that the uplink data packet is an incorrect or abnormal data packet.

Optionally, that the IAB node receives an uplink data packet is specifically that a receiving part of a BAP layer entity of the IAB-DU receives the uplink data packet.

In this possible implementation, after determining that the uplink data packet is an incorrect or abnormal data packet, the IAB node may discard the uplink data packet. This simplifies a condition for determining an abnormal uplink data packet, and reduces buffer space of the IAB node occupied by an incorrect or abnormal uplink data packet.

2. The IAB-donor-DU receives the uplink data packet. If a BAP address carried in a BAP layer header of the uplink data packet is not a BAP address of the IAB-donor-DU, the IAB-donor-DU determines that the data packet is an incorrect or abnormal data packet.

In this possible implementation, after determining that the uplink data packet is an incorrect or abnormal data packet, the IAB-donor-DU may discard the uplink data packet. This simplifies a condition for determining an abnormal uplink data packet, and reduces buffer space of the IAB-donor-DU occupied by an incorrect or abnormal uplink data packet.

According to a sixteenth aspect, an embodiment of this application provides a communication method. The method may be performed by an IAB node, or may be performed by a component (for example, an IAB-DU, an IAB-MT, an IAB donor, a processor, a chip, or a chip system) of the IAB node. The method is applied to an integrated access and backhaul IAB network, and the method includes: The IAB node determines, based on a type of a data packet and/or an attribute of the IAB node, that the data packet is abnormal before sending the data packet.

Optionally, in a possible implementation of the sixteenth aspect, the type of the data packet includes uplink and downlink. In other words, the data packet includes an uplink data packet and/or a downlink data packet.

Optionally, in a possible implementation of the sixteenth aspect, the data packet includes a parent node data packet and/or a child node data packet. The parent node data packet is a data packet sent by a parent node of the IAB node, and the child node data packet is a data packet sent by a child node of the IAB node.

Optionally, in a possible implementation of the sixteenth aspect, the data packet includes an upstream data packet and/or a downstream data packet. The upstream data packet is a data packet sent by an upstream node of the IAB node, and the downstream data packet is a data packet sent by a downstream node of the IAB node.

Optionally, in a possible implementation of the sixteenth aspect, that the IAB node determines, based on a type of a data packet and/or an attribute of the IAB node, that the data packet is abnormal before sending the data packet includes at least one of the following:

1. Before the IAB node sends the data packet, if an entry that includes a target BAP address of the data packet is not found in a routing table, the IAB node determines that the data packet is an incorrect or abnormal data packet.

Optionally, the IAB node is specifically a sending part of a BAP layer entity of the IAB-MT/DU.

In this possible implementation, after determining that the data packet is an incorrect or abnormal data packet, the IAB node may discard the data packet. This simplifies a condition for determining an abnormal data packet, and reduces buffer space of the IAB node occupied by an incorrect or abnormal data packet. In addition, this reduces network resource consumption caused by sending an incorrect or abnormal data packet.

2. Before the IAB-donor-DU sends the downlink data packet, if an entry that includes the target BAP address of the data packet is not found in a routing table, the IAB-donor-DU determines that the downlink data packet is an incorrect or abnormal data packet.

In this possible implementation, after determining that the downlink data packet is an incorrect or abnormal data packet, the IAB-donor-DU may discard the downlink data packet. This simplifies a condition for determining an abnormal downlink data packet, and reduces buffer space of the IAB-donor-DU occupied by an incorrect or abnormal downlink data packet. In addition, this reduces network resource consumption caused by sending an incorrect or abnormal downlink data packet.

For the fifteenth aspect and the sixteenth aspect, compared with the conventional technology in which a common and complex manner is used to determine an abnormal data packet, a data packet processing method provided in embodiments of this application can simplify a condition for determining an abnormal data packet, and more accurately identify more abnormal data packets in a specific case. For related advantageous effects, refer to the foregoing descriptions.

For technical effects brought by any one of the fifth aspect, the eighth aspect, the ninth aspect, the tenth aspect, the thirteenth aspect, and the fourteenth aspect or the possible implementations of the fifth aspect, the eighth aspect, the ninth aspect, the tenth aspect, the thirteenth aspect, and the fourteenth aspect, refer to technical effects brought by the first aspect or the possible implementations of the first aspect. Details are not described herein again.

For technical effects brought by any one of the fifth aspect, the eighth aspect, the ninth aspect, the tenth aspect, the thirteenth aspect, and the fourteenth aspect or the possible implementations of the fifth aspect, the eighth aspect, the ninth aspect, the tenth aspect, the thirteenth aspect, and the fourteenth aspect, refer to technical effects brought by the second aspect or the possible implementations of the second aspect. Details are not described herein again.

For technical effects brought by any one of the sixth aspect, the eighth aspect, the ninth aspect, the eleventh aspect, the thirteenth aspect, and the fourteenth aspect or the possible implementations of the sixth aspect, the eighth aspect, the ninth aspect, the eleventh aspect, the thirteenth aspect, and the fourteenth aspect, refer to technical effects brought by the third aspect or the possible implementations of the third aspect. Details are not described herein again.

For technical effects brought by any one of the seventh aspect, the eighth aspect, the tenth aspect, the twelfth aspect, the thirteenth aspect, and the fourteenth aspect or the possible implementations of the seventh aspect, the eighth aspect, the tenth aspect, the twelfth aspect, the thirteenth aspect, and the fourteenth aspect, refer to technical effects brought by the fourth aspect or the possible implementations of the fourth aspect. Details are not described herein again.

It can be learned from the technical solutions that embodiments of this application have the following advantages: In the scenario in which the IAB network is managed by the plurality of IAB donor nodes, the first BAP routing identity is information used for routing of the data packet in the first network segment including the IAB node controlled by the first donor node, and the second routing identity is information used for routing of the data packet in the second network segment including the IAB node controlled by the second donor node. The BAP routing identity of the data packet in the first network segment is replaced with the BAP routing identity in the second network segment by using the first IAB node, so that the data packet can be normally transmitted in the second network segment. This avoids or minimizes abnormal data packet transmission because the IAB network is managed by the plurality of IAB donor nodes.

DESCRIPTION OF EMBODIMENTS

Figure 1:
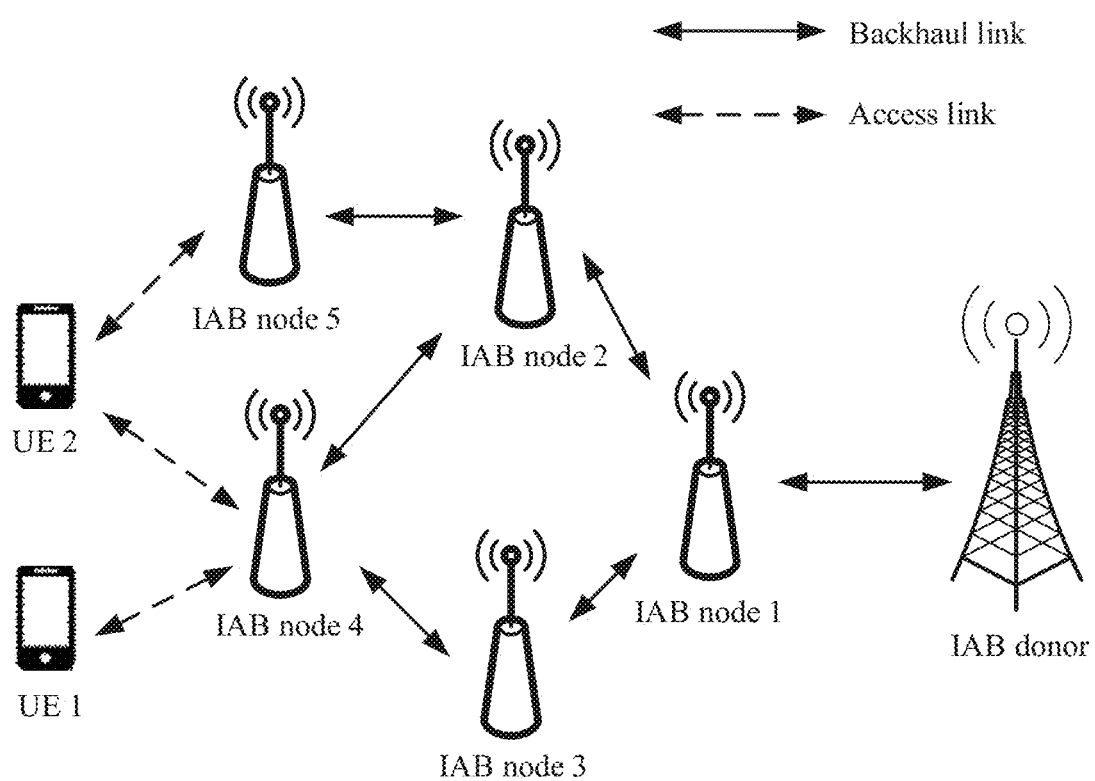
FIG. 1 is a schematic diagram of a standalone IAB networking scenario.

The following clearly describes technical solutions in embodiments of this application with reference to the accompanying drawings in embodiments of this application.

In descriptions of this application, unless otherwise specified, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, in the descriptions of this application, unless otherwise specified, "a plurality of" means two or more than two. In addition, to clearly describe the technical solutions in embodiments of this application, terms such as "first" and "second" are used in embodiments of this application to distinguish between same items or similar items that have basically same functions and purposes. A person skilled in the art may understand that words such as "first" and "second" do not limit a quantity or an execution sequence, and words such as "first" and "second" do not indicate a definite difference.

First, the following describes some terms in embodiments of this application, to facilitate understanding of a person skilled in the art.

1. A communication system includes but is not limited to a narrowband Internet of things (narrowband Internet of things, NB-IoT) system, a wireless local area network (wireless local access network, WLAN) system, a long term evolution (long term evolution, LTE) system, a next generation 5G mobile communication system, or a communication system after 5G, for example, a new radio (new radio, NR) system, a device-to-device (device-to-device D2D) communication system, and the like.

2. A network device is also referred to as a base station, and includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (home evolved NodeB, or home NodeB, HNB), a baseband unit (baseband unit, BBU), an evolved NodeB (evolved LTE, eLTE), an NR base station (next generation NodeB, gNB), and the like.

3. A terminal device includes but is not limited to any one of user equipment (user equipment, UE), a mobile console, an access terminal, a subscriber unit, a subscriber station, a mobile station, a remote station, a remote terminal, a mobile device, a terminal, a wireless communication device, a user agent, a station (station, STA) in a wireless local area network (wireless local area network, WLAN), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a mobile console in a future 5G network, a terminal device in a future evolved public land mobile network (public land mobile network, PLMN), and the like. The following provides descriptions by using an example in which the terminal device is UE.

4. A wireless backhaul node (which may also be referred to as an IAB node) is configured to provide a wireless backhaul (backhaul) service for a node (for example, a terminal) that accesses the wireless backhaul node in a wireless manner. The wireless backhaul service is a data and/or signaling backhaul service provided over a wireless backhaul link. The wireless backhaul node may be an IAB node or a relay node (relay node, RN). This is not limited in the solutions of this application. The wireless backhaul node may be one of the foregoing base stations or terminal devices that have a forwarding function, or may be in an independent device form. In a network (an IAB network is used as an example for description) including the wireless backhaul node, the wireless backhaul node may provide a wireless access service for a terminal, and is connected to a donor gNB (donor gNB) over the wireless backhaul link to transmit service data of a user.

For example, the wireless backhaul node may alternatively be a device such as customer premises equipment (customer premises equipment, CPE) or a residential gateway (residential gateway, RG). In this case, a method provided in embodiments of this application may further be applied to a home access (home access) scenario.

Further, the following briefly describes concepts related to the IAB network.

1. Wireless Backhaul Node and Donor Node

In embodiments of this application, a node that supports integrated access and backhaul is referred to as a wireless backhaul node. In an LTE communication system, the wireless backhaul node may also be referred to as a relay node (relay node, RN). In 5G, the wireless backhaul node may also be referred to as an IAB node (IAB node). For ease of description, the following is described by using the IAB node as an example.

The IAB node may provide a wireless access service for the terminal device. The IAB node is connected to the donor node over the wireless backhaul link to transmit data (which may include user plane data and control plane signaling) of the terminal device.

In embodiments of this application, the donor node is also referred to as an IAB donor (IAB donor) or a donor base station (donor gNodeB, DgNB). Specifically, the DgNB may be an access network element with a complete base station function, or may be an access network element that includes a central unit (central unit, CU) and a distributed unit (distributed unit, DU) in a separation form. The DgNB is connected to a core network element serving the terminal device, for example, connected to a 5G core (5G core, 5GC) network, and provides a wireless backhaul function for the IAB node. For ease of description, in embodiments of this application, the central unit of the donor node is referred to as a donor-CU (donor-CU), and the distributed unit of the donor node is referred to as a donor-DU (donor-DU). Alternatively, the donor-CU may be in a control plane (control plane, CP) or a user plane (user plane, UP) separation form. For example, one CU includes one CU-CP and a plurality of CU-UPs. This is not limited in embodiments of this application.

2. Parent Node, Child Node, Downstream Node, and Upstream Node

Each IAB node considers an adjacent node that provides a wireless access service and/or a wireless backhaul service for the IAB node as a parent node (parent node). Correspondingly, each IAB node may be considered as a child node of the parent node of the IAB node. The IAB network may support multi-hop and multi-connection networking. Therefore, there may be a plurality of transmission paths between the terminal device and the donor node. On a transmission path, there is a determined hierarchical relationship between a terminal device and an IAB node that provides a wireless access service for the terminal device, between IAB nodes, and between an IAB node and a donor node that provides a backhaul service for the IAB node. A node that provides a wireless backhaul service for the IAB node is referred to as a parent node of the IAB node, or a node that provides a wireless access service for the terminal device is referred to as a parent node of the terminal device. The IAB node may be considered as a child node of the parent node of the IAB node, and the terminal device may be considered as a child node of the parent node of the terminal device. Herein, the parent node of the IAB node may be another IAB node, or may be a donor node. When the IAB node directly communicates with the donor node through a radio air interface, the parent node of the IAB node is the donor node.

Optionally, the child node may also be referred to as a lower-level node or a downstream node, and the parent node may also be referred to as an upper-level node or an upstream node.

3. Intermediate IAB Node

The intermediate IAB node is an IAB node that provides a wireless backhaul service for another IAB node (for example, an access IAB node or another intermediate IAB node), or an IAB node on a path between an access IAB node and an IAB donor.

4. Access Link

The access link is a wireless link over which the terminal device communicates with a node (for example, an IAB node, a donor node, or a donor-DU) that provides a wireless access service for the terminal device, and includes an access link used for uplink transmission and an access link used for downlink transmission. The access link used for uplink transmission is also referred to as an uplink access link or an access uplink, and a transmission direction of the access link used for uplink transmission is from the terminal device to the node. The access link used for downlink transmission is also referred to as a downlink access link or an access downlink, and a transmission direction of the access link used for downlink transmission is from the node to the terminal device. In this application, the access link of the terminal device is a radio link. Therefore, the access link may also be referred to as a wireless access link.

5. Backhaul Link

The backhaul link is a radio link used when an IAB node communicates with a parent node of the IAB node. The parent node of the IAB node may be an IAB node or may be a donor node, and includes a backhaul link used for uplink transmission and a backhaul link used for downlink transmission. The backhaul link used for uplink transmission is also referred to as an uplink backhaul link or a backhaul uplink, and a transmission direction of the backhaul link used for uplink transmission is from the IAB node to the parent node of the IAB node. The backhaul link used for downlink transmission is also referred to as a downlink backhaul link or a backhaul downlink, and a transmission direction of the backhaul link used for downlink transmission is from the parent node of the IAB node to the IAB node. In this application, the backhaul link between the IAB node and the parent node is a radio link. Therefore, the backhaul link may also be referred to as a wireless backhaul link.

6. Transmission Path

A transmission path is entire routing from a sending node to a receiving node, and includes at least one link (link). In embodiments of this application, the link indicates connection between adjacent nodes. In other words, the transmission path is a transmission path between the sending node and the receiving node, where the sending node is a start point and the receiving node is an end point over the path. Subsequently, for ease of description, the transmission path between the sending node acting as a start point and the receiving node acting as an end point may be described as a transmission path between the sending node and the receiving node.

During uplink transmission, any node between the terminal device and the donor node other than the donor node may be used as the sending node, and an upper-level node (for example, a parent node of the sending node or a parent node of the parent node) of the sending node may be used as the receiving node. For example, the sending node may be an IAB node, the receiving node may be a parent node of the IAB node, and entire routing between the IAB node and the parent node of the IAB node indicates a transmission path. For another example, the sending node may be an IAB node, the receiving node may be a donor node, and entire routing between the IAB node and the donor node indicates a transmission path.

Similarly, during downlink transmission, the sending node may be any node between the donor node and the terminal device other than the terminal device, and the receiving node may be a lower-level node (for example, a child node of the sending node or a child node of the child node) of the sending node. For example, the sending node may be an IAB node, the receiving node may be a child node of the IAB node, and entire routing between the IAB node and the child node of the IAB node indicates a transmission path. For another example, the sending node may be an IAB node, the receiving node may be the terminal device, and entire routing between the IAB node and the terminal device indicates a transmission path.

7. F1 Interface and Protocol Layer of the F1 Interface

The F1 interface is a logical interface between the DU part of the IAB node and the donor node (or the donor-CU). The F1 interface may also be referred to as an F1*interface, and supports a user plane and a control plane.

The protocol layer of the F1 interface is a communication protocol layer on the F1 interface.

Names of all nodes and messages in this application are named for ease of description, and names in an actual network may be different. It should be understood that names of various nodes and messages are not intended to limit this application. Any name with a same or similar function as the node or message used in this application is considered as a method or equivalent replacement of this application, and falls within the protection scope of this application. Details are not described in the following.

Compared with a 4th generation mobile communication system, the 5th generation (5G) mobile communication imposes stricter requirements on all performance indexes of the network, for example, capacity indicators improved by 1000 times, wider coverage requirements, ultra-high reliability and ultra-low latency. It is considered that high-frequency carrier frequency resources are abundant, high-frequency small cell networking becomes increasingly popular in hotspot areas to meet ultra-high capacity requirements of 5G. However, high-frequency carriers feature poor propagation, and have severe attenuation due to blocking and a small coverage area. Therefore, a large quantity of small cells need to be deployed intensively. Accordingly, providing fiber backhaul for these small cells brings high costs and has great difficulty in construction. Therefore, an economical and convenient backhaul solution is required. In addition, from the perspective of wide coverage requirements, it is difficult and costs high to deploy fibers for network coverage in some remote areas. Therefore, a flexible and convenient access and backhaul solution is also required. The IAB technology provides an idea for resolving the two problems. Both the access link (Access Link) and the backhaul link (Backhaul Link) in the IAB technology use a wireless transmission solution, to reduce fiber deployment.

In the current 5G standard, considering small coverage area of high frequency bands, multi-hop networking may be used in the IAB network, to ensure coverage performance of the network. In addition, considering the requirement for service transmission reliability, the IAB node may support dual connectivity (dual connectivity, DC) or multi-connectivity (multi-connectivity), to cope with abnormal cases that may occur on the backhaul link, for example, link interruption or blockage (blockage) and load fluctuation, to improve transmission reliability. Therefore, the IAB network supports multi-hop networking and multi-connection networking. There is at least one transmission path, including a plurality of links, between the terminal device served by the IAB node and the IAB donor. A transmission path includes a plurality of nodes, for example, UE, one or more IAB nodes, and an IAB donor (if the IAB donor is in a CU-DU separation form, the transmission path further includes an IAB-donor-DU and an IAB-donor-CU). Each IAB node considers an adjacent node that provides access and backhaul services for the IAB node as a parent node, and correspondingly each IAB node may be considered as a child node of the parent node of the IAB node.

FIG. 1 is a schematic diagram of a standalone IAB networking scenario.

A parent node of an IAB node 1 is an IAB donor, the IAB node 1 is a parent node of an IAB node 2 and an IAB node 3, both the IAB node 2 and the IAB node 3 are parent nodes of an IAB node 4, and a parent node of an IAB node 5 is the IAB node 2. An uplink data packet of the UE may be transmitted to a donor site, namely, the IAB donor, through one or more IAB nodes, and then sent by the IAB donor to a mobile gateway device (for example, a user plane function UPF unit in a 5G core network). A downlink data packet is received by the IAB donor from the mobile gateway device, and then sent to the UE by using the IAB node. FIG. 1 shows the standalone (standalone, SA) IAB networking scenario. The IAB node and the UE are connected to a network only through an air interface of an NR standard.

The standalone IAB networking scenario shown in FIG. 1 is merely an example. In a multi-hop and multi-connection IAB scenario, there are more other possibilities. For example, the IAB donor in the figure and an IAB node of another IAB donor form dual connectivity, to serve the UE. This is not specifically limited herein.

Figure 2:
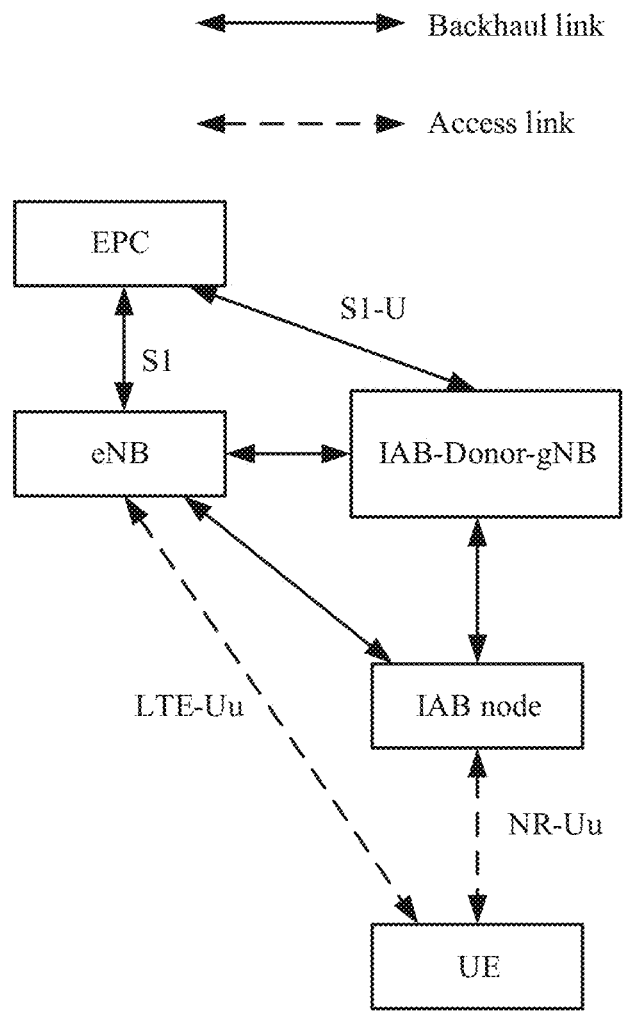
FIG. 2 is a schematic diagram of a non-standalone IAB networking scenario.

The IAB network supports the standalone networking scenario shown in FIG. 1, and a non-standalone networking scenario shown in FIG. 2.

FIG. 2 is a schematic diagram of a non-standalone IAB networking scenario.

An IAB node supports dual connectivity (E-UTRAN NR Dual Connectivity, EN-DC) in 4G and 5G networks. An LTE base station eNB is a master base station (master eNB, MeNB), and provides LTE air interface (LTE-Uu) connection for the IAB node. In addition, an S1 interface is established between the LTE base station and a 4G core network evolved packet core (evolved packet core, EPC) for user plane transmission and control plane transmission. An IAB-donor-gNB is a secondary base station, and provides NR air interface (NR-Uu) connection for the IAB node. In addition, an S1 interface is established between the IAB-donor-gNB and the core network EPC for user plane transmission. Similarly, the UE also supports EN-DC. The UE is connected to the master base station eNB through the LTE-Uu interface, and is connected to the secondary base station, namely, the IAB node, through the NR-Uu interface. The secondary base station of the UE may also be the IAB-donor-gNB.

It should be noted that FIG. 2 is only an example of networking, and the NSA scenario of the IAB network also supports multi-hop IAB networking. For example, the UE in FIG. 2 may be another IAB node, that is, the IAB node may be connected to the IAB-donor-gNB over a multi-hop wireless backhaul link.

The non-standalone IAB networking scenario in this application may also be referred to as an IAB EN-DC networking scenario.

Figure 3:
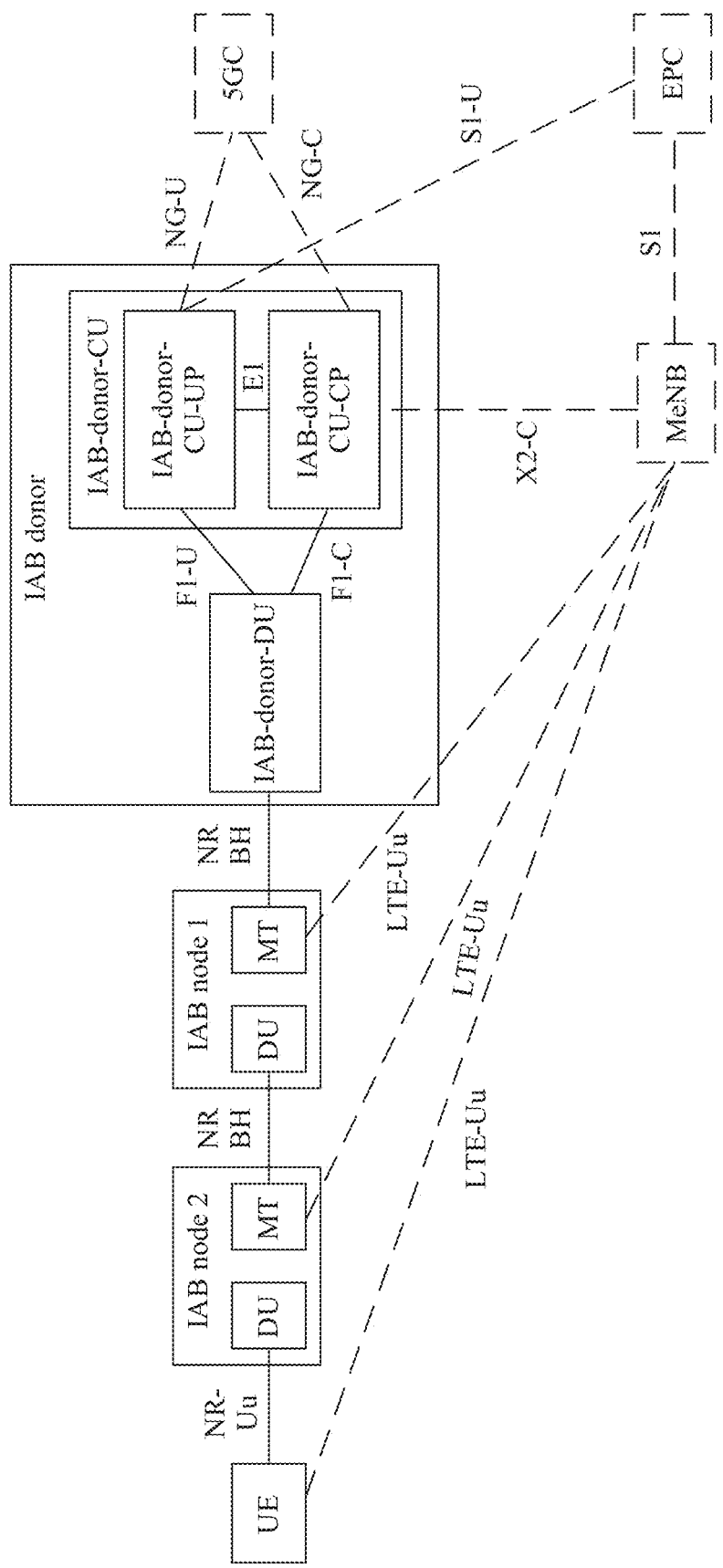
FIG. 3 is a schematic diagram of a system architecture of an IAB network.

The foregoing describes the standalone (SA) networking IAB network and the non-standalone (NSA) networking IAB network with reference to FIG. 1 and FIG. 2. The following describes a system architecture of the IAB network in a case in which the donor node includes a CU and a DU in a separation form, and the IAB node includes an MT and a DU. FIG. 3 is a schematic diagram of the system architecture of the IAB network.

When the IAB node works in an SA mode, the IAB donor may be connected to the 5GC. The IAB-donor-CU-CP is connected to a control plane network element, for example, an access and mobility management function (access and mobility management function, AMF), in the 5GC through an NG control plane interface (NG-C). The IAB-donor-CU-UP is connected to a user plane network element, for example, a user plane function (user plane function, UPF), in the 5GC through an NG user plane interface (NG-U).

When the IAB node works in an NSA mode (which is also referred to as an EN-DC mode), the IAB-donor-CU-UP may be connected to the EPC, for example, a serving gateway (serving gateway, SGW), through an S1 user plane interface (S1-U). The MeNB is connected to the MT of the IAB node through the LTE-Uu air interface. The MeNB is connected to the IAB-donor-CU-CP through an X2-C interface. The MeNB is connected to the EPC through the S1 interface (including the S1 user plane interface and the S1 control plane interface).

It is clear that the MeNB shown in FIG. 3 may be replaced with a 5G base station gNB, and correspondingly, the LTE-Uu air interface between the MeNB and the MT of the IAB node is replaced with the NR-Uu air interface. A user plane interface and/or a control plane interface may be established between the gNB and the 5GC. The gNB and the IAB donor provide a dual connectivity service for the IAB node, and the gNB may serve as a master base station or a secondary base station of the IAB node. This is not specifically limited herein.

Currently, the IAB network determines to introduce a new protocol layer to the wireless backhaul link: a backhaul adaptation protocol (backhaul adaptation protocol, BAP) layer. The BAP layer is located above a radio link control (radio link control, RLC) layer, and may be used to implement functions such as routing of a data packet on the wireless backhaul link and bearer mapping.

The F1 interface (which is also referred to as an F1*interface or the like) needs to be established between the IAB node (or the DU of the IAB) and the donor node (or the IAB-donor-CU). The F1 interface supports a user-plane protocol (F1-U/F1*-U) and a control-plane protocol (F1-C/F1*-C).

Figure 4:
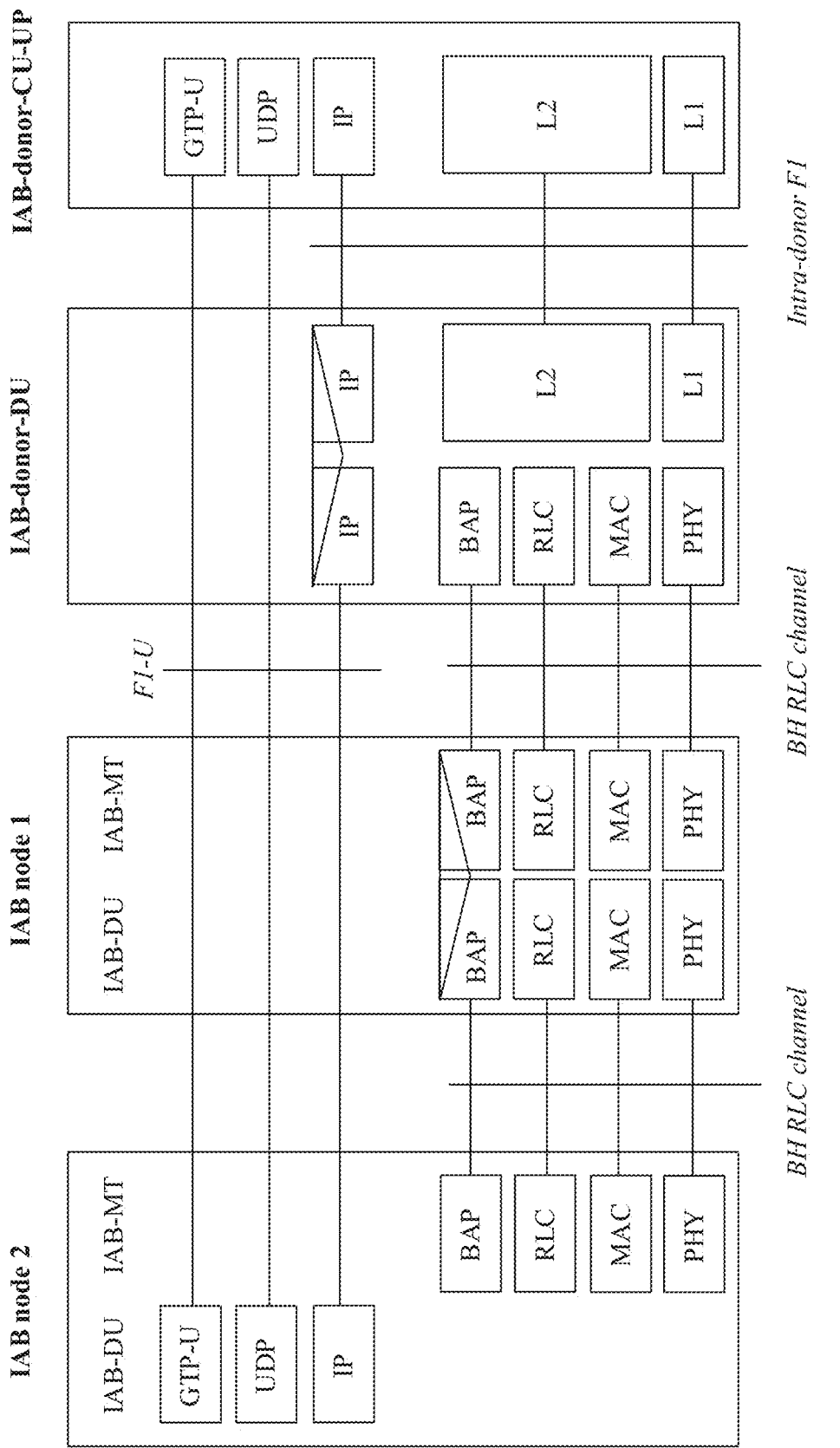
FIG. 4 is a schematic diagram of a user plane protocol stack of an IAB network.

For a user plane protocol stack of the IAB network, refer to FIG. 4. The user plane protocol includes one or more of the following protocol layers: a general packet radio service tunneling protocol user plane (general packet radio service tunneling protocol user plane, GTP-U) layer, a user datagram protocol (user datagram protocol, UDP) layer, and an Internet protocol (Internet protocol, IP).

Functions such as user plane data transmission and downlink transmission status feedback may be performed between the IAB node and the IAB donor through a user plane of the F1/F1*interface.

Figure 5:
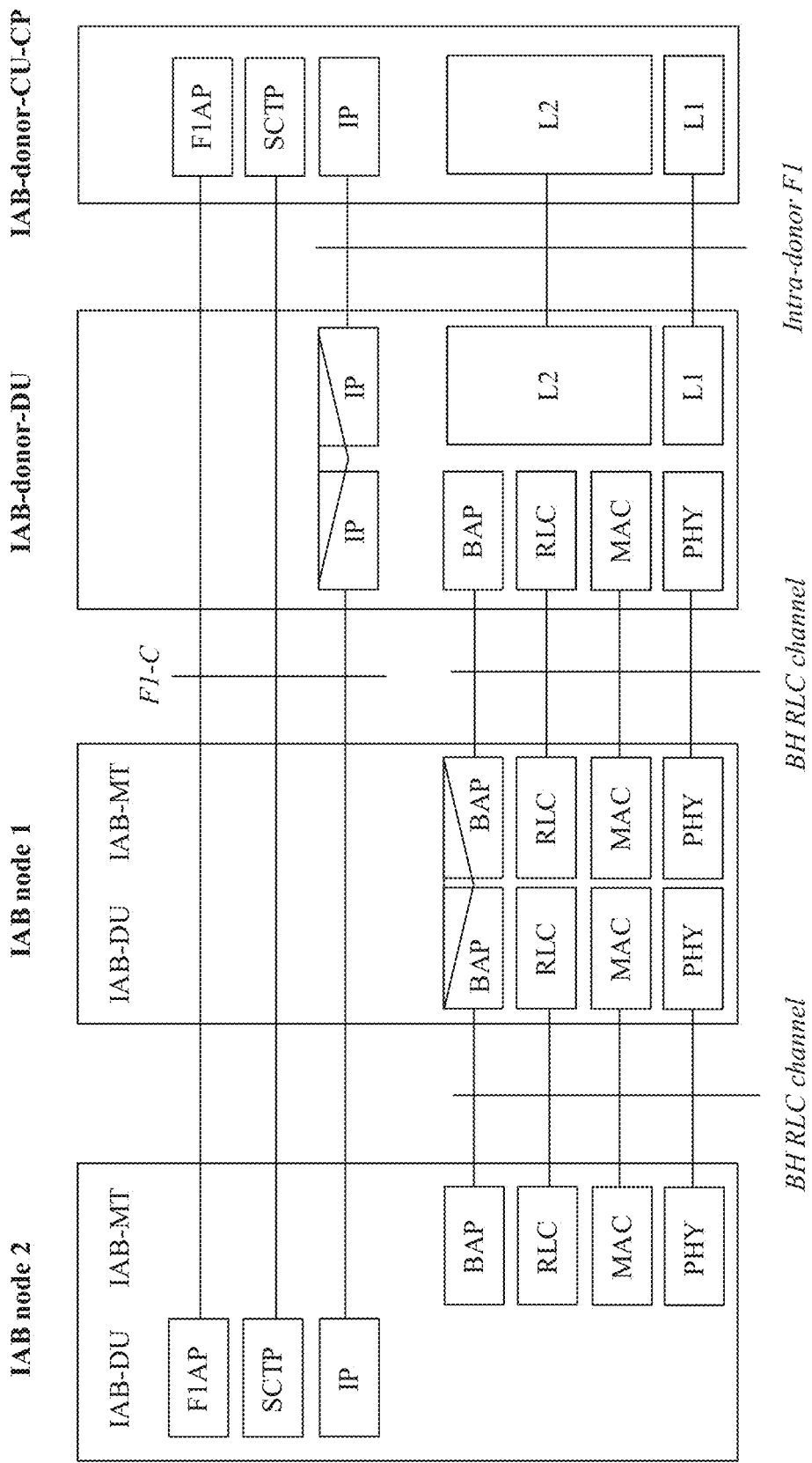
FIG. 5 is a schematic diagram of a control plane protocol stack of an IAB network.

For a control plane protocol stack of the IAB network, refer to FIG. 5. The control plane protocol includes one or more of the following protocol layers: an F1 application protocol (F1 application protocol, F1AP) layer, a stream control transport protocol (stream control transport protocol, SCTP) layer, and an IP layer.

Interface management, management on the IAB-DU, and configuration related to UE context may be performed between the IAB node and the IAB donor through a control plane of the F1/F1*interface.

Currently, each IAB node and a parent node of each IAB node are connected to a same IAB donor, and an MT and a DU of each IAB node may be considered as being managed by a same IAB donor. Therefore, topology management, routing configuration, quality of service (quality of service, QoS) management, and the like in the IAB network including IAB nodes of an IAB donor are all managed by the IAB donor (which may specifically be controlled by the IAB-donor-CU or the IAB-donor-CU-CP). For example, in the scenario shown in FIG. 1, when each IAB node accesses the network, the IAB donor knows a parent node through which the IAB node accesses the network. If the IAB donor is in a CU-DU separation form, the IAB donor may further know an IAB-donor-DU that is connected to the IAB node (namely, the IAB-donor-DU to which the parent node is connected). If topology of the IAB node is updated (for example, adding a new parent node or changing a parent node), topology updating is completed under the control of the IAB donor. This means that when there is only one IAB donor in the IAB network, the IAB donor may know a network topology status of the IAB network including the IAB node and the IAB-donor-DU. Therefore, the IAB donor (which may specifically be the IAB-donor-CU) may perform routing configuration management in the IAB network based on a network topology status. The routing configuration includes how the IAB node/IAB-donor-DU adds routing information of a BAP header to an upper-layer data packet, and configures a routing table of each IAB node/IAB-donor-DU. In addition, because the IAB-donor-CU knows QoS requirements of services of the IAB node and the UE, and management such as establishment and modification of a backhaul RLC channel (backhaul RLC channel, BH RLC CH) of each wireless backhaul link is controlled by the IAB-donor-CU, QoS guarantee of a data packet on the wireless backhaul link is also controlled by the IAB donor (which may specifically be the IAB-donor-CU). Specifically, the IAB-donor-CU provides QoS guarantee for data transmission by controlling a mapping relationship of a data packet on the BH RLC channel of the wireless backhaul link. Mapping of the BH RLC channel of each IAB node/IAB-donor-DU is also performed based on configuration provided by the IAB donor (which may specifically be the IAB-donor-CU).

However, that the IAB donor manages the IAB network only considers a scenario in which one IAB donor manages the IAB network, and controls network topology, routing configuration, BH RLC channel mapping management, and the like in the IAB network. When the IAB node may be connected to a plurality of IAB donors, or when the MT and DU of the IAB node are not managed by a same IAB donor, a service of one IAB node or a service of UE connected to the IAB node may need to be transmitted by using several different types of nodes. For example, the IAB node is connected to two IAB donors. Related several different types of nodes are classified, and may specifically include: an IAB node (that is, an MT and a DU of the IAB node are connected to an IAB-donor-CU 1, and may be managed or configured by the IAB-donor-CU 1) managed by the IAB-donor-CU 1, an IAB node (that is, an MT and a DU of the IAB node are connected to an IAB-donor-CU 2, and may be managed or configured by the IAB-donor-CU 2) managed by the IAB-donor-CU 2, and an IAB node (that is, an MT and a DU of the IAB node are separately connected to two different IAB donors, for example, the MT of the IAB node is connected to the IAB-donor-CU 2, and is managed or configured by the IAB-donor-CU 2, and the DU of the IAB node is connected to the IAB-donor-CU 1, and is managed or configured by the IAB-donor-CU 1) jointly managed by the IAB-donor-CU 1 and the IAB-donor-CU 2.

The following describes a scenario in which the IAB node may be connected to a plurality of IAB donors and the MT and DU of the IAB node are not managed by a same IAB donor.

The following describes a scenario to which a communication method provided in embodiments of this application is applicable.

Figure 6:
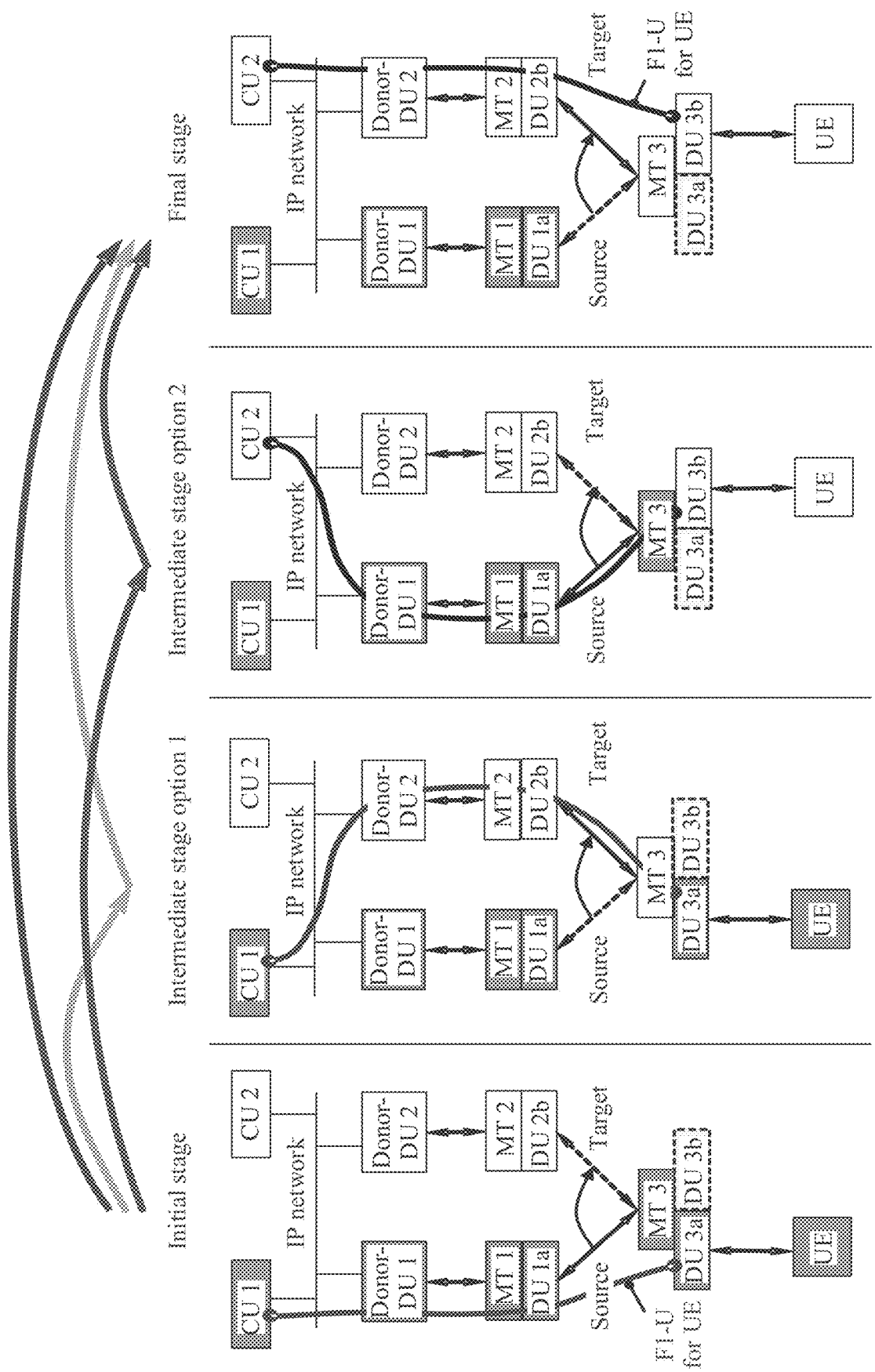
FIG. 6 is a schematic diagram of a cross-donor handover scenario according to an embodiment of this application.

FIG. 6 shows a scenario in which the IAB node performs cross-donor node handover. In the scenario, a third IAB node may hand over from a source parent node (a first IAB node) to a target parent node (a second IAB node). The first IAB node includes an MT part (namely, an MT 1) and a DU part (DU 1). The first IAB node is connected to a first donor node, and is connected to a CU part (CU 1) of the first donor node by using a DU part (namely, a donor-DU 1) of the first donor node. The second IAB node includes an MT part (namely, an MT 2) and a DU part (DU 2). The second IAB node is connected to a second donor node, and is connected to a CU part (CU 2) of the second donor node by using a DU part (namely, a donor-DU 2) of the second donor node. The third IAB node includes an MT part (namely, an MT 3) and a DU part (DU 3). If a plurality of logical DUs are deployed in the IAB node, for example, there are two logical DUs in the third IAB node: a DU 3*a* and a DU 3*b*, the DU of the third node may specifically be the DU 3*a* or the DU 3*b*. The third IAB node may provide an access service for the UE or another IAB node. The handover scenario may be understood as a process in which the third IAB node is handed from the first donor node to the second donor node. The handover scenario may alternatively be understood as a process of handing over from one link (source link) to another link (target link).

When the IAB node performs cross-IAB donor node handover, because both the IAB node and a downstream node need to be handed over to connect to a new IAB donor, there are a plurality of possible execution sequences, for example, from top to bottom, from bottom to top, in a nested (nested) sequence, or in any sequence. With reference to the plurality of different possible execution sequences, a process in which the IAB node performs cross-donor handover may be divided into four periods. With reference to FIG. 6, the four periods are respectively: an initial stage (initial stage), an intermediate stage (intermediate stage) option (option) 1, an intermediate stage option 2, a final stage (final stage). The handover process may be directly from the initial stage to the final stage (without the intermediate stage), from the initial stage to the final stage through the intermediate stage option 1, or from the initial stage to the final stage through the intermediate stage option 2. In addition, the handover process may alternatively include only the initial stage and the intermediate stage, or only the intermediate stage and the final stage. This is not specifically limited herein.

Therefore, in a migration process of the IAB node, descendent UE, and a descendent IAB node, an MT part and a DU part of an IAB node may be separately connected to two different IAB donor nodes. For example, a network status of the intermediate stage (intermediate stage) option 1 shown in FIG. 6 may be understood as a status that may occur when the IAB node and the downstream node perform handover from top to bottom. The network status of the intermediate stage option 2 may be understood as a status that may occur when the IAB node and the downstream node perform handover from bottom to top. For the intermediate stage option 1, the CU 1 may configure or manage the donor-DU 1, the MT 1, a DU 1*a*, the DU 3*a*, and the UE. The CU 2 may configure or manage the donor-DU 2, the MT 2, a DU 2*b*, and the MT 3. For the intermediate stage option 2, the CU 1 may manage the donor-DU 1, the MT 1, the DU 1*a*, and the MT 3. The CU 2 manages the donor-DU 2, the MT 2, the DU 2*b*, the DU 3*b*, and the UE. For a specific manner in which the donor node manages the IAB node, refer to the foregoing descriptions. Details are not described herein again.

Figure 7A:
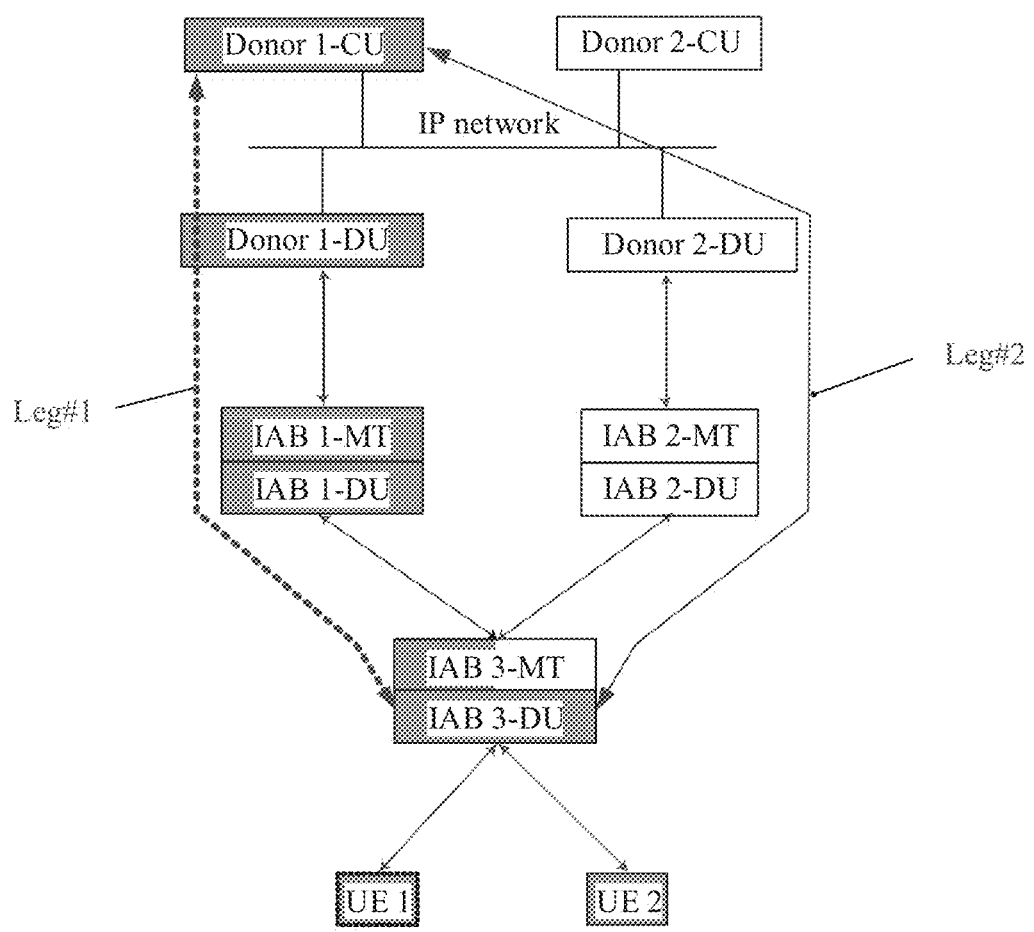
FIG. 7(a) and FIG. 7(b) each are a schematic diagram of a dual-donor connection scenario according to an embodiment of this application.
Figure 7B:
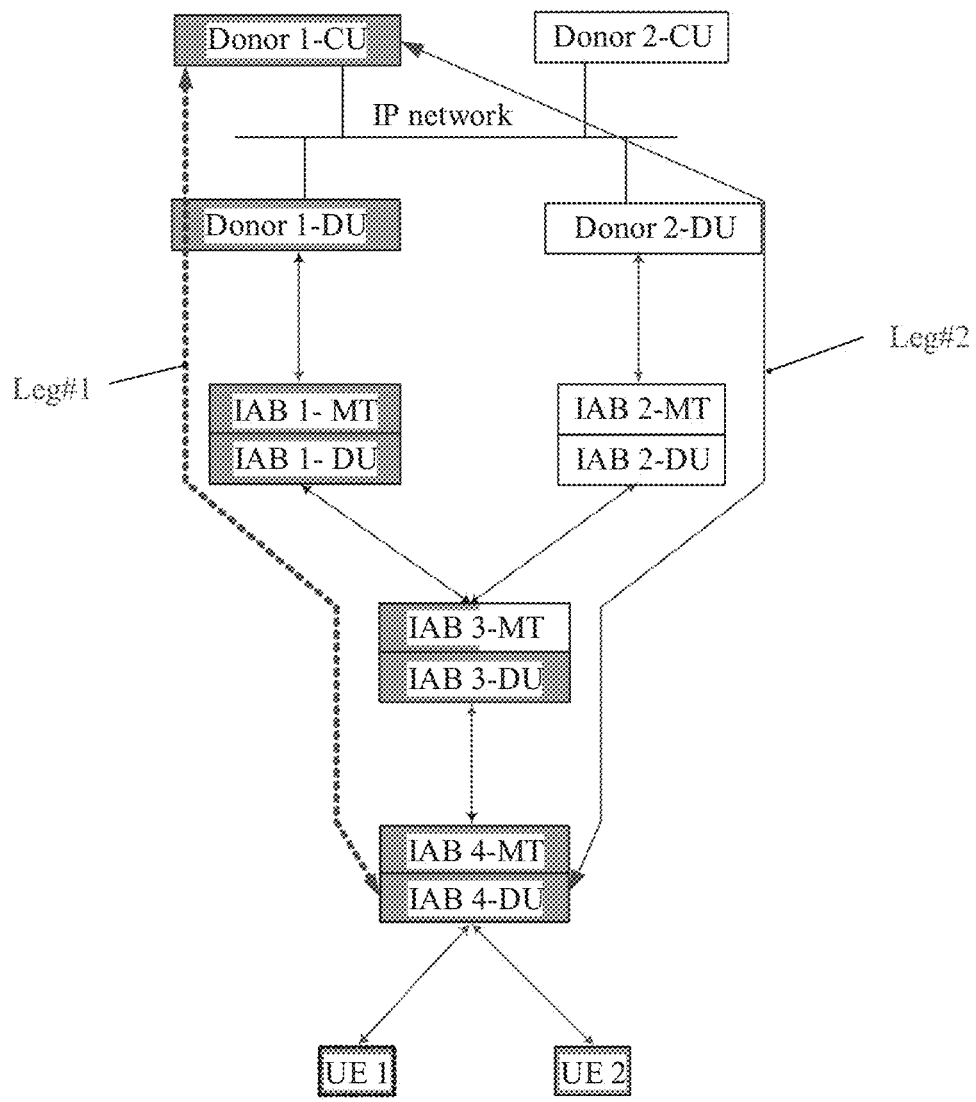

FIG. 7 (*a*) and FIG. 7 (*b*) each show a dual connectivity scenario in which the IAB node is connected to a plurality of donor nodes. In a scenario shown in FIG. 7 (*a*), the third IAB node is connected to networks of two IAB donors in a dual connectivity manner, and a DU part of the third IAB node is connected to a first donor-CU. Communication between the third IAB node and the DU part of the third IAB node may include two links. One link (leg #1) includes: a first donor node-CU (Donor 1-CU), a first donor node-DU (Donor 1-DU), an MT (IAB 1-MT) of the first IAB node, a DU (IAB 1-DU) of the first IAB node, an MT (IAB 3-MT) of the third IAB node, and a DU (IAB 3-DU) of the third IAB node. The other link (leg #2) includes: a first donor node-CU (Donor 1-CU), a second donor node-DU (Donor 2-DU), an MT (IAB 2-MT) of the second IAB node, a DU (IAB 2-DU) of the second IAB node, an MT (IAB 3-MT) of the third IAB node, and a DU (IAB 3-DU) of the third IAB node. In a scenario shown in FIG. 7 (*b*), the third IAB node is connected to networks of two IAB donors in a dual connectivity manner, and a child node, namely, a fourth IAB node (which may specifically be a DU part of the fourth IAB node), of the third IAB node may communicate with the CU of the first donor node over two different links. One link (leg #1) includes: the first donor node-CU (Donor 1-CU), the first donor node-DU (Donor 1-DU), the first IAB node (including the MT (IAB 1-MT) of the first IAB node and the DU (IAB 1-DU) of the first IAB node), the third IAB node (including the MT (IAB 3-MT) of the third IAB node and the DU (IAB 3-DU) of the third IAB node), and the fourth IAB node (including an MT (IAB 4-MT) of the fourth IAB node and a DU (IAB 4-DU) of the fourth IAB node). The other link (leg #2) includes: the first donor node-CU (Donor 1-CU), the second donor node-DU (Donor 2-DU), the second IAB node (including the MT (IAB 2-MT) of the second IAB node and the DU (IAB 2-DU) of the second IAB node), the third IAB node (including the MT (IAB 3-MT) of the third IAB node and the DU (IAB 3-DU) of the third IAB node), and the fourth IAB node (including the MT (IAB 4-MT) of the fourth IAB node and the DU (IAB 4-DU) of the fourth IAB node).

Figure 8:
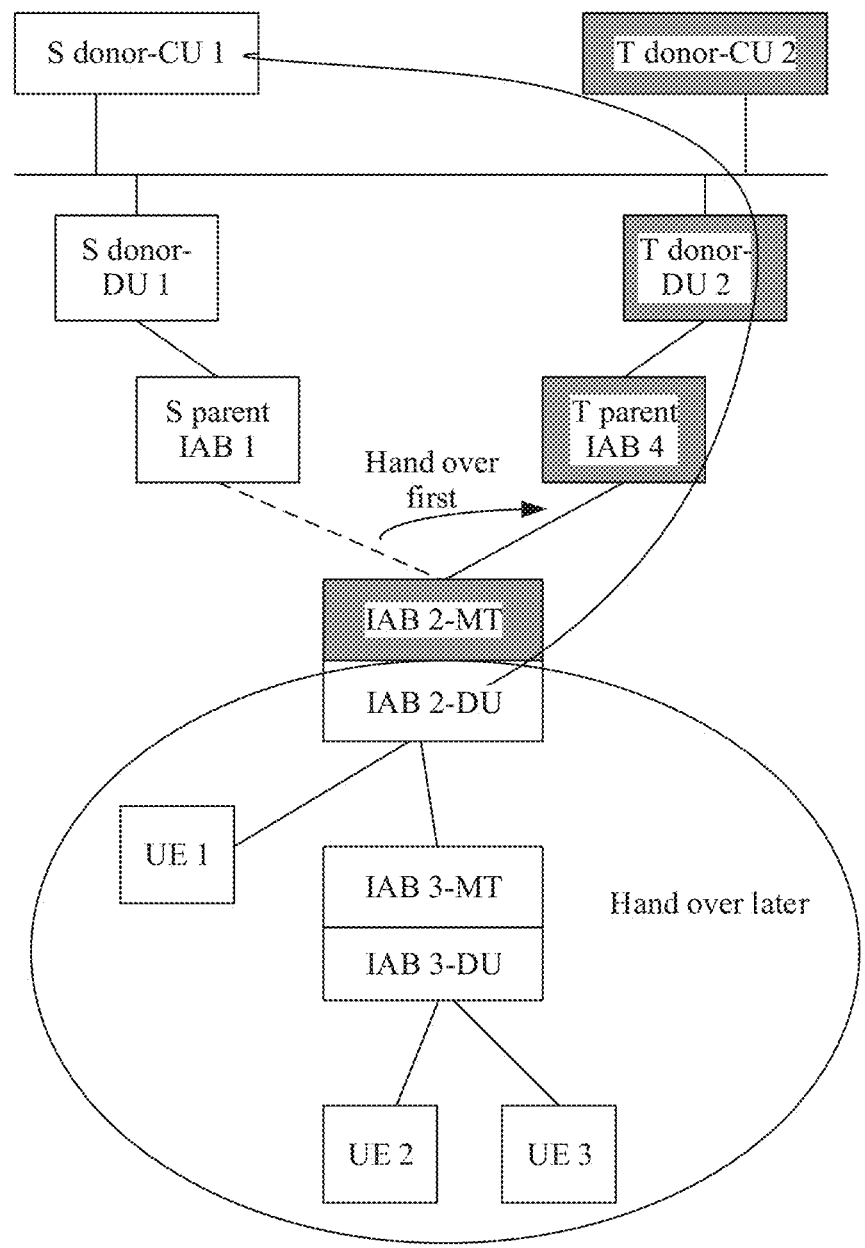
FIG. 8 is a schematic diagram of a cross-donor handover scenario from top to bottom according to an embodiment of this application.

FIG. 8 is a schematic diagram of a cross-donor handover scenario from top to bottom according to an embodiment of this application. Handover is performed on the IAB node 2 (which may be referred to as an IAB node 2 or IAB 2). The IAB 2 may provide access and backhaul services for one or more UEs/child nodes. FIG. 8 shows one UE 1 that accesses a cell served by the IAB 2, and a child node IAB 3. The IAB 3 further includes UE 2 and UE 3, and the UE 2 and the UE 3 access a cell served by the IAB 3. It may be understood that, during actual application, the IAB 2 may further have one or more grandchild nodes (an IAB node connected to the IAB 2 through at least two hops of wireless backhaul links).

The IAB 3 may further serve more UEs, child nodes, or grandchild nodes. This is not specifically limited herein.

After the IAB 2 is handed over from a source parent node (namely, an S-parent IAB 1 shown in FIG. 8) and connected to a target parent node (namely, a T-parent IAB 4 shown in FIG. 8), the downstream node IAB 3 of the IAB 2, the UE 1, and the UE 2 perform handover following IAB 2.

As described above, in a process in which the IAB node performs handover across IAB donor nodes, an MT part and a DU part of an IAB node may be separately connected to two different IAB donor nodes. As shown in FIG. 8, when the IAB 2-MT completes handover, the MT part of the IAB 2 is connected to a target IAB donor (namely, a T donor-CU 2 shown in FIG. 8). However, the IAB 2-DU part is still connected to a source IAB donor (for example, an S donor-CU 1 shown in FIG. 8), and the downstream child node (IAB 3) of the IAB 2 and the UE (UE 1, UE 2, and UE 3) are also still connected to the S donor-CU 1. In this case, to transmit a data packet to the S donor-CU 1, the IAB 3 needs to transmit the data packet on a path shown in the curve in FIG. 8. In other words, the data packet needs to pass through the IAB 2 (a node that is jointly managed by the two donor nodes), the IAB 4, and a T donor-DU 2 (both the IAB 4 and the T donor-DU 2 are nodes managed by the T donor-CU 2) In addition, the data packet is transmitted by using an IP transmission network between the T donor-DU 2 and the S donor-CU 1.

Figure 9:
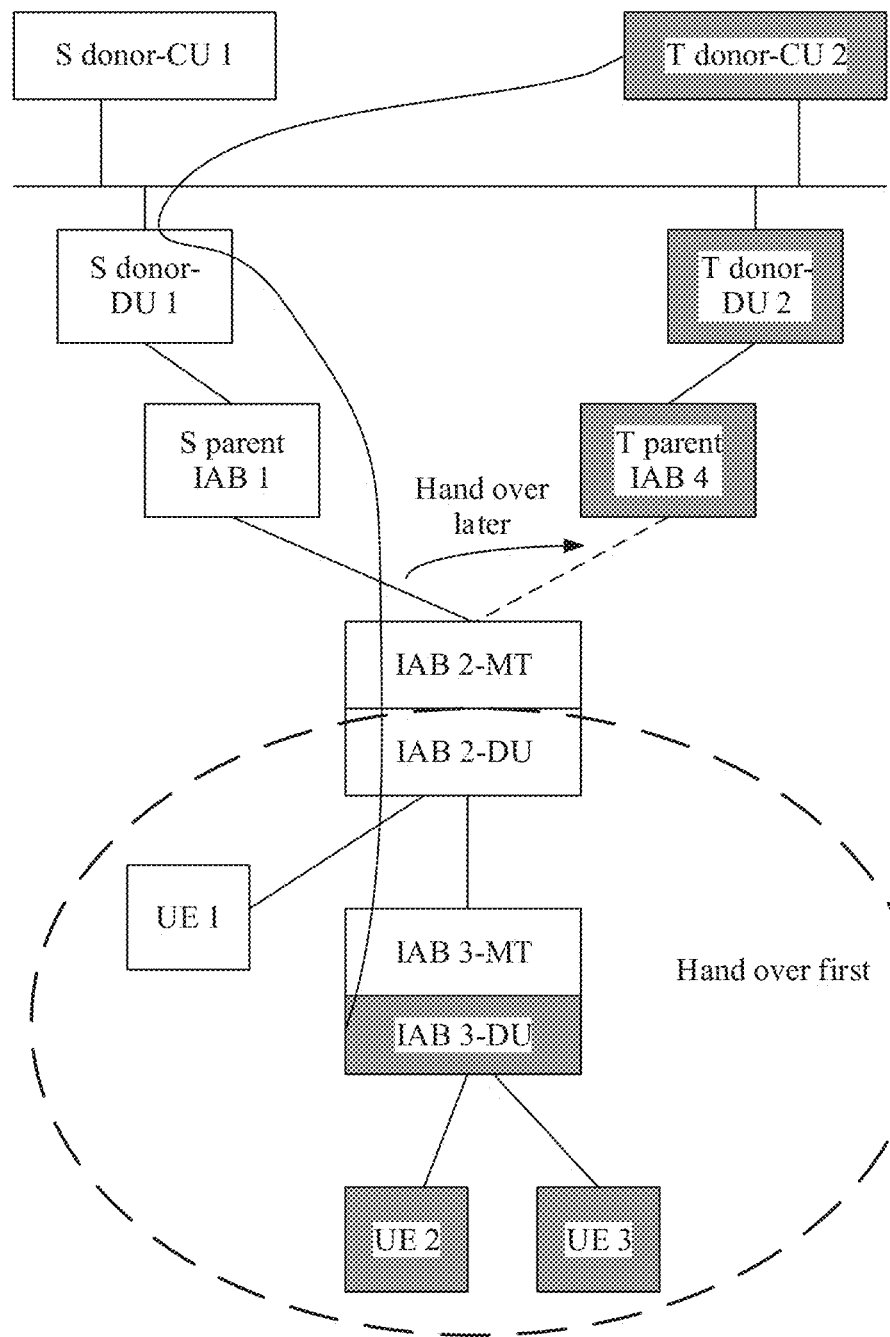
FIG. 9 is a schematic diagram of a cross-donor handover scenario from bottom to top according to an embodiment of this application.

FIG. 9 is a schematic diagram of a cross-donor handover scenario from bottom to top according to an embodiment of this application. A structure of the scenario is similar to an architecture shown in FIG. 8. Details are not described herein again. Different from FIG. 8, FIG. 9 is a cross-donor handover scenario from bottom to top. The IAB 2 and a descendent node perform handover from the S donor-CU 1 to the T donor-CU 2, and the IAB 2 and the downstream node are considered as a group. If a handover execution sequence is from bottom to top, the downstream node performs handover first, and the MT of the IAB 2 performs handover last. In this case, if the IAB 3-DU, the UE 2, and the UE 3 are handed over and connected to the T donor-CU 2, and the IAB 2 is still connected to the S-parent IAB 1, although the IAB 3-DU is managed by the T donor-CU 2, a control plane of the IAB 3-MT part is still connected to the S donor-CU 1. However, data and signaling transmission (refer to a path indicated by the curve in FIG. 9) between the IAB 3-DU part and the T donor-CU 2 needs to be performed by using a node (IAB 2, IAB 1, and S donor-DU 1) controlled by the S donor-CU 1. Therefore, the transmission path also includes a node controlled by two different donor nodes.

Figure 10:
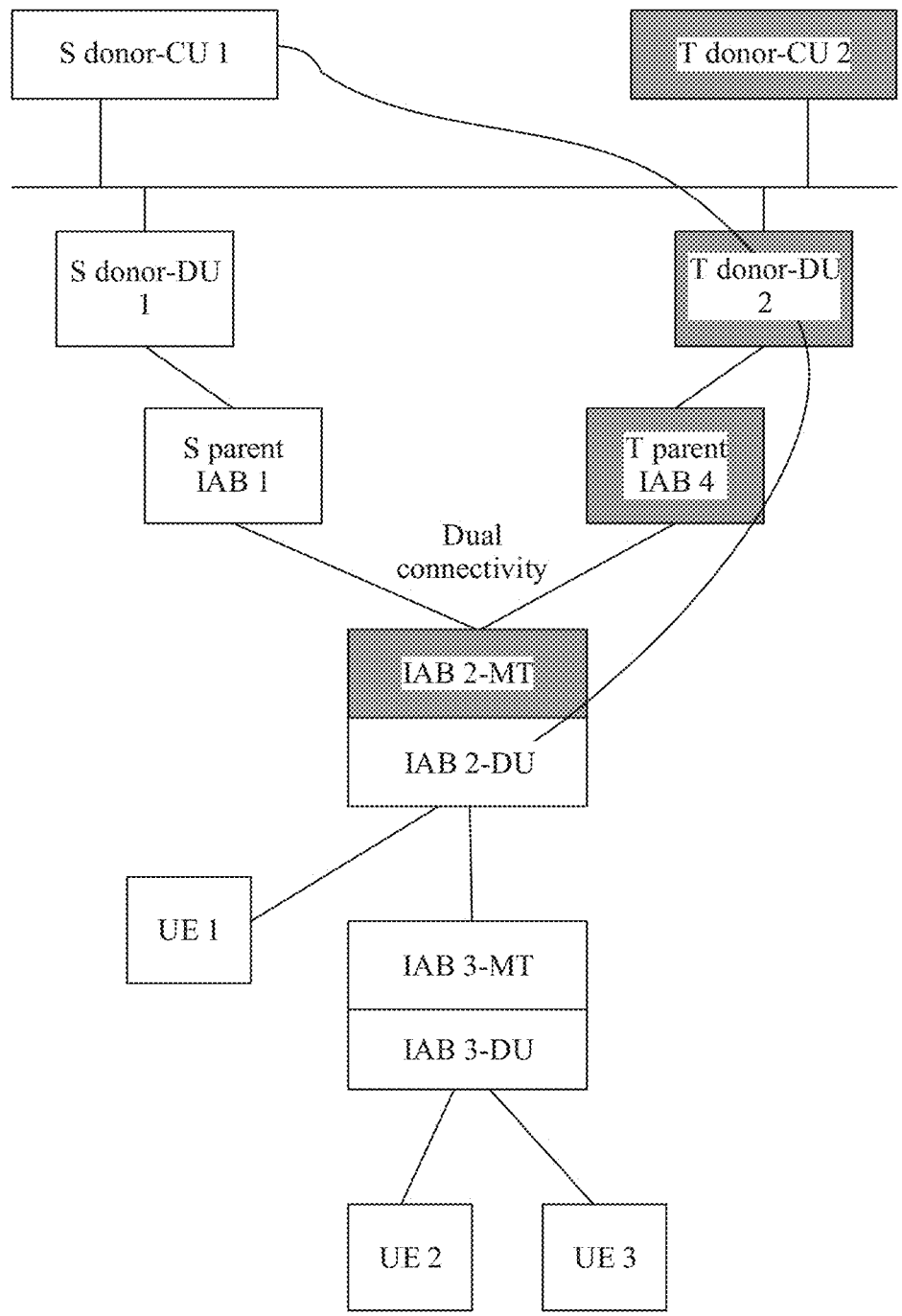
FIG. 10 is a schematic diagram of another dual-donor connection scenario according to an embodiment of this application.

FIG. 10 is a schematic diagram of another dual-donor connection scenario according to an embodiment of this application. A structure of the scenario is similar to an architecture shown in FIG. 8. Details are not described herein again. Different from FIG. 8 and FIG. 9, FIG. 10 is a dual-donor connection scenario. The IAB 2 first establishes connection to a first parent node (namely, the S-parent IAB 1 shown in FIG. 10), and then establishes connection to a second parent node (namely, the T-parent IAB 4 shown in FIG. 10) in a manner of adding a secondary station. The first parent node is connected to the first donor node (namely, the S donor-CU 1 shown in FIG. 10), and the second parent node is connected to the second donor node. (namely, the T donor-CU 2 shown in FIG. 10). The DU part of the IAB 2 is connected to the S donor-CU 1, but the MT part of the IAB 2 is connected to both the cell served by the IAB 1 (specifically, the DU part of the IAB 1) and the cell served by the IAB 4 (specifically, the DU part of the IAB 4). Both the child node and the downstream UE of the IAB 2 still maintain a connection relationship with the S donor-CU 1. Therefore, a service provided by the IAB 2 for the UE and a service (including a service of the downstream UE 2 and the UE 3) of the IAB 3 may be transmitted by using the IAB 2, the IAB 4, and the T donor-DU 2.

It may be understood that, during actual application, there may be more IAB nodes and/or more donor nodes in the architectures in FIG. 6 to FIG. 10. In addition, the IAB network may be divided into more network segments, and the network segments are managed by different donor nodes.

Problem 1: In the scenarios shown in FIG. 6 to FIG. 10, in the wireless backhaul network, service transmission needs to be performed on a transmission path obtained through stitching IAB nodes controlled by different donor nodes. On the wireless backhaul path, how to perform routing management and configuration of the IAB network, radio bearer mapping, and the like needs to be resolved, to ensure that a data packet can be correctly routed and transmitted in cross-donor network topology, and provide appropriate QoS guarantee during transmission.

Figure 11:
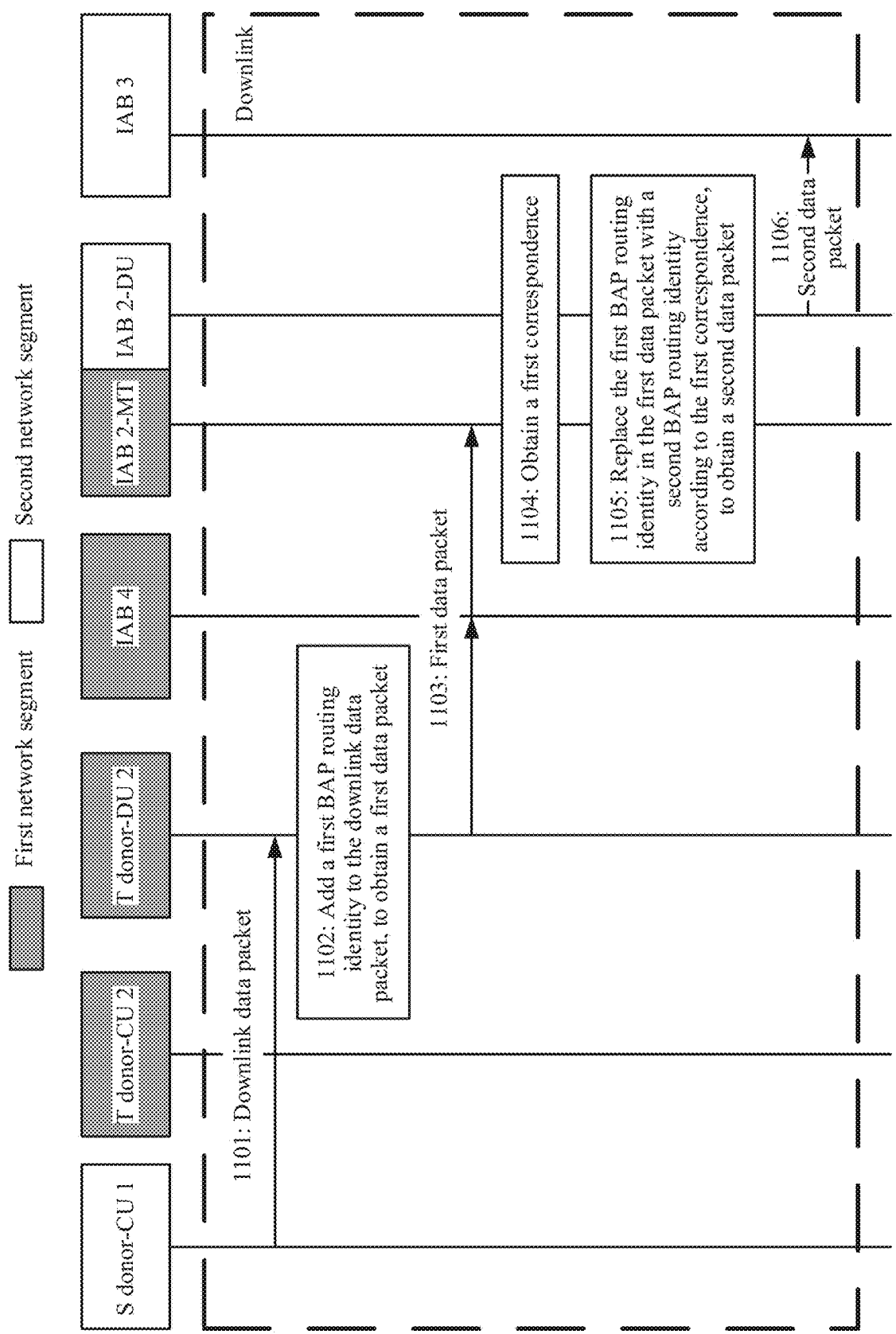
FIG. 11 is a schematic flowchart of a communication method according to an embodiment of this application.
Figure 12:
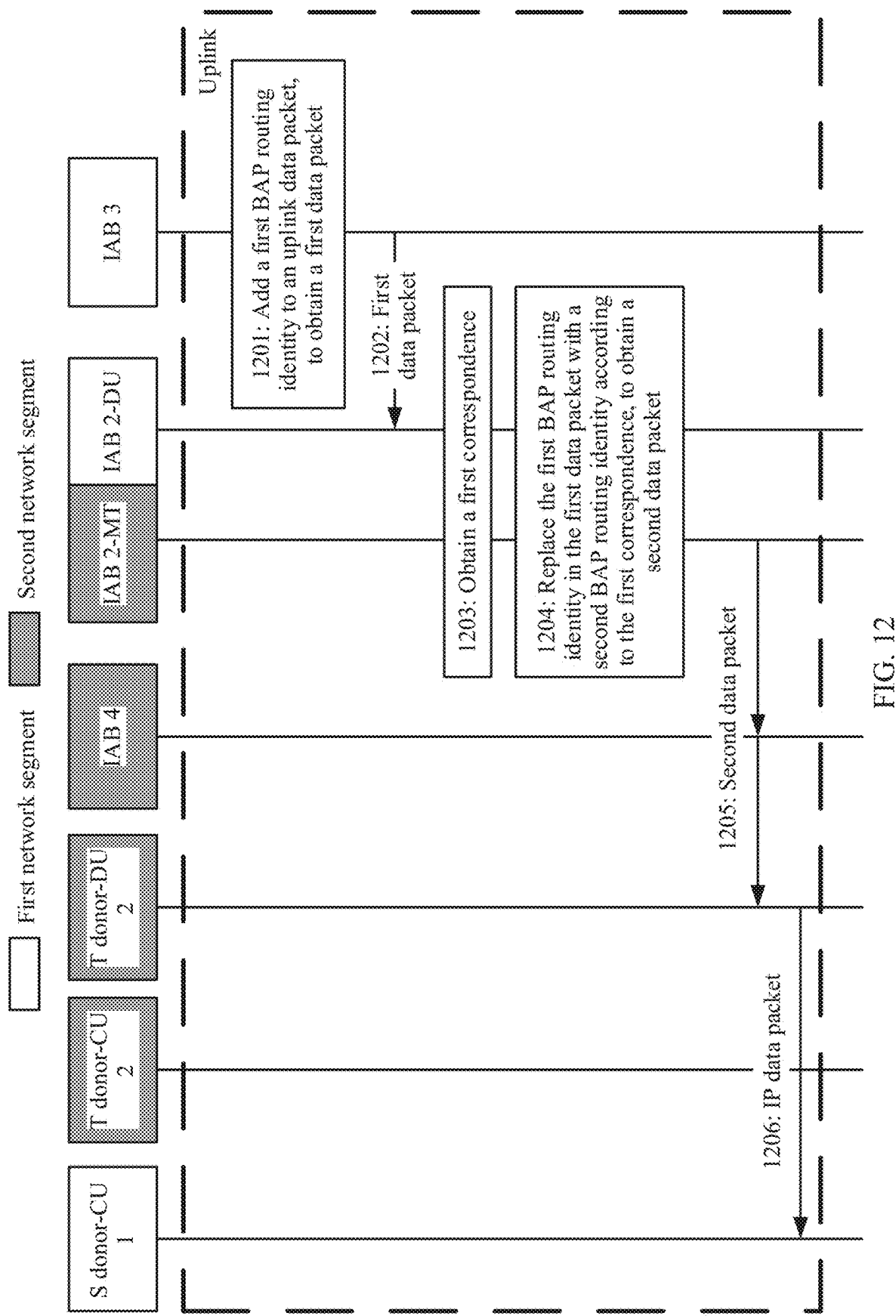
FIG. 12 is another schematic flowchart of a communication method according to an embodiment of this application.

For the problem 1, an embodiment of this application provides a communication method (For details, refer to embodiments corresponding to FIG. 11 and FIG. 12). An overall solution is as follows: A first BAP routing identity is information used for data packet routing in a first network segment including IAB nodes controlled by a first donor node, and a second BAP routing identity is information used for data packet routing in a second network segment including IAB nodes controlled by a second donor node. A first IAB node (namely, a boundary node) may be considered as a proxy node at a BAP layer in the two network segments, and is responsible for converting BAP routing identities of a data packet in the two network segments, to implement normal transmission of the data packet in the two network segments.

The following describes the communication method according to an embodiment of this application.

Refer to FIG. 11. An embodiment of the communication method in this embodiment of this application includes step 1101 to step 1106.

In this embodiment of this application, the communication method shown in FIG. 11 is applied to downlink transmission of a data packet. For ease of understanding, the communication method is described with reference to the architecture in FIG. 8. Therefore, a first IAB node in this embodiment of this application is the IAB 2 in FIG. 8, a parent node of the first IAB node is the IAB 4, and a child node of the first IAB node is the IAB 3. A first donor node is the T donor (including the T donor-CU 2 and the T donor-DU 2), a second donor node is the S donor (including the S donor-CU 1 and the S donor-DU 1), the first donor node is different from the second donor node, and a first network segment managed by the first donor node (CU 2) includes the T donor, the T IAB parent node (namely, the IAB 4), and an MT part (namely, the IAB 2-MT) of the first IAB node. A second network segment managed by the second donor node (CU 1) includes the S donor, a DU part (namely, the IAB 2-DU) of the first IAB node, and the child node (IAB 3) of the first IAB node.

For downlink transmission, a previous-hop node of the first IAB node is the parent node (namely, the IAB 4) of the first IAB node, and a next-hop node of the first IAB node is the child node (namely, the IAB 3) of the first IAB node. The first IAB node (IAB 2) is located in the first network segment and the second network segment. It may also be understood that the first IAB node (IAB 2) is managed by the first donor node (T donor) and the second donor node (S donor). Specifically, the MT part (IAB 2-MT) of the first IAB node is managed by the first donor node (T donor), and the DU part (IAB 2-DU) of the first IAB node is managed by the second donor node (S donor). That the donor node manages the IAB node may be understood as control plane connection (for example, RRC connection and/or F1 connection) between the donor node and the IAB node, and necessary configuration (for example, routing and bearer mapping related to configuration) may be provided to the IAB node through the control plane connection. It may be understood that the first IAB node (IAB 2) may also be referred to as a boundary IAB node.

Step 1101: The S donor-CU 1 sends a downlink data packet to the T donor-DU 2.

Optionally, the S donor-CU 1 sends the downlink data packet to the T donor-DU 2 by using an IP network, and correspondingly, the T donor-DU 2 receives the downlink data packet.

In an embodiment, the downlink data packet is a data packet that needs to be sent to the IAB node in the second network segment, for example, a data packet sent to the IAB 2-DU part, or a data packet sent to the DU part of the IAB 3. The following is described by using an example in which the data packet is a data packet sent to the DU part of the IAB 3.

Step 1102: The T donor-DU 2 adds the first BAP routing identity to the downlink data packet, to obtain a first data packet.

The T donor-DU 2 (which is referred to as a DU 2 in the following) may add the first BAP routing identity to the downlink data packet based on configuration information provided by the T donor-CU 2. Therefore, before the T donor-DU 2 adds the first BAP routing identity to the downlink data packet, the T donor-CU 2 (which is referred to as a CU 2 in the following) needs to configure the DU 2. Content configured by the CU 2 for the DU 2 may include: allocating a BAP layer identity (BAP address) to the DU 2, establishing or modifying configuration information required by the DU 2 for a BH RLC CH between the DU 2 and a child node (for example, the IAB 4) of the DU 2, and providing the DU 2 with routing configuration for downlink transmission, and with mapping configuration of a BH RLC CH between the DU 2 and the next-hop node (for example, the IAB 4).

Optionally, the configuration information required by the BH RLC CH may include at least one of an identity of the BH RLC CH, a QoS parameter corresponding to the BH RLC CH, a priority corresponding to the BH RLC CH, and the like.

Optionally, the routing configuration used for downlink transmission may include a correspondence between IP header information and the first BAP routing identity, a correspondence between the first BAP routing identity and an identity (for example, an identity of the IAB 4) of the next-hop node, and the like.

Optionally, the mapping configuration of the BH RLC CH between the DU 2 and the next-hop node (for example, the IAB 4) may be a mapping relationship between the IP header information and the BH RLC CH.

Optionally, the IP header information includes at least one of a source IP address, a destination IP address, a differentiated services code point (differentiated services code point, DSCP), a flow label, and the like. The flow label is a flow label field of an IPv6 packet header.

Optionally, in the mapping configuration of the BH RLC CH between the DU 2 and the next-hop node (for example, the IAB 4), when the CU 2 indicates the mapping relationship between the IP header information and the BH RLC CH to the DU 2, the BH RLC CH may be jointly identified by using the identity (for example, a BAP layer identity of the IAB 4) of the next-hop node and an identity (namely, a BH RLC CH ID) of the BH RLC CH.

If the downlink data packet is a downlink data packet that needs to be sent to the IAB 2-DU part, the CU 2 needs to know a third correspondence, to configure a correct first BAP routing identity for the DU 2, so as to correctly configure the DU 2. The third correspondence is a correspondence between an IP address of the DU (for example, the IAB 2-DU) in the first IAB node and a BAP address of an MT (for example, the IAB 2-MT) in the first IAB node. If the downlink data packet is a downlink data packet that needs to be sent to the downstream node (for example, the IAB 3-DU part) of the IAB 2, the CU 2 needs to know a fourth correspondence, to configure a correct first BAP routing identity for the DU 2, so as to correctly configure the DU 2. The fourth correspondence is a correspondence between a BAP address of an MT (for example, the IAB 2-MT) in the first IAB node and an IP address of a DU in the downstream node (for example, the IAB 3) of the first IAB node.

There are three manners in which the CU 2 obtains the third correspondence, and the three manners are separately described in the following.

1. Because the CU 2 manages the IAB 2-MT, on the one hand, the CU 2 may allocate a BAP address to the IAB 2-MT, and on the other hand, the IAB 2-MT may notify the CU 2 of the IP address of the IAB 2-DU by using a radio resource control (radio resource control, RRC) message. Therefore, the CU 2 may learn of the IP address of the IAB 2-DU that is jointly deployed by the CU 2 and the IAB 2-MT, to obtain the third correspondence.

2. Because the CU 2 manages the IAB 2-MT, on the one hand, the CU 2 may allocate a BAP address to the IAB 2-MT, and on the other hand, the IAB 2-MT may request, from the CU 2, an IP address for the IAB 2-DU part by using a radio resource control (radio resource control, RRC) message. Therefore, the CU 2 may send, to the IAB 2-MT by using the RRC message, the IP address allocated to the IAB 2-DU, and learn of the IP address of the IAB 2-DU that is jointly deployed by the CU 2 and the IAB 2-MT, to obtain the third correspondence.

3. Because the CU 1 manages the IAB 2-DU, on the one hand, the CU 1 may know an IP address of the IAB 2-DU, and on the other hand, the IAB 2-DU may obtain, from the IAB 2-MT, the BAP address (BAP address or BAP layer identity) configured by the CU 2 for the IAB 2-MT, and notify the CU 1 of the BAP address of the IAB 2-MT (for example, the BAP address is carried in an F1AP message to notify the CU 1). Therefore, the CU 1 may obtain the BAP address of the IAB 2-MT and the IP address of the IAB 2-DU, and further obtain the third correspondence. The CU 1 then sends the third correspondence to the CU 2. Specifically, the CU 1 may add the third correspondence to an XnAP message, and send the XnAP message to the CU 2. Specifically, the CU 1 may add the third correspondence to the XnAP message, and send the XnAP message to the CU 2. For example, the XnAP message sent by the CU 1 to the CU 2 includes the BAP address of the IAB 2-MT and one or more IP addresses of the DU part of the IAB 2.

A manner in which the CU 2 obtains the fourth correspondence is as follows: The IAB 2-DU may obtain, from the IAB 2-MT, the BAP address (BAP address or BAP layer identity) configured by the CU 2 for the IAB 2-MT, and notify the CU 1 of the BAP address of the IAB 2-MT by using the F1AP message. Because downstream nodes of the IAB 2 are managed by the CU 1, the CU 1 may learn the downstream nodes of the IAB 2 and IP addresses of DU parts of the downstream nodes, and further determine the fourth correspondence. The CU 1 notifies the CU 2 of the fourth correspondence. Specifically, the CU 1 may add the fourth correspondence to the XnAP message, and send the XnAP message to the CU 2. For example, the XnAP message sent by the CU 1 to the CU 2 includes an identity (for example, a BAP address) of the IAB 2-MT, and IP addresses of one or more downstream nodes of the IAB 2 (which may specifically be the IP addresses of the DU parts of the downstream nodes). It is clear that the CU 1 may also send another identity (for example, an identity allocated to the IAB 2-MT on the Xn interface, namely, a UE XnAP ID) of the IAB 2-MT and an IP address of the DU part of the downstream node of the IAB 2. The CU 2 may determine the IAB 2-MT based on the another identity of the IAB 2-MT in the XnAP message, and because the CU 2 allocates the BAP address to the IAB 2-MT, the CU 2 may determine the fourth correspondence.

The DU 2 receives the downlink data packet, selects the first BAP routing identity based on the configuration configured by the CU 2 on the DU 2 and the IP header information of the downlink data packet, and adds the first BAP routing identity to the header information of the BAP layer, to obtain the first data packet.

The first BAP routing identity in this embodiment of this application includes a first BAP address and/or a first path identity.

Optionally, if the first BAP routing identity includes the first BAP address, in a process of transmitting the downlink data packet shown in FIG. 11, the first BAP address is a BAP address of a last-hop node (which may also be understood as a destination IAB node in the first network segment) in the first network segment. For the architecture shown in FIG. 8, because downlink transmission is performed, the first BAP address used in the first network segment is a BAP address, namely, a BAP address of the IAB 2, of the destination IAB node in the first network segment.

Optionally, for FIG. 8, the first BAP address is the BAP address of the IAB 2, and the first path identity is an identity of a downlink transmission path from the DU 2 to the IAB 2.

Step 1103: The T donor-DU 2 sends the first data packet to the IAB 2 by using the IAB 4, and correspondingly, the IAB 2 receives the first data packet.

After obtaining the first data packet, the DU 2 determines a BH RLC CH of an egress link based on the configuration configured by the CU 2 on the DU 2 in step 1102 and the IP header information of the first data packet, and sends the first data packet to the IAB 4 over the BH RLC CH of the egress link. Specifically, the T donor-DU 2 may send the first data packet to the MT in the IAB 4.

Because the IAB 4 is managed by the CU 2, the CU 2 may provide routing of downlink transmission and mapping configuration of the BH RLC CH for the IAB 4, and the routing of downlink transmission may be a correspondence between the first BAP routing identity and the identity of the next-hop node (for example, the IAB 2). The mapping configuration of the BH RLC CH may be a mapping relationship between a BH RLC CH of an ingress link between the IAB 4 and a previous-hop node (for example, the DU 2) and the BH RLC CH of the egress link between the IAB 4 and the next-hop node (for example, the IAB 2).

The IAB 4 receives the first data packet, determines the BH RLC CH of the egress link based on the configuration configured by the CU 2 on the IAB 4 and the first data packet, and sends the first data packet to the IAB 2 over the BH RLC CH of the egress link.

The IAB 2 receives the first data packet sent by the previous-hop node (namely, the IAB 4) in the first network segment.

Step 1104: The IAB 2 obtains a first correspondence.

The first correspondence in this embodiment of this application includes a correspondence between the data packet (which may be the BAP routing identity and/or the IP header information of the data packet) and a second BAP routing identity. In other words, the first correspondence may include a correspondence between the first BAP routing identity and the second BAP routing identity in the first data packet, and/or the first correspondence may include a correspondence between the IP header information of the first data packet and the second BAP routing identity. The second BAP routing identity includes a second BAP address and a second BAP path identity, and is used for routing of a wireless backhaul link from the IAB 2 to the downstream node of the IAB 2 in the second network segment. The second BAP routing identity may indicate a transmission path from the IAB 2 to the downstream node of the IAB 2 in the second network segment. The IP header information may specifically be any one or more of the following information: a source IP address, a destination IP address, a DSCP, and a flow label.

Further, the first correspondence may further include at least one of the following items.

1. Indication information: The indication information indicates that the first correspondence is used for uplink transmission and/or downlink transmission. For uplink transmission, a previous-hop node of the boundary IAB node (namely, the IAB 2) is a child node of the IAB 2, and a next-hop node of the IAB 2 is a parent node of the IAB 2. For downlink transmission, the previous-hop node of the IAB 2 is a parent node of the IAB 2, and the next-hop node of the IAB 2 is a child node of the IAB 2. For example, the indication information indicates a transmission direction to which the first correspondence is specifically applicable. For example, if the first correspondence includes a correspondence between the first BAP routing identity and the second BAP routing identity in the first data packet, the indication information may indicate that the correspondence between the first BAP routing identity and the second BAP routing identity is applicable to transmission in an uplink direction, transmission in a downlink direction, or transmission in both an uplink direction and a downlink direction. Alternatively, if the first correspondence includes a correspondence between the IP header information of the first data packet and the second BAP routing identity, the indication information may indicate that the correspondence between the IP header information and the second BAP routing identity is specifically applicable to transmission in an uplink direction, transmission in a downlink direction, or transmission in both an uplink direction and a downlink direction.

2. Identifier related to the first network segment: The identity corresponds to the first BAP routing identity. For example, the first BAP routing identity corresponds to an identity of a donor node (which may specifically be a donor-CU or a donor-CU-CP) to which the first network segment belongs. In this embodiment of this application, the identity of the donor node may be a gNB ID of the donor node, an IP address of the donor-CU or the donor-CU-CP, or another identity allocated by a network management system (OAM) to the donor-CU or the donor-CU-CP. For example, the previous-hop node is in the first network segment, and the next-hop node is in the second network segment. The identity related to the first network segment corresponds to the first BAP routing identity, and may be understood as one or more nodes, located in the first network segment, on the transmission path determined by the first BAP routing identity. The first BAP routing identity is used to identify a transmission path to the first IAB node in the first network segment.

3. Identifier related to the second network segment: The identity corresponds to the second BAP routing identity. For example, the second BAP routing identity corresponds to an identity of a donor node (which may specifically be a donor-CU) to which the second network segment belongs. The identity related to the second network segment corresponds to the second BAP routing identity, and may be understood as one or more nodes, located in the second network segment, on the transmission path determined by the second BAP routing identity. The second BAP routing identity is used to identify a transmission path, in the second network segment, from the first IAB node to a target node in the second network segment.

4. Identifier of a previous-hop node: The identity corresponds to the first BAP routing identity. That the identity of the previous-hop node corresponds to the first BAP routing identity may be understood as that the previous-hop node is a previous-hop node of the first IAB node on the transmission path indicated by the first BAP routing identity.

5. Identifier of a next-hop node: The identity corresponds to the second BAP routing identity. That the identity of the next-hop node corresponds to the first BAP routing identity may be understood as that the next-hop node is a next-hop node of the first IAB node on the transmission path indicated by the first BAP routing identity.

It is clear that the first correspondence may include a plurality of cases in the several cases. For example, the first correspondence may include an identity that is of the CU to which the first network segment belongs and that corresponds to the first BAP routing identity, and an identity that is of the CU to which the second network segment belongs and that corresponds to the second BAP routing identity; and/or the first correspondence may further include the identity of the previous-hop node that corresponds to the first BAP routing identity and the identity of the next-hop node that corresponds to the second BAP routing identity.

It may be understood that the several cases are merely examples. During actual application, the first correspondence may further include other content. This is not specifically limited herein.

In addition, the plurality of cases and the first correspondence may be indicated by using a same correspondence (for example, the first correspondence), or may be indicated by using different information (for example, the first correspondence and one piece of indication information). If the plurality of cases and the first correspondence are indicated by using different information, the plurality of cases and the first correspondence are usually configured by a same donor node.

In this embodiment of this application, the identity of the previous-hop node or the identity of the next-hop node (which is referred to as the identity of the previous-hop/next-hop node) may be a BAP address of the previous-hop/next-hop node, or an IP address of the previous-hop/next-hop node. During actual application, there may alternatively be another case. For example, when the previous-hop/next-hop node is the child node of the IAB node 2, an identity of the child node may be a C-RNTI of the child node and an identity of a cell accessed by the child node, or an identity (for example, a gNB-DU UE F1AP ID allocated by the IAB node 2 to the child node and/or a gNB-CU UE F1AP ID allocated by the donor-CU to the child node) that is of the child node and that is of the control plane on the F1 interface between the IAB node 2 and the donor node (which may specifically be the donor-CU or the donor-CU-CP). A specific form of the identity is not limited herein.

Because the MT and the DU of the IAB 2 are controlled by different IAB donor nodes, the IAB 2-MT may be connected to the CU 2 by using RRC, and the IAB 2-DU may be connected to the CU 1 through the F1, routing configuration required by the IAB node 2 may be configured by the CU 1 or the CU 2. In other words, there are two manners in which the IAB 2 obtains the first correspondence in this embodiment of this application, and the two manners are separately described in the following:

1: The CU 1 determines the first correspondence, and sends the first correspondence to the IAB 2. It may also be understood that the CU 1 configures the first correspondence for the IAB 2.

The CU 2 notifies the CU 1 of the correspondence, configured by the CU 2 for the DU 2, between the IP header information and the first BAP routing identity. The CU 2 may notify the CU 1 of the correspondence by using the XnAP message. Therefore, the CU 1 may know an IAB node (for example, the IAB 3, which may specifically be the DU part of the IAB 3) that is managed by the CU 1 and that corresponds to the destination IP address in the IP header information. Then, the CU 1 may determine a BAP address (which is also referred to as a second BAP address, for example, the BAP address of the IAB 3), in the second BAP routing identity, to which the IP header information or the first BAP routing identity is to be mapped. The second BAP path identity (which is also referred to as a second BAP routing ID) in the second BAP routing identity may be determined by the CU 1. For example, the CU 1 determines a path to the IAB 3 based on a load status and/or link quality of the second network segment. Further, after determining the BAP address and the second path identity in the second BAP routing identity, the CU 1 determines the second BAP routing identity. With reference to content of the IP header information obtained from the CU 2 and content of the first BAP routing identity, the CU 1 may determine the first correspondence, and send the first correspondence to the IAB 2. Correspondingly, the IAB 2 receives the first correspondence sent by the CU 1.

Optionally, the CU 1 sends the first correspondence to the IAB 2-DU by using the F1AP.

2: The CU 2 determines the first correspondence, and sends the first correspondence to the IAB 2. It may also be understood that the CU 2 configures the first correspondence for the IAB 2.

In this possible manner, the CU 1 needs to send, to the CU 2, one or more BAP routing identities allocated by the CU 1 in the second network segment. The one or more BAP routing identities indicate one or more transmission paths from the IAB 2 to the downstream node of the IAB 2 in the second network segment, and include the second BAP routing identity. In addition, the CU 1 further needs to send the mapping relationship between the IP address and the BAP address of the downstream node of the IAB node 2 to the CU 2. When configuring, for the donor-DU 2, a manner of determining the first BAP routing identity based on the IP header information, the CU 2 predetermines that a target IP address in the IP header information is the IP address of the IAB 3. Therefore, the CU 2 may determine that an IAB node corresponding to the first BAP routing identity is the downstream node (for example, the IAB 3) of the IAB 2. With reference to the correspondence between the IP address and the BAP address of the IAB 3 that is sent by the CU 1, the CU 2 may further determine the BAP address of the IAB 3 in the second network segment, and then select a second BAP routing identity from the one or more BAP routing identities that include the BAP address of the IAB 3 and that are provided by the CU 1. The second BAP routing identity corresponds to the first BAP routing identity, to obtain the first correspondence. Then, the CU 2 sends the first correspondence to the IAB 2. Correspondingly, the IAB 2 receives the first correspondence sent by the CU 2.

Optionally, the CU 2 sends the first correspondence to the IAB 2-MT by using the RRC message.

Step 1105: The IAB 2 replaces the first BAP routing identity in the first data packet with the second BAP routing identity according to the first correspondence, to obtain a second data packet.

After obtaining the first correspondence and the first data packet, the IAB 2 may replace the first BAP routing identity in the first data packet with the second BAP routing identity according to the first correspondence, to obtain the second data packet.

Optionally, before the IAB 2 replaces the first BAP routing identity in the first data packet with the second BAP routing identity, the IAB node may determine whether the first data packet meets a preset condition. If the first data packet meets the preset condition, the IAB 2 replaces the first BAP routing identity in the first data packet with the second BAP routing identity.

Optionally, before the IAB 2 replaces the first BAP routing identity in the first data packet with the second BAP routing identity, the IAB node may determine whether the BAP address in the first BAP routing identity in the first data packet is the BAP address of the IAB 2, and determine whether the first data packet meets a preset condition.

Optionally, if the BAP address in the first BAP routing identity in the first data packet is the BAP address of the IAB 2, and it is determined that the first data packet meets the preset condition, the IAB 2 replaces the first BAP routing identity in the first data packet with the second BAP routing identity according to the first correspondence, to obtain the second data packet.

In another optional manner, when the first data packet meets the preset condition (whether the BAP address included in the first data packet is the BAP address of the IAB 2 does not need to be predetermined), the IAB 2 may replace the first BAP routing identity in the first data packet with the second BAP routing identity according to the first correspondence, to obtain the second data packet.

Optionally, if the BAP address in the first BAP routing identity in the first data packet is the BAP address of the IAB 2, and the first data packet does not meet the preset condition, the IAB 2 sends the first data packet to an upper protocol layer of a BAP layer of the IAB 2 for processing.

The preset condition in this embodiment of this application may include at least one of the following items.

1. The first data packet includes indication information, and the indication information is used by the IAB 2 to determine that the first data packet meets the preset condition. The indication information may mean that the first data packet carries a special BAP path identity, the first data packet carries a special BAP address, a special bit of BAP layer header information of the first data packet appears or is a specific value, the destination IP address of the first data packet is not the IP address of the IAB 2, or the like.

2. The first BAP routing identity carried in the first data packet is consistent with the BAP routing identity in the first correspondence.

It may be understood that the two cases are merely examples. During actual application, the preset condition may further be another case. This is not specifically limited herein.

In this embodiment of this application, that the IAB 2 determines that the first data packet meets the preset condition may be understood as that the first data packet includes the indication information, and the IAB 2 determines, based on the indication information, that the first data packet meets the preset condition.

In a possible embodiment, if the indication information is a special BAP address, at least two BAP addresses (for example, a BAP address 2A and a BAP address 2B) may be configured for the IAB 2. When the BAP address included in the BAP routing identity in the data packet is the BAP address 2A, after the IAB 2 receives the data packet, the IAB 2 may remove the BAP layer header from the data packet, and deliver the data packet to the upper protocol layer (for example, an IP layer). When the BAP address included in the BAP routing identity in the data packet is the BAP address 2B, after the IAB 2 receives the data packet, the IAB 2 may replace the BAP routing identity of the BAP layer header of the data packet with the second BAP routing identity, to obtain the second data packet. Optionally, the IAB 2 may receive configuration information from the CU 1 or the CU 2. The configuration information indicates that the BAP address 2B is a special BAP address (for example, when configuring the BAP address 2B for the IAB 2 by using the RRC message, the CU 2 carries indication information indicating that the address is a special BAP address) of the IAB 2.

In another possible embodiment, if the indication information is a special BAP path identity, at least one special BAP path identity (for example, a BAP path ID 2X) may be configured for the IAB 2. When the BAP path identity included in the BAP routing identity in the data packet is another path identity other than the BAP path ID 2X, after receiving the data packet, the IAB 2 may remove the BAP layer header from the data packet, and deliver the data packet to the upper protocol layer (for example, the IP layer). When the BAP path identity included in the BAP routing identity in the data packet is the BAP path ID 2X, after receiving the data packet, the IAB 2 may replace the BAP routing identity in the BAP layer header of the data packet with the second BAP routing identity, to obtain the second data packet. Optionally, the IAB 2 may receive configuration information from the CU 1 or the CU 2. The configuration information indicates that the BAP path ID 2X is a special BAP path identity (for example, when the CU 1 configures, for the IAB 2 by using the F1AP message, a routing entry corresponding to the BAP routing identity carrying the BAP path ID 2X, the CU 1 carries indication information indicating that the path identity is a special BAP path identity) of the IAB 2.

Optionally, when the indication information indicates that the destination IP address of the first data packet is not the IP address of the IAB 2, and the IAB 2 removes the BAP layer of the first data packet, the IAB 2 may learn of the destination IP address of the first data packet, and further determine that the first data packet meets the preset condition.

In another possible embodiment, that the IAB 2 determines that the first data packet meets the preset condition may include: The IAB 2 determines, according to the first correspondence, that the first data packet meets the preset condition. For example, the IAB 2 determines, based on whether the first BAP routing identity in the first correspondence is consistent with the BAP routing identity carried in the first data packet, whether the first data packet meets the preset condition. When the BAP routing identity in the first data packet is consistent with the first BAP routing identity in the first correspondence, after receiving the first data packet, the IAB 2 may replace the BAP routing identity in the BAP layer header in the first data packet with the second BAP routing identity, to obtain the second data packet. When the BAP routing identity in the first data packet is inconsistent with the first BAP routing identity in the first correspondence, after the IAB 2 receives the first data packet, if the BAP address of the BAP routing identity in the first data packet is the same as the BAP address of the IAB 2, the IAB 2 may remove the BAP layer header from the first data packet, and deliver the data packet to the upper protocol layer (for example, the IP layer). Alternatively, if the BAP address of the BAP routing identity in the first data packet is different from the BAP address of the IAB 2, the IAB 2 may select an appropriate next-hop node based on the BAP routing identity in the first data packet and a configured routing table, and then forward the first data packet to the next-hop node. The step of determining whether the BAP address of the BAP routing identity in the first data packet is the same as the BAP address of the IAB 2 may be performed before or after the step of determining whether the BAP routing identity in the first data packet is consistent with the first BAP routing identity in the first correspondence. In this manner, the IAB 2 may directly determine, according to the first correspondence, whether the first data packet is a data packet sent to the second network segment or a data packet delivered to the upper protocol layer. Compared with another manner (for example, the two manners of the BAP address or the special BAP path identity), this manner can reduce additional configuration overheads.

Optionally, after obtaining the second data packet, the IAB 2 may select an appropriate next-hop node based on the second BAP routing identity in the second data packet and the configured routing table, and then forward the second data packet to the next-hop node.

The preset condition or the indication information may be agreed according to a protocol, or may be learned by the IAB 2 in a manner such as sending, by the CU 1 and/or the CU 2 to the IAB 2, a control plane message indicating the preset condition. This is not specifically limited herein.

In this embodiment of this application, it can be learned from processing inside the IAB 2 that there are a plurality of manner in which the IAB 2 replaces the first BAP routing identity in the first data packet with the second BAP routing identity according to the first correspondence. The following separately describes the manners.

1. The IAB 2-MT removes the first BAP routing identity, and adds the second BAP routing identity.

That the IAB 2 receives, in the first network segment, the first data packet sent by the IAB 4, may specifically be that a receiving part of a BAP entity of the IAB 2-MT receives the first data packet sent by the DU of the IAB 4. If the IAB 2-MT determines that the BAP address in the first data packet is a BAP address (namely, the BAP address obtained by the IAB 2) of the IAB 2-MT, and determines that the first data packet meets the preset condition, the IAB 2-MT removes the first BAP routing identity (or the first BAP address of the first BAP routing identity) from the first data packet, determines the second BAP routing identity according to the first correspondence, and then adds the second BAP routing identity to the data packet, to obtain the second data packet.

2. The IAB 2-MT removes the first BAP routing identity, and the IAB 2-DU adds the second BAP routing identity.

That the IAB 2 receives, in the first network segment, the first data packet sent by the IAB 4, may specifically be that a receiving part of a BAP entity of the IAB 2-MT receives the first data packet sent by the DU of the IAB 4. If the IAB 2-MT determines that the BAP address in the first data packet is a BAP address (namely, the BAP address obtained by the IAB 2) of the IAB 2-MT, and determines that the first data packet meets the preset condition, the IAB 2-MT removes the first BAP routing identity (or the first BAP address of the first BAP routing identity) from the first data packet, and then delivers the first data packet from which the first BAP routing identity is removed to the IAB 2-DU side. After receiving the first data packet from which the first BAP routing identity is removed, the IAB 2-DU adds the second BAP routing identity to the data packet according to the first correspondence, to obtain the second data packet.

It may be understood that, in the foregoing process, the data packet received by the IAB 2-DU is the first data packet without the first BAP routing identity. Therefore, the IAB 2-DU may obtain the first BAP routing identity of the first data packet from the IAB 2-MT, and then determine the second BAP routing identity based on the first BAP routing identity, or directly determine the second BAP routing identity based on the IP header information of the data packet.

3. The IAB 2-DU removes the first BAP routing identity, and adds the second BAP routing identity.

That the IAB 2 receives, in the first network segment, the first data packet sent by the IAB 4, may specifically be that a receiving part of a BAP entity of the IAB 2-MT receives the first data packet sent by the DU of the IAB 4. The IAB 2-MT directly forwards the first data packet to the IAB 2-DU. If the IAB 2-DU determines that the BAP address in the first data packet is a BAP address (namely, the BAP address of the IAB 2, which may specifically be the BAP address obtained by the IAB 2-MT) of the IAB 2-DU, and determines that the first data packet meets the preset condition, the IAB 2-DU removes the first BAP routing identity (or the first BAP address of the first BAP routing identity) from the first data packet, determines the second BAP routing identity according to the first correspondence, and then adds the second BAP routing identity to the data packet, to obtain the second data packet.

Optionally, the IAB 2-MT may notify the IAB 2-DU of the BAP address obtained by the IAB 2-MT through an internal interface of the node, so that the IAB 2-DU may determine whether the BAP address in the first data packet is the BAP address of the IAB 2-DU.

It may be understood that there are a plurality of manners in which the IAB 2 replaces the BAP routing identity, and the foregoing several manners are merely examples. During actual application, the IAB 2 may also replace the BAP routing identity in another manner. For example, the IAB 2-DU removes the first BAP routing identity, and the IAB 2-MT adds the second BAP routing identity. This is not specifically limited herein.

Step 1106: The IAB 2 sends the second data packet to the IAB 3, and correspondingly, the IAB 3 receives the second data packet sent by the IAB 2.

Optionally, after the IAB 2 receives the first data packet and before the IAB 2 sends the second data packet to the child node (IAB 3) of the IAB 2, the IAB 2 may determine whether the second data packet needs to be forwarded to the next-hop node in the second network segment. If the first data packet meets the preset condition, the IAB 2 sends the second data packet to the next-hop node (IAB 3) in the second network segment. For downlink transmission, the next-hop node of the IAB 2 is a child node of the IAB 2.

Optionally, after or before deleting the first BAP identity of the first data packet, the IAB 2 may determine to send the first data packet from which the BAP layer is removed to the upper protocol layer of the BAP layer of the IAB 2 for processing, or to continue forwarding the first packet to the next-hop node in the second network segment. If the first data packet meets the preset condition, the IAB 2 sends the second data packet to the next-hop node (IAB 3) in the second network segment. For descriptions about a case in which the first data packet meets the preset condition, refer to related descriptions in step 1105. Details are not described herein again.

In this embodiment of this application, the preset condition may be understood as a condition for the IAB 2 to send the second data packet to the IAB 3, or may be understood as a condition for the IAB 2 to replace the first BAP routing identity in the first data packet with the second BAP routing identity. This is not specifically limited herein.

Optionally, before the IAB 2 sends the second data packet to the child node of the IAB 2, the IAB 2 may further obtain a second correspondence. Then, the IAB 2 determines, according to the second correspondence, to send the second data packet to the IAB 3 in the second network segment over a first backhaul RLC channel (first BH RLC CH) of the egress link, that is, the IAB 2 selects an appropriate BH RLC CH of the egress link for a to-be-transmitted data packet, to ensure a QoS requirement of transmission.

In this embodiment of this application, there are a plurality of cases of the second correspondence, and the cases are separately described in the following:

1. The second correspondence is a correspondence between the first BAP routing identity and the BH RLC CH of the egress link of the first IAB node (namely, the IAB 2).

2. The second correspondence is a correspondence between the second BAP routing identity and the BH RLC CH of the egress link of the first IAB node (namely, the IAB 2).

3. The second correspondence is a correspondence between the IP header information of the first data packet and the BH RLC CH of the egress link of the first IAB node (namely, the IAB 2). The IP header information may specifically be any one or more of the following information: a source IP address, a destination IP address, a DSCP, and a flow label.

4. The second correspondence is a correspondence between a second backhaul RLC channel of an ingress link of the first IAB node (namely, the IAB 2) and the first backhaul RLC channel of the egress link of the first IAB node (namely, the IAB 2). Specifically, the second correspondence may be a correspondence between the second BH RLC CH of the ingress link of the first IAB node (namely, the IAB 2) and the first BH RLC CH of the egress link of the first IAB node (namely, the IAB 2).

In this application, for downlink transmission, the ingress link of the IAB node is a link between the IAB node and the previous-hop node (for example, the parent node). For example, a link between the IAB 2 and the IAB 4 is an ingress link of the IAB 2 in downlink transmission. The egress link is a link between the IAB node and the next-hop node (for example, the child node). For example, a link between the IAB 2 and the IAB 3 is an egress link of the IAB 2 in downlink transmission. For uplink transmission, the ingress link of the IAB node is a link between the IAB node and the previous-hop node (for example, the child node). For example, a link between the IAB 2 and the IAB 3 is an ingress link of the IAB 2 in uplink transmission. The egress link is a link between the IAB node and the next-hop node (for example, the parent node). For example, a link between the IAB 2 and the IAB 4 is an egress link of the IAB 2 in uplink transmission.

Optionally, because there may be a plurality of CHs on one link, to correctly identify the BH RLC CH of the link, the BH RLC CH of the ingress link may be jointly identified by using an identity (the identity of the previous-hop node may be used as the identity of the ingress link) of the ingress link and a BH RLC CH ID allocated to the ingress link. The BH RLC CH of the egress link may be jointly identified by using an identity (the identity of the next-hop node may be used as the identity of the ingress link) of the egress link and a BH RLC CH ID allocated to the egress link.

It may be understood that there are a plurality of cases of the second correspondence obtained by the IAB 2, or there are a plurality of cases of the second correspondence. It may be understood that during actual application, there may be another case. This is not specifically limited herein.

In this embodiment of this application, that the IAB node obtains the correspondence may be understood as that the configuration information received by the IAB node from the CU 1 and the CU 2 includes two pieces of information, and the IAB node may consider that there is a correspondence between the two pieces of information. Alternatively, the standard predefines the correspondence in the IAB node. For example, the foregoing four cases in which the IAB 2 obtains the second correspondence may be understood as the following four descriptions:

1. The IAB 2 receives the control plane message, sent by the CU 1/CU 2, including the first BAP routing identity and the identity of the first backhaul RLC channel, corresponding to the first BAP routing identity, of the egress link of the first IAB node, to learn of the second correspondence.

2. The IAB 2 receives the control plane message, sent by the CU 1/CU 2, including the second BAP routing identity and the identity of the first backhaul RLC channel, corresponding to the second BAP routing identity, of the egress link of the first IAB node, to learn of the second correspondence.

3. The IAB 2 receives the control plane message, sent by the CU 1/CU 2, including the first IP header information and the identity of the first backhaul RLC channel, corresponding to the first IP header information, of the egress link of the first IAB node, to learn of the second correspondence. The first IP header information may specifically include any one or more of the following information: a first source IP address, a first destination IP address, a first DSCP, and a first flow label.

4. The IAB 2 receives the control plane message, sent by the CU 1/CU 2, including the identity of the second backhaul RLC channel of the ingress link of the first IAB node and the identity of the first backhaul RLC channel, corresponding to the second backhaul RLC channel, of the egress link of the first IAB node, to learn of the second correspondence.

Because the MT and the DU of the IAB 2 are controlled by different IAB donor nodes, the IAB 2-MT may be connected to the CU 2 by using RRC, and the IAB 2-DU may be connected to the CU 1 through the F1, mapping configuration of the BH RLC CH required by the IAB node 2 may be configured by the CU 1 or the CU 2. In other words, there are two manners in which the IAB 2 obtains the second correspondence in this embodiment of this application, and the two manners are separately described in the following:

1: The CU 1 determines the second correspondence, and sends the second correspondence to the IAB 2. It may also be understood that the CU 1 configures the second correspondence for the IAB 2.

Optionally, the CU 1 sends the second correspondence to the IAB 2-DU by using the F1AP.

2: The CU 2 determines the second correspondence, and sends the second correspondence to the IAB 2. It may also be understood that the CU 2 configures the second correspondence for the IAB 2.

Optionally, the CU 2 sends the second correspondence to the IAB 2-MT by using the RRC message.

In this embodiment of this application, that the CU 1/CU 2 sends the correspondence to the IAB 2 may be understood as that the CU 1/CU 2 configures the IAB 2. For example, that the CU 1/CU 2 sends the first correspondence to the IAB 2 may be understood as that the CU 1/CU 2 performs routing configuration on the IAB 2. That the CU 1/CU 2 sends the second correspondence to the IAB 2 may be understood as that the CU 1/CU 2 performs mapping configuration of the BH RLC CH on the IAB 2.

In this embodiment of this application, the IAB network may include more network segments, and is managed by a plurality of donor nodes. A BAP address of a BAP routing identity used for transmission of a data packet in each network segment is a BAP address of a last-hop node in the network segment. In a last network segment in a data packet transmission direction, a last-hop node in the network segment is a target node in the network segment. For example, in downlink transmission, the BAP address of the first BAP routing identity in the first network segment is a BAP address of a last-hop node (IAB 2) in the first network segment. The BAP address of the second BAP routing identity in the second network segment (namely, a last network segment in a downlink direction) is a BAP address of the target node IAB 3 in the second network segment. For example, in uplink transmission, a BAP address of a BAP routing identity in a last network segment in an uplink direction is a BAP address of a target node (namely, the donor DU) in the network segment.

For example, if the IAB network includes topology including three adjacent network segments (which are identified as 1, 2, and 3) that are connected, and the three network segments are managed by different donor nodes, a BAP address of a BAP routing identity used in the second network segment is a BAP address of a boundary node between the second network segment and the first network segment or a BAP address of a boundary node between the second network segment and the third network segment. An identity of a boundary node that is used is determined based on a transmission direction.

In addition, if the downstream node of the first IAB node includes a plurality of different IAB nodes, for a data packet in downlink transmission, all target BAP addresses in the first network segment are the BAP address of the first IAB node. In a possible embodiment, when configuring the correspondence between the IP header information and the first BAP routing identity, the first donor node needs to configure different BAP path identities in the first network segment for different downstream IAB nodes, so that the first IAB node can determine the last-hop IAB node in the second network segment based on the first BAP routing identity. Therefore, it can be ensured that data packets of different IAB nodes in the second network segment have different first BAP routing identities in the first network segment.

There is no necessary time sequence relationship between step 1104 and step 1101 to step 1103 in this embodiment of this application. In other words, step 1104 may be performed before step 1101, or before step 1102, provided that step 1104 is performed before step 1105.

In this embodiment of this application, a principle of a solution of sequentially handing over donors from top to bottom is similar to a principle of a solution of sequentially handing over donors from bottom to top. For details, refer to related descriptions in the embodiment shown in FIG. 11. This is not specifically limited herein.

In this embodiment of this application, in a scenario in which the IAB network is managed by a plurality of IAB donor nodes, the BAP routing identity of the data packet in the first network segment is replaced with the BAP routing identity in the second network segment by using the first IAB node, so that the data packet can be normally transmitted in the second network segment. This avoids or minimizes abnormal data packet transmission because the IAB network is managed by the plurality of IAB donor nodes, ensures that a data packet can be correctly routed in the IAB network obtained through stitching network segments managed by the plurality of different donor nodes, and provides a transmission service based on appropriate QoS guarantee.

In other words, in the solution of this embodiment, each donor node controls only routing of a data packet in a network segment managed by the donor node, and a boundary node of two network segments performs a proxy operation (which may specifically be performed at a BAP layer or an IP layer) of routing at a BAP layer or QoS mapping. The donor node replaces the first BAP routing identity, included in the received data packet, for routing in the first network segment with the second BAP routing identity for routing in the second network segment. In the routing stitch manner, it is ensured that data packets can be properly and correctly routed in new network topology management across a plurality of donor gNBs. Further, appropriate mapping of a BH RLC channel is performed on a boundary between two network segments, to ensure a QoS requirement of a data packet.

Refer to FIG. 12. Another embodiment of the communication method in this embodiment of this application includes step 1201 to step 1206.

In this embodiment of this application, the communication method shown in FIG. 12 is applied to uplink transmission of a data packet. For ease of understanding, similar to the embodiment shown in FIG. 11, the embodiment of the communication method is described with reference to the architecture in FIG. 8. Therefore, a first IAB node in this embodiment of this application is the IAB 2 in FIG. 8, a parent node of the first IAB node is the IAB 4, and a child node of the first IAB node is the IAB 3. A first donor node is the S donor (including the S donor-CU 1 and the S donor-DU 1), a second donor node is the T donor (including the T donor-CU 2 and the T donor-DU 2), the first donor node is different from the second donor node, and a first network segment managed by the first donor node (CU 1) includes the S donor, a DU part (namely, the IAB 2-DU) of the first IAB node, and the child node (IAB 3) of the first IAB node. A second network segment managed by the second donor node (CU 2) includes the T donor, the T IAB parent node (namely, the IAB 4), and an MT part (namely, the IAB 2-MT) of the first IAB node. A previous-hop node of the first IAB node is the child node (namely, the IAB 3) of the first IAB node, and a next-hop node of the first IAB node is the parent node (namely, the IAB 4) of the first IAB node. The first IAB node (IAB 2) is located in the first network segment and the second network segment. It may also be understood that the first IAB node (IAB 2) is managed by the second donor node (T donor) and the first donor node (S donor). Specifically, the MT part (IAB 2-MT) of the first IAB node is managed by the second donor node (T donor), and the DU part (IAB 2-DU) of the first IAB node is managed by the first donor node (S donor). That the donor node manages the IAB node may be understood as control plane connection (for example, RRC connection and/or F1 connection) between the donor node and the IAB node, and necessary configuration (for example, routing and bearer mapping related to configuration) may be provided to the IAB node through the control plane connection. It may be understood that the first IAB node (IAB 2) may also be referred to as a boundary IAB node.

Step 1201: The IAB 3 adds a first BAP routing identity to an uplink data packet, to obtain a first data packet.

When the child node of the IAB serves as an access IAB node of UE, the IAB 3 generates the uplink data packet. The uplink data packet may be a data packet of an F1 interface user plane (F1-U), a data packet of an F1 interface control plane (F1-C), a data packet of a non-F1 service (non-F1), or the like. This is not specifically limited herein.

Before the IAB 3 adds the first BAP routing identity to the uplink data packet, the CU 1 needs to configure the IAB 3. Configuration configured by the CU 1 on the IAB 3 may include one or more of the following: allocating a BAP layer identity (BAP address) to the IAB 3, establishing or modifying configuration information required by the IAB 3 for a BH RLC CH between the IAB 3 and a parent node (for example, the IAB 2) of the IAB 3, and providing the IAB 3 with routing configuration information for uplink transmission, and with mapping configuration of the BH RLC CH of a link between the IAB 3 and the IAB 2.

Optionally, the configuration information required by the BH RLC CH may include at least one of an identity of the BH RLC CH, configuration of an RLC layer corresponding to the BH RLC CH, configuration of a medium access control (medium access control, MAC) layer corresponding to the BH RLC CH, configuration of a logical channel corresponding to the BH RLC CH, and the like.

Optionally, the routing configuration information for uplink transmission may include a correspondence between upper-layer service data information maintained by the IAB 3 and the first BAP routing identity, and a routing entry (namely, the first BAP routing identity and an identity of a corresponding next-hop node) corresponding to the first BAP routing identity. An uplink egress link is a BH link between the IAB 3 and the parent node IAB 2 of the IAB 3, and a BH RLC CH of the uplink egress link may be jointly identified by using an identity of the IAB 2 and a BH RLC CH ID.

Optionally, the mapping configuration of the BH RLC CH of the link between the IAB 3 and the IAB 2 may include at least one of the following content: a mapping relationship between the upper-layer service data information and the BH RLC CH of the uplink egress link, and an identity of a specified default (default) BH RLC CH used for transmission a service other than an F1-U service. In this application, when the mapping relationship between the upper-layer service data information and the BH RLC CH of the uplink egress link is configured, an identity (which is indicated by the identity of the next-hop node) of the uplink egress link in uplink transmission and the identity of the BH RLC CH (namely, the BH RLC CH ID) may be used to jointly identify the BH RLC CH of the egress link.

Optionally, the upper-layer service data information may include at least one of the following: tunnel information (including an uplink TEID and a destination IP address of a GTP-U tunnel of the F1 interface) of the F1 interface user plane, a UE associated F1AP message (UE associated F1AP message), a non-UE associated F1AP message (non-UE associated F1AP message), a non-F1 interface service (non-F1 traffic), and the like.

Before the IAB 3 adds the first BAP routing identity to the uplink data packet, the CU 1 needs to first send configuration information to the IAB 3. The configuration information indicates the first BAP routing identity that corresponds to the uplink data packet and that needs to be added, the first BAP routing identity corresponds to the upper-layer service data information of the uplink data packet, and the first BAP routing identity includes a BAP address, that is, used as a destination BAP address of the uplink data packet in the first network segment, of the IAB 2.

After receiving the configuration information sent by the CU 1, the IAB 3 adds the first BAP routing identity to the uplink data packet, to obtain the first data packet. A target BAP address of the first BAP routing identity is the BAP address of the IAB 2, that is, the target BAP address of the first BAP routing identity is a BAP address of a last-hop node in the first network segment.

Step 1202: The IAB 3 sends the first data packet to the IAB 2. Correspondingly, the IAB 2 receives the first data packet sent by the IAB 3.

After obtaining the first data packet, the IAB 3 determines an egress link and a BH RLC CH of the egress link based on configuration configured by the CU 1 on the IAB 3 in step 1201 and the first BAP routing identity, and sends the first data packet to the IAB 2 over the BH RLC CH of the egress link. Correspondingly, the IAB 2 receives the first data packet. Specifically, the IAB 2 receives the first data packet sent by the previous-hop node (namely, the IAB 3) in the first network segment.

Optionally, that the IAB 3 sends the first data packet to the IAB 2 may specifically be that the DU in the IAB 3 sends the first data packet to the MT in the IAB 2.

Step 1203: The IAB 2 obtains a first correspondence.

In this step, for descriptions about a case in which the IAB 2 obtains the first correspondence, refer to related descriptions of step 1104 in the embodiment shown in FIG. 11. Details are not described herein again.

It is easy to understand that, uplink transmission in this step is different from the downlink transmission shown in FIG. 11. Specific content of a second BAP routing identity in this step is different from content in FIG. 11. For example, a BAP address (namely, a second BAP address) included in the second BAP routing identity in this step is a BAP address of the DU 2. However, the second BAP address of the second BAP routing identity in the embodiment shown in FIG. 11 is the BAP address of the IAB 3.

Step 1204: The IAB 2 replaces the first BAP routing identity in the first data packet with the second BAP routing identity according to the first correspondence, to obtain a second data packet.

In this step, the IAB 2 replaces the first BAP routing identity in the first data packet with the second BAP routing identity according to the first correspondence, to obtain the second data packet. For details, refer to related descriptions of step 1105 in the embodiment shown in FIG. 11. Details are not described herein again.

In a possible embodiment, in addition to the manner of determining whether replacement of the BAP routing identity needs to be performed on the data packet based on the condition in step 1105, for uplink transmission, the IAB 2 further has a possible determining manner: The IAB 2 determines whether the BAP address of the first BAP routing identity in the first data packet is the BAP address of the IAB 2; and if the BAP address is the BAP address of the IAB 2, continues to forward the first data packet to the next-hop node (for example, the IAB 4) in the second network segment, and replaces the first BAP routing identity; or if the BAP address is not the BAP address of the IAB 2, does not change the first BAP routing identity, directly searches a configured routing table based on the first BAP routing identity, and selects an appropriate next-hop node. Further, if the IAB 2 cannot find an entry corresponding to the first BAP routing identity in the routing table, the IAB 2 may continue to search for an entry in which a BAP address is the same as content of a first BAP address field included in the first BAP routing identity. If there is an entry in which a BAP address is the same as content of a first BAP address field included in the first BAP routing identity, the IAB 2 may select a next-hop node in any entry that meets a condition. If there is no entry in which a BAP address is the same as content of a first BAP address field included in the first BAP routing identity, the IAB 2 may further determine whether a replaced new BAP routing identity is configured in the first BAP routing identity, or determine whether a replaced new BAP address is configured in the first BAP address included in the first BAP routing identity. If it is determined that there is a replaced new BAP routing identity is configured in the first BAP routing identity, or a replaced new BAP address is configured in the first BAP address included in the first BAP routing identity, the IAB 2 may replace the first BAP routing identity/first BAP address of the first data packet with a new BAP routing identity/BAP address; search the routing table based on a result obtained through replacement, to select a next-hop node; select a BH RLC CH of the egress node after the next-hop node is selected; and continue to forward the modified second data packet to the next-hop node. The new BAP routing identity/BAP address may be considered as a special second BAP routing identity/second BAP address.

Step 1205: The IAB 2 sends the second data packet to the T donor-DU 2 by using the IAB 4, and correspondingly, the T donor-DU 2 receives the second data packet.

In this embodiment, the IAB 2 may further obtain a second correspondence. For related descriptions, refer to related descriptions of step 1106 in the embodiment shown in FIG. 11. Details are not described herein again.

In this embodiment, before sending the second data packet to the IAB 4, the IAB 2 may also determine whether the second data packet needs to be sent to the IAB 4 in the second network segment. For related descriptions, refer to descriptions of step 1106 in the embodiment shown in FIG. 11. Details are not described herein again.

Optionally, after obtaining the second data packet and the second correspondence, the IAB 2 determines the BH RLC CH of the egress link, and sends the second data packet to the IAB 4 over the BH RLC CH of the egress link. Specifically, the IAB 2-MT may send the second data packet to the DU in the IAB 4. In other words, the IAB 2 sends the second data packet to the next-hop node (namely, the IAB 4) in the second network segment.

Because the IAB 4 is managed by the CU 2, the CU 2 may provide routing of uplink transmission and mapping configuration of the BH RLC CH for the IAB 4, and the routing of uplink transmission may be a correspondence between the second BAP routing identity and the identity of the next-hop node (DU 2). The mapping configuration of the BH RLC CH may be a mapping relationship between a BH RLC CH of an ingress link between the IAB 4 and a previous-hop node (IAB 2) and the BH RLC CH of the egress link between the IAB 4 and the next-hop node (DU 2).

The IAB 4 receives the second data packet, determines the BH RLC CH of the egress link based on the configuration configured by the CU 2 on the IAB 4 and the second data packet, and sends the second data packet to the DU 2 over the BH RLC CH of the egress link. Correspondingly, the DU 2 receives the second data packet sent by the IAB 4.

Step 1206: The T donor-DU 2 sends an IP data packet to the target node.

After the DU 2 receives the second data packet sent by the IAB 4, because the BAP address of the second BAP routing identity in the second data packet is a BAP layer identity of the DU 2, the DU 2 removes BAP layer header information from the second data packet, delivers a service data unit (service data unit, SDU) of a BAP layer to an IP layer, and then forwards the IP data packet to the target node at the IP layer through routing at the IP layer.

Optionally, if the target node is the CU 1, the DU 2 forwards, to the CU 1, the uplink data packet that is of the F1 interface and that is generated by the IAB 3.

There is no necessary time sequence relationship between step 1203 and step 1201 and step 1202 in this embodiment of this application. In other words, step 1203 may be performed before step 1201, or before step 1202, provided that step 1203 is performed before step 1204.

In this embodiment of this application, a principle of a solution of sequentially handing over donors from top to bottom is similar to a principle of a solution of sequentially handing over donors from bottom to top. For details, refer to related descriptions in the embodiments shown in FIG. 11 and FIG. 12. This is not specifically limited herein.

In this embodiment of this application, in a scenario in which the IAB network is managed by a plurality of IAB donor nodes, the BAP routing identity of the data packet in the first network segment is replaced with the BAP routing identity in the second network segment by using the first IAB node, so that the data packet can be normally transmitted in the second network segment. This avoids or minimizes abnormal data packet transmission because the IAB network is managed by the plurality of IAB donor nodes, ensures that a data packet can be correctly routed in the IAB network obtained through stitching network segments managed by the plurality of different donor nodes, and provides a transmission service based on appropriate QoS guarantee.

In other words, in the solution of this embodiment, each donor node controls only routing of a data packet in a network segment managed by the donor node, and a boundary node of two network segments performs a proxy operation (which may specifically be performed at a BAP layer or an IP layer) of routing at a BAP layer or QoS mapping. The donor node replaces the first BAP routing identity, included in the received data packet, for routing in the first network segment with the second BAP routing identity for routing in the second network segment. In the routing stitch manner, it is ensured that data packets can be properly and correctly routed in new network topology management across a plurality of donor gNBs. Further, appropriate mapping of a BH RLC channel is performed on a boundary between two network segments, to ensure a QoS requirement of a data packet.

The following describes problem 2 in the conventional technology and the technical solutions in embodiments of this application.

Problem 2: In the single-donor standalone networking scenario (as shown in FIG. 1), the non-standalone IAB networking scenario (as shown in FIG. 2 and FIG. 3), and the cross-donor networking scenario (as shown in FIG. 6 and FIG. 7), in the conventional technology, after the IAB node receives a data packet, if the BAP layer header of the data packet carries the BAP address of the IAB node, and an entry that includes the target BAP address of the data packet is not found in the routing table, it is determined that the data packet is abnormal. However, when the IAB node determines that the data packet is abnormal, a specific situation of an actual operation is not considered, and processing of the abnormal data packet by the donor-DU is not considered. Consequently, some abnormal packets that need to be discarded cannot be identified and cannot be discarded, and buffer space of the IAB node or the donor-DU is occupied.

For the problem 2, an embodiment of this application provides a data packet processing method, and the method may be applied to an IAB node or an IAB-donor-DU in a single-donor standalone networking scenario, a non-standalone IAB networking scenario, or a cross-donor networking scenario. Compared with the conventional technology in which a common and complex manner is used to determine an abnormal data packet, the data packet processing method provided in this embodiment of this application may more accurately determine a condition of an abnormal data packet in some specific cases (an uplink data packet and a downlink data packet, an IAB node and an IAB-donor-DU).

The following describes how the IAB node or IAB-donor-DU resolves the problem 2.

1. IAB Node

1. In a possible manner, a BAP layer entity (which may specifically be a receiving part of the IAB-DU) of the IAB node receives an uplink data packet. If a BAP layer header of the uplink data packet carries the BAP address of the IAB node, the IAB node determines that the uplink data packet is an incorrect or abnormal data packet.

Further, after determining that the uplink data packet is an incorrect or abnormal data packet, the IAB node may discard the uplink data packet.

This simplifies a condition for determining an abnormal uplink data packet, and prevents buffer space of the IAB node from being occupied by an incorrect or abnormal uplink data packet.

2. In another possible manner, before a BAP layer entity (which may specifically be a sending part of the BAP entity at the IAB-MT or the IAB-DU side) of the IAB node sends a data packet, if an entry that includes a target BAP address of the data packet is not found in the routing table, the IAB node determines that the data packet is an incorrect or abnormal data packet.

Further, after determining that the data packet is an incorrect or abnormal data packet, the IAB node may discard the data packet.

This simplifies a condition for determining an abnormal data packet, and prevents buffer space of the IAB node from being occupied by an incorrect or abnormal data packet. In addition, this avoids or minimizes network resource consumption caused by sending an incorrect or abnormal data packet.

2. IAB-Donor-DU

1. In a possible manner, a BAP layer entity (which may specifically be a receiving part) of the IAB-donor-DU receives an uplink data packet. If a BAP address carried in a BAP layer header of the uplink data packet is not the BAP address of the IAB-donor-DU, the IAB-donor-DU determines that the data packet is an incorrect or abnormal data packet.

Further, after determining that the uplink data packet is an incorrect or abnormal data packet, the IAB-donor-DU may discard the uplink data packet.

This simplifies a condition for determining an abnormal uplink data packet, and prevents buffer space of the IAB-donor-DU from being occupied by an incorrect or abnormal uplink data packet.

2. In another possible manner, before a BAP layer entity (which may specifically be a sending part) of the IAB-donor-DU sends a downlink data packet, if an entry that includes a target BAP address of the data packet is not found in the routing table, the IAB-donor-DU determines that the downlink data packet is an incorrect or abnormal data packet.

Further, after determining that the downlink data packet is an incorrect or abnormal data packet, the IAB-donor-DU may discard the downlink data packet.

This simplifies a condition for determining an abnormal downlink data packet, and prevents buffer space of the IAB-donor-DU from being occupied by an incorrect or abnormal downlink data packet. In addition, this avoids or minimizes network resource consumption caused by sending an incorrect or abnormal downlink data packet.

In this embodiment of this application, compared with the conventional technology in which a common and complex manner is used to determine an abnormal data packet, a data packet processing method provided in embodiments of this application can simplify a condition for determining an abnormal data packet, and more accurately identify more abnormal data packets in a specific case. For related advantageous effects, refer to the foregoing descriptions.

Figure 13:
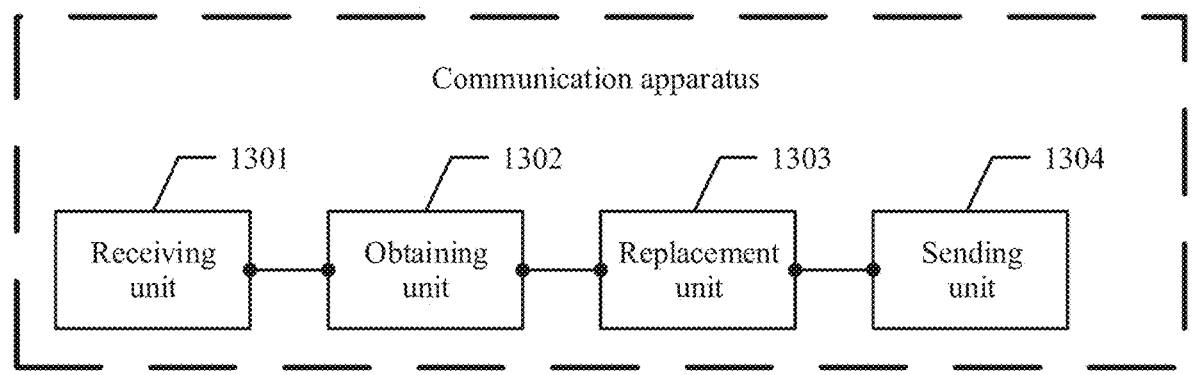
FIG. 13 to FIG. 19 are schematic diagrams of several structures of communication apparatuses according to an embodiment of this application.

The following describes a communication apparatus in embodiments of this application. FIG. 13 shows another embodiment of the communication apparatus according to an embodiment of this application. The communication apparatus may be a first IAB node or a component (for example, a DU, an MT, a processor, a chip, or a chip system) of the first IAB node. The communication apparatus is used in an integrated access and backhaul IAB network, the IAB network includes a first network segment and a second network segment, the first network segment is managed by a first donor node, the second network segment is managed by a second donor node, the first donor node is different from the second donor node, and the communication apparatus includes:

- a receiving unit 1301, configured to receive a first data packet in the first network segment, where the first data packet includes a first backhaul adaptation protocol BAP routing identity, and the first BAP routing identity is used for transmission of the first data packet in the first network segment;
- an obtaining unit 1302, configured to obtain a first correspondence;
- a replacement unit 1303, configured to replace the first BAP routing identity in the first data packet with a second BAP routing identity according to the first correspondence, to obtain a second data packet; and
- a sending unit 1304, configured to send the second data packet to a next-hop node in the second network segment, where the next-hop node is a parent node or a child node of the first IAB node.

In this embodiment, operations performed by units in the communication apparatus are similar to operations performed by the first IAB node (namely, the IAB 2) in the embodiments shown in FIG. 11 and FIG. 12. Details are not described herein again.

In this embodiment, in a scenario in which the IAB network is managed by a plurality of IAB donor nodes, the BAP routing identity of the data packet in the first network segment is replaced with the BAP routing identity in the second network segment by using the replacement unit 1303, so that the data packet can be normally transmitted in the second network segment. This avoids or minimizes abnormal data packet transmission because the IAB network is managed by the plurality of IAB donor nodes, and ensures that a data packet can be correctly routed in the IAB network obtained through stitching network segments managed by the plurality of different donor nodes.

Figure 14:
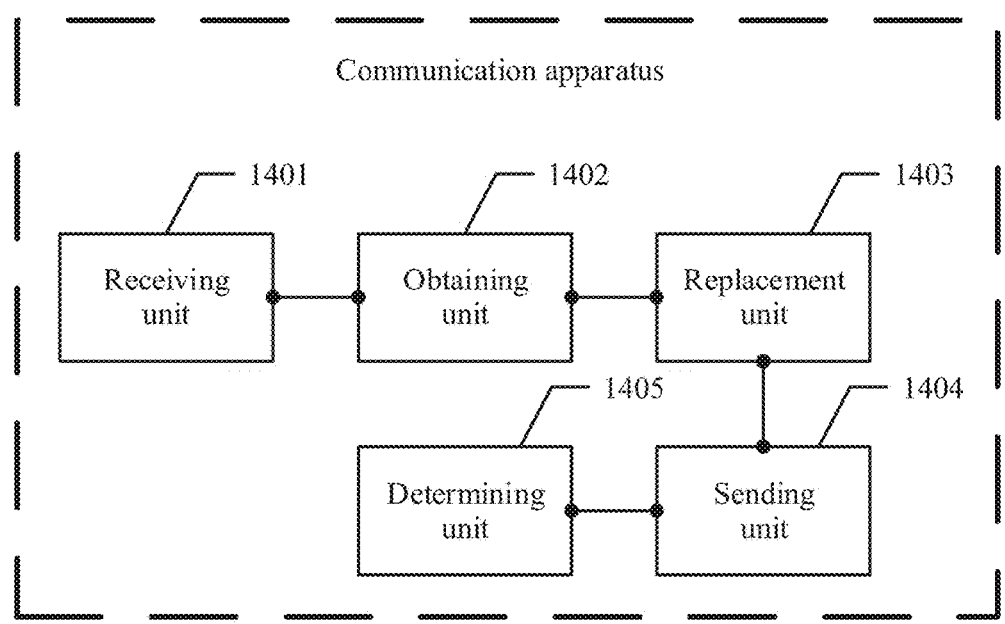

FIG. 14 shows another embodiment of a communication apparatus according to an embodiment of this application. The communication apparatus may be a first IAB node or a component (for example, a DU, an MT, a processor, a chip, or a chip system) of the first IAB node. The communication apparatus is used in an integrated access and backhaul IAB network, the IAB network includes a first network segment and a second network segment, the first network segment is managed by a first donor node, the second network segment is managed by a second donor node, the first donor node is different from the second donor node, and the communication apparatus includes:
- a receiving unit 1401, configured to receive a first data packet in the first network segment, where the first data packet includes a first backhaul adaptation protocol BAP routing identity, and the first BAP routing identity is used for transmission of the first data packet in the first network segment;
- an obtaining unit 1402, configured to obtain a first correspondence;
- a replacement unit 1403, configured to replace the first BAP routing identity in the first data packet with a second BAP routing identity according to the first correspondence, to obtain a second data packet; and
- a sending unit 1404, configured to send the second data packet to a next-hop node in the second network segment, where the next-hop node is a parent node or a child node of the first IAB node.

The communication apparatus in this embodiment further includes:
- a determining unit 1405, configured to determine that a BAP address of the first BAP routing identity in the first data packet is a BAP address of the first IAB node, and that the first data packet meets a preset condition.

Optionally, when the first data packet includes indication information, the determining unit 1405 is specifically configured to determine, based on the indication information, that the first data packet meets the preset condition.

Optionally, the obtaining unit 1402 is further configured to obtain a second correspondence.

Optionally, the sending unit 1404 is specifically configured to determine, according to the second correspondence, to send the second data packet to the next-hop node in the second network segment over a first backhaul radio link control RLC channel of an egress link.

Optionally, the indication information includes a destination Internet protocol IP address of the first data packet, and when the destination IP address of the first data packet is not an IP address of the first IAB node, the first IAB node determines that the first data packet meets the preset condition.

Optionally, the first network segment includes the first IAB node and an upstream node of the first IAB node, and the second network segment includes the first IAB node and a downstream node of the first IAB node. The receiving unit 1401 is specifically configured to receive the first data packet sent by the upstream node in the first network segment. The sending unit 1404 is specifically configured to send the second data packet to the downstream node in the second network segment. A BAP address of the second BAP routing identity is a BAP address of the downstream node.

Optionally, the first network segment includes the first IAB node and a downstream node of the first IAB node, and the second network segment includes the first IAB node and an upstream node of the first IAB node. The receiving unit 1401 is specifically configured to receive the first data packet sent by the downstream node in the first network segment. The sending unit 1404 is specifically configured to send the second data packet to the upstream node in the second network segment. A BAP address of the second BAP routing identity is a BAP address of the second donor node.

Optionally, the upstream node of the first IAB node is the parent node of the first IAB node, and the determining unit 1405 is further configured to determine that the BAP address of the first BAP routing identity in the first data packet is the BAP address of the first IAB node.

Optionally, the first BAP routing identity includes a first BAP address and/or a first path identity, and the second BAP routing identity includes a second BAP address and/or a second path identity.

Optionally, the first correspondence is configured by the first donor node or the second donor node. That the obtaining unit 1402 is configured to obtain a first correspondence includes any one of the following: The obtaining unit 1402 is specifically configured to obtain the first BAP routing identity and the second BAP routing identity. There is a correspondence between the first BAP routing identity and the second BAP routing identity. The obtaining unit 1402 is specifically configured to obtain IP header information of the first data packet and the second BAP routing identity. There is a correspondence between the IP header information and the second BAP routing identity, and the IP header information includes at least one of a target IP address, a differentiated services code point DSCP, and a flow label.

Optionally, that the obtaining unit 1402 is configured to obtain a second correspondence includes any one of the following: The obtaining unit 1402 is specifically configured to obtain the first BAP routing identity and the first backhaul RLC channel of the egress link of the first IAB node, where there is a correspondence between the first BAP routing identity and the first backhaul RLC channel of the egress link of the first IAB node. The obtaining unit 1402 is specifically configured to obtain the second BAP routing identity and the first backhaul RLC channel of the egress link of the first IAB node, where there is a correspondence between the second BAP routing identity and the first backhaul RLC channel of the egress link of the first IAB node. The obtaining unit 1402 is specifically configured to obtain IP header information of the first data packet and the first backhaul RLC channel of the egress link of the first IAB node, where there is a correspondence between the IP header information of the first data packet and the first backhaul RLC channel of the egress link of the first IAB node, and the IP header information includes at least one of a target IP address, a differentiated services code point DSCP, and a flow label. The obtaining unit 1402 is specifically configured to obtain a second BH RLC CH of an ingress link of the first IAB node and the first BH RLC CH of the egress link of the first IAB node, where there is a correspondence between the second BH RLC CH of the ingress link of the first IAB node and the first BH RLC CH of the egress link of the first IAB node.

In this embodiment, operations performed by units in the communication apparatus are similar to operations performed by the first IAB node (namely, the IAB 2) in the embodiments shown in FIG. 11 and FIG. 12. Details are not described herein again.

In this embodiment, in a scenario in which the IAB network is managed by a plurality of IAB donor nodes, the BAP routing identity of the data packet in the first network segment is replaced with the BAP routing identity in the second network segment by using the replacement unit 1403, so that the data packet can be normally transmitted in the second network segment. This avoids or minimizes abnormal data packet transmission because the IAB network is managed by the plurality of IAB donor nodes, and ensures that a data packet can be correctly routed in the IAB network obtained through stitching network segments managed by the plurality of different donor nodes.

Figure 15:
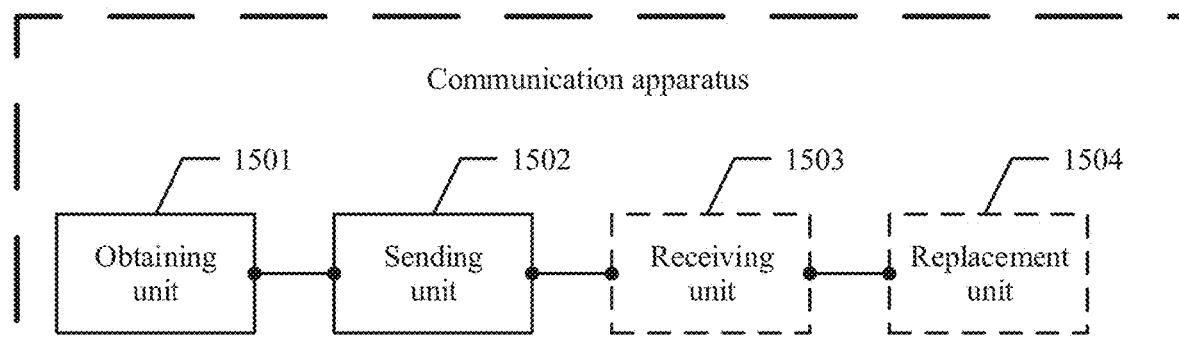

FIG. 15 shows another embodiment of a communication apparatus according to an embodiment of this application. The communication apparatus may be a first IAB node or a component (for example, a DU, an MT, a processor, a chip, or a chip system) of the first IAB node. The communication apparatus is used in an integrated access and backhaul IAB network, and the communication apparatus includes:

an obtaining unit 1501, used by the first IAB node to obtain a second correspondence; and a sending unit 1502, configured to determine, according to the second correspondence, to send a second data packet to a next-hop node in a second network segment over a first backhaul RLC channel of an egress link.

Optionally, the communication apparatus further includes:

optionally, a receiving unit 1503, configured to receive a first data packet in a first network segment, where the first data packet includes a first backhaul adaptation protocol BAP routing identity, and the first BAP routing identity is used for transmission of the first data packet in the first network segment; and a replacement unit 1504, configured to replace the first BAP routing identity in the first data packet with a second BAP routing identity according to a first correspondence, to obtain the second data packet.

Optionally, the replacement unit 1504 is configured to replace the first BAP routing identity in the first data packet with the second BAP routing identity according to the first correspondence, to obtain the second data packet.

Optionally, the obtaining unit 1501 is further configured to obtain the first correspondence.

Optionally, the IAB network includes the first network segment and the second network segment, the first network segment is managed by the communication apparatus, the second network segment is managed by a second donor node, and the first donor node is different from the second donor node.

Optionally, the second data packet includes the second BAP routing identity, and the second BAP routing identity is used for transmission of the second data packet in the second network segment. In this possible implementation, each donor node is allowed to control only routing of a data packet in a network segment managed by the donor node, and then a boundary node of two network segments performs a proxy operation at a BAP layer or an IP layer. This avoids or minimizes abnormal egress mapping because the IAB network is managed by the plurality of IAB donor nodes, and ensures that a data packet can be normally transmitted in the IAB network obtained through stitching network segments managed by the plurality of different donor nodes.

Optionally, the first data packet and the second data packet are a same data packet, and the first BAP routing identity is the same as or different from the second BAP routing identity. In this possible implementation, each donor node controls only routing of a data packet in a network segment managed by the donor node, and a boundary node (namely, the first IAB node) of two network segments performs a proxy operation at a BAP layer or an IP layer. The donor node replaces the first BAP routing identity, included in the received data packet, for routing in the first network segment with the second BAP routing identity for routing in the second network segment. In the routing stitch manner, it is ensured that data packets can be properly and correctly routed in new network topology management across a plurality of donor gNBs.

In this embodiment, operations performed by units in the communication apparatus are similar to operations performed by the first IAB node (namely, the IAB 2) in the embodiments shown in FIG. 11 and FIG. 12. Details are not described herein again.

In this embodiment, in a scenario in which the IAB network is managed by a plurality of IAB donor nodes, the sending unit 1502 determines, according to the second correspondence, to send the second data packet to the next-hop node in the second network segment over the first backhaul RLC channel of the egress link. This avoids or minimizes abnormal egress mapping because the IAB network is managed by the plurality of IAB donor nodes, and ensures that a data packet can be normally transmitted in the IAB network obtained through stitching network segments managed by the plurality of different donor nodes.

Figure 16:
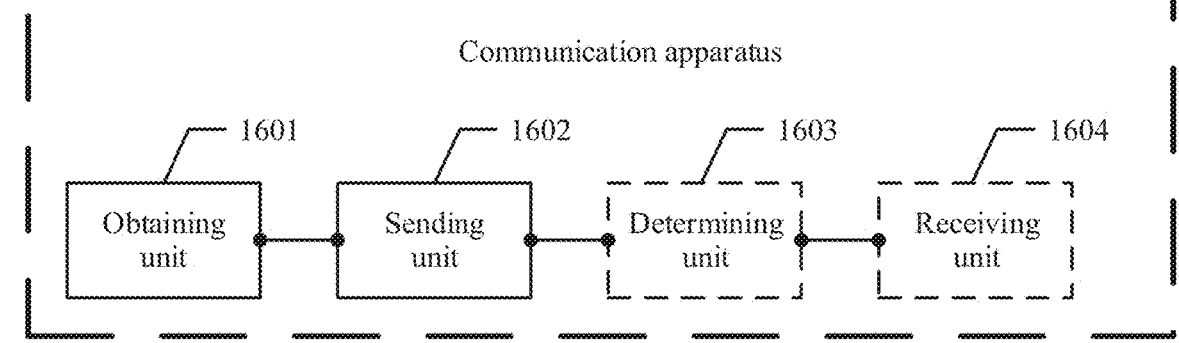

FIG. 16 shows another embodiment of a communication apparatus according to an embodiment of this application. The communication apparatus may be a first donor node or a component (for example, a CU, a DU, a processor, a chip, or a chip system) of the first donor node. The communication apparatus is used in an integrated access and backhaul IAB network, the IAB network includes a first network segment and a second network segment, the first network segment is managed by a first donor node, the second network segment is managed by a second donor node, the first donor node is different from the second donor node, and the communication apparatus includes:

an obtaining unit 1601, configured to obtain a first BAP routing identity and a second BAP routing identity, where there is a correspondence between the first BAP routing identity and the second BAP routing identity, the first BAP routing identity is used for transmission of a data packet in the first network segment, and the second BAP routing identity is used for transmission of the data packet in the second network segment; and a sending unit 1602, configured to send the first BAP routing identity and the second BAP routing identity to a first IAB node, where the first IAB node is located in the first network segment and the second network segment; or an obtaining unit 1601, configured to obtain IP header information and a second BAP routing identity of a data packet, where there is a correspondence between the IP header information and the second BAP routing identity of the data packet, and the second BAP routing identity is used for transmission of the data packet in the second network segment; and a sending unit 1602, configured to send the IP header information and the second BAP routing identity of the data packet to a first IAB node, where the first IAB node is located in the first network segment and the second network segment.

Optionally, the obtaining unit 1601 is further configured to obtain the first BAP routing identity and a first backhaul RLC channel of an egress link of the first IAB node. There is a correspondence between the first BAP routing identity and the first backhaul RLC channel of the egress link of the first IAB node. Optionally, the sending unit 1602 is further configured to send the first BAP routing identity and the first backhaul RLC channel of the egress link of the first IAB node to the first IAB node.

Optionally, the obtaining unit 1601 is further configured to obtain the second BAP routing identity and a first backhaul RLC channel of an egress link of the first IAB node. There is a correspondence between the second BAP routing identity and the first backhaul RLC channel of the egress link of the first IAB node. Optionally, the sending unit 1602 is further configured to send the second BAP routing identity and the first backhaul RLC channel of the egress link of the first IAB node to the first IAB node.

Optionally, the obtaining unit 1601 is further configured to obtain IP header information of a first data packet and a first backhaul RLC channel of an egress link of the first IAB node. There is a correspondence between the IP header information of the first data packet and the first backhaul RLC channel of the egress link of the first IAB node. Optionally, the sending unit 1602 is further configured to send the IP header information of the first data packet and the first backhaul RLC channel of the egress link of the first IAB node to the first IAB node.

Optionally, the obtaining unit 1601 is further configured to obtain a second backhaul RLC channel of an ingress link of the first IAB node and a first backhaul RLC channel of an egress link of the first IAB node. There is a correspondence between the second backhaul RLC channel of the ingress link of the first IAB node and the first backhaul RLC channel of the egress link of the first IAB node. Optionally, the sending unit 1602 is further configured to send the second backhaul RLC channel of the ingress link of the first IAB node and the first backhaul RLC channel of the egress link of the first IAB node to the first IAB node.

Optionally, the sending unit 1602 is further configured to send configuration information to an access IAB node, where the configuration information indicates to use a BAP address of the first IAB node as a destination BAP address of an uplink data packet.

Optionally, the first network segment includes the first IAB node and a downstream node of the first IAB node, and the second network segment includes the first IAB node and an upstream node of the first IAB node. The obtaining unit 1601 is further configured to obtain a third correspondence and a fourth correspondence. The third correspondence is a correspondence between an IP address of a distributed unit DU in the first IAB node and a BAP address of a mobile terminal MT in the first IAB node, and the fourth correspondence is a correspondence between the BAP address of the MT in the first IAB node and an IP address of a DU in the downstream node of the first IAB node. The sending unit 1602 is further configured to send the third correspondence and the fourth correspondence to the second donor node, where the third correspondence and the fourth correspondence are used by the second donor node to determine the first BAP routing identity.

Optionally, the first network segment includes the first IAB node and the downstream node of the first IAB node, and the second network segment includes the first IAB node and the upstream node of the first IAB node.

Optionally, the communication apparatus further includes:

a determining unit 1603, configured to determine a third BAP routing identity used for downlink transmission of the data packet in the first network segment, where the second BAP routing identity includes the third BAP routing identity; and a receiving unit 1604, configured to receive a fourth BAP routing identity sent by the second donor node, where the fourth BAP routing identity is used for uplink transmission of the data packet in the second network segment, and the second BAP routing identity includes the fourth BAP routing identity.

Optionally, the sending unit 1602 is further configured to send the third BAP routing identity to the second donor node.

Optionally, the first network segment includes the first IAB node and the downstream node of the first IAB node, and the second network segment includes the first IAB node and the upstream node of the first IAB node.

In this embodiment, operations performed by units in the communication apparatus are similar to operations performed by the donor node in the embodiments shown in FIG. 11 (for example, operations performed by the CU 2) and FIG. 12 (for example, operations performed by the CU 1). Details are not described herein again.

In this embodiment, in a scenario in which the IAB network is managed by a plurality of IAB donor nodes, a first correspondence is sent by the sending unit 1602 to the first IAB node, so that the data packet can be normally transmitted in the second network segment. This avoids or minimizes abnormal data packet transmission because the IAB network is managed by the plurality of IAB donor nodes, and ensures that a data packet can be correctly routed in the IAB network obtained through stitching network segments managed by the plurality of different donor nodes.

Figure 17:
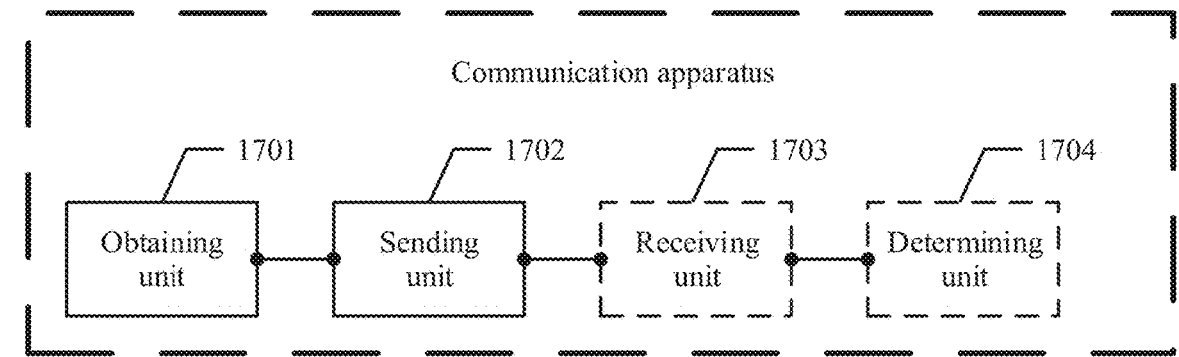

FIG. 17 shows another embodiment of a communication apparatus according to an embodiment of this application. The communication apparatus may be a second donor node or a component (for example, a CU, a DU, a processor, a chip, or a chip system) of the second donor node. The communication apparatus is used in an integrated access and backhaul IAB network, the IAB network includes a first network segment and a second network segment, the first network segment is managed by a first donor node, the second network segment is managed by a second donor node, the first donor node is different from the second donor node, and the communication apparatus includes:

an obtaining unit 1701, used by the second donor node to obtain a first BAP routing identity and a second BAP routing identity, where there is a correspondence between the first BAP routing identity and the second BAP routing identity, the first BAP routing identity is used for transmission of a data packet in the first network segment, and the second BAP routing identity is used for transmission of the data packet in the second network segment; and a sending unit 1702, used by the second donor node to send the first BAP routing identity and the second BAP routing identity to a first IAB node, where the first IAB node is located in the first network segment and the second network segment; or an obtaining unit 1701, used by the second donor node to obtain IP header information and a second BAP routing identity of a data packet, where there is a correspondence between the IP header information and the second BAP routing identity of the data packet, and the second BAP routing identity is used for transmission of the data packet in the second network segment; and a sending unit 1702, configured to send the IP header information and the second BAP routing identity of the data packet to a first IAB node, where the first IAB node is located in the first network segment and the second network segment.

Optionally, the obtaining unit 1701 is further configured to obtain the first BAP routing identity and a first backhaul RLC channel of an egress link of the first IAB node. There is a correspondence between the first BAP routing identity and the first backhaul RLC channel of the egress link of the first IAB node. The sending unit 1702 is further configured to send the first BAP routing identity and the first backhaul RLC channel of the egress link of the first IAB node to the first IAB node.

Optionally, the obtaining unit 1701 is further configured to obtain the second BAP routing identity and a first backhaul RLC channel of an egress link of the first IAB node. There is a correspondence between the second BAP routing identity and the first backhaul RLC channel of the egress link of the first IAB node. The sending unit 1702 is further configured to send the second BAP routing identity and the first backhaul RLC channel of the egress link of the first IAB node to the first IAB node.

Optionally, the obtaining unit 1701 is further configured to obtain IP header information of a first data packet and a first backhaul RLC channel of an egress link of the first IAB node. There is a correspondence between the IP header information of the first data packet and the first backhaul RLC channel of the egress link of the first IAB node. The sending unit 1702 is further configured to send the IP header information of the first data packet and the first backhaul RLC channel of the egress link of the first IAB node to the first IAB node.

Optionally, the obtaining unit 1701 is further configured to obtain a second backhaul RLC channel of an ingress link of the first IAB node and a first backhaul RLC channel of an egress link of the first IAB node. There is a correspondence between the second backhaul RLC channel of the ingress link of the first IAB node and the first backhaul RLC channel of the egress link of the first IAB node. The sending unit 1702 is further configured to send the second backhaul RLC channel of the ingress link of the first IAB node and the first backhaul RLC channel of the egress link of the first IAB node to the first IAB node.

Optionally, the sending unit 1702 is further configured to send configuration information to an access IAB node, where the configuration information indicates to use a BAP address of the first IAB node as a destination BAP address of an uplink data packet.

Optionally, the first network segment includes the first IAB node and the downstream node of the first IAB node, and the second network segment includes the first IAB node and the upstream node of the first IAB node.

Optionally, the communication apparatus further includes:

a receiving unit 1703, configured to receive a third correspondence and a fourth correspondence that are sent by the first donor node, where the third correspondence is a correspondence between an IP address of a distributed unit DU in the first IAB node and a BAP address of a mobile terminal MT in the first IAB node, and the fourth correspondence is a correspondence between the BAP address of the MT in the first IAB node and an IP address of a DU in the downstream node of the first IAB node; and a determining unit 1704, configured to determine the first BAP routing identity according to the third correspondence and the fourth correspondence.

Optionally, the first network segment includes the first IAB node and the downstream node of the first IAB node, and the second network segment includes the first IAB node and the upstream node of the first IAB node. The receiving unit 1703 is further configured to receive a third BAP routing identity sent by the first donor node, where the third BAP routing identity is used for downlink transmission of the data packet in the first network segment, and the second BAP routing identity includes the third BAP routing identity.

Optionally, the first network segment includes the first IAB node and the downstream node of the first IAB node, and the second network segment includes the first IAB node and the upstream node of the first IAB node. The determining unit 1704 is further configured to determine a fourth BAP routing identity used for uplink transmission of the data packet in the second network segment, where the second BAP routing identity includes the fourth BAP routing identity.

Optionally, the sending unit 1702 is further configured to send the fourth BAP routing identity to the first donor node.

In this embodiment, operations performed by units in the communication apparatus are similar to operations performed by the donor node in the embodiments shown in FIG. 11 (for example, operations performed by the CU 1) and FIG. 12 (for example, operations performed by the CU 2). Details are not described herein again.

In this embodiment, in a scenario in which the IAB network is managed by a plurality of IAB donor nodes, a first correspondence is sent by the sending unit 1702 to the first IAB node, so that the data packet can be normally transmitted in the second network segment. This avoids or minimizes abnormal data packet transmission because the IAB network is managed by the plurality of IAB donor nodes, and ensures that a data packet can be correctly routed in the IAB network obtained through stitching network segments managed by the plurality of different donor nodes.

Figure 18:
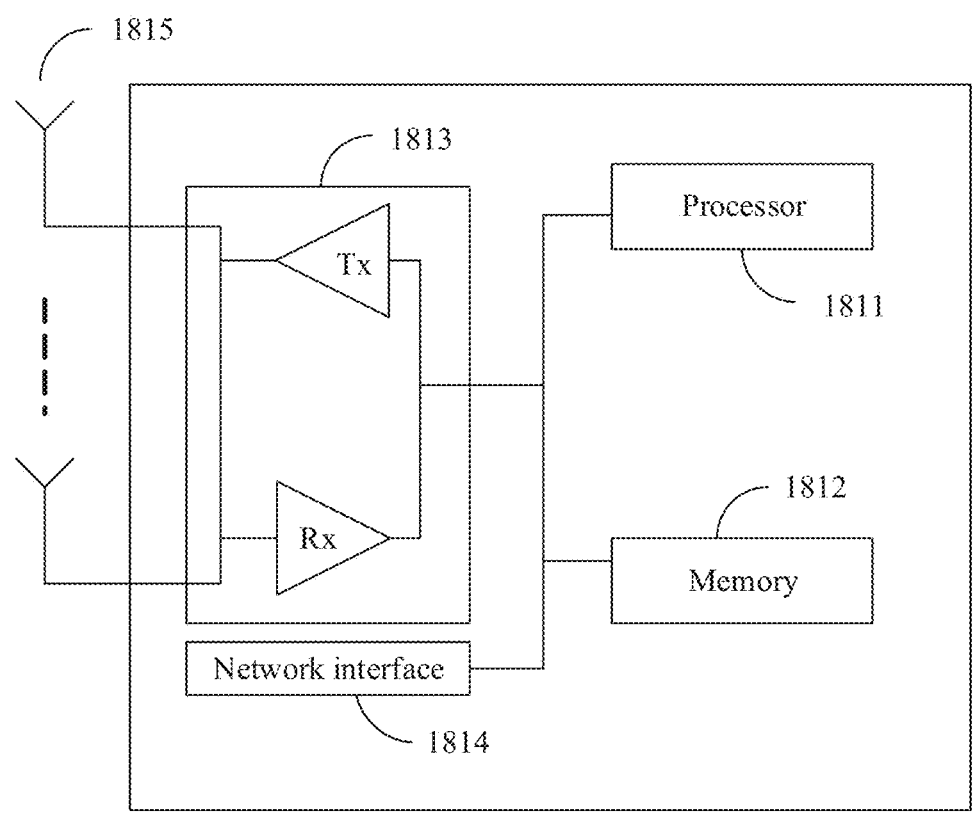

FIG. 18 is a schematic diagram of a structure of a communication apparatus according to an embodiment of this application. The communication apparatus may specifically be the IAB node in the foregoing embodiments, for example, the first IAB node, the parent node of the first IAB node, the child node of the first IAB node, the IAB 1, the IAB 2, the IAB 3, or the IAB 4. For the structure of the communication apparatus, refer to the structure shown in FIG. 18.

The communication apparatus includes at least one processor 1811, at least one memory 1812, at least one transceiver 1813, at least one network interface 1814, and one or more antennas 1815. The processor 1811, the memory 1812, the transceiver 1813, and the network interface 1814 are connected, for example, by using a bus. In this embodiment of this application, connection may include various interfaces, transmission lines, buses, or the like. This is not limited in this embodiment. The antenna 1815 is connected to the transceiver 1813. The network interface 1814 is configured to enable the communication apparatus to connect to another communication device over a communication link. For example, the network interface 1814 may include a network interface, for example, an S1 interface, between the communication apparatus and a core network device. The network interface may include a network interface, for example, an X2 or an Xn interface, between the communication apparatus and another network device (for example, another access network device or a core network device).

The processor 1811 is mainly configured to: process a communication protocol and communication data, control the entire communication apparatus, execute a software program, and process data of the software program, for example, configured to support the communication apparatus in performing actions described in the embodiments. The communication apparatus may include a baseband processor and a central processing unit. The baseband processor is mainly configured to process the communication protocol and the communication data. The central processing unit is mainly configured to: control the entire terminal device, execute the software program, and process the data of the software program. The processor 1811 in FIG. 18 may integrate functions of the baseband processor and the central processing unit. A person skilled in the art may understand that the baseband processor and the central processing unit may be separate processors, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

The memory is mainly configured to store the software program and the data. The memory 1812 may exist independently, and be connected to the processor 1811. Optionally, the memory 1812 and the processor 1811 may alternatively be integrated, for example, integrated in a chip. The memory 1812 can store program code for executing the technical solutions in embodiments of this application, and execution of the program code is controlled by the processor 1811. Various types of executed computer program code may also be considered as a driver of the processor 1811.

FIG. 18 shows only one memory and one processor. In an actual communication apparatus, there may be a plurality of processors and a plurality of memories. The memory may also be referred to as a storage medium, a storage device, or the like. The memory may be a storage element, namely, an on-chip storage element or an independent storage element, located on a same chip as the processor. This is not limited in this embodiment of this application.

The transceiver 1813 may be configured to support receiving or sending of a radio frequency signal between the communication apparatus and another IAB node (for example, UE, an IAB node, or an IAB donor). The transceiver 1813 may be connected to the antenna 1815. The transceiver 1813 includes a transmitter Tx and a receiver Rx. Specifically, one or more antennas 1815 may receive a radio frequency signal. The receiver Rx of the transceiver 1813 is configured to: receive the radio frequency signal from the antenna, convert the radio frequency signal into a digital baseband signal or a digital intermediate frequency signal, and provide the digital baseband signal or the digital intermediate frequency signal to the processor 1811, so that the processor 1811 performs further processing, for example, demodulation processing and decoding processing, on the digital baseband signal or the digital intermediate frequency signal. In addition, the transmitter Tx of the transceiver 1813 is further configured to: receive a modulated digital baseband signal or digital intermediate frequency signal from the processor 1811, convert the modulated digital baseband signal or digital intermediate frequency signal into a radio frequency signal, and send the radio frequency signal by using the one or more antennas 1815. Specifically, the receiver Rx may selectively perform one or more levels of frequency down-mixing processing and analog-to-digital conversion processing on the radio frequency signal, to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal, to obtain the radio frequency signal. A sequence of the frequency up-mixing processing and the digital-to-analog conversion processing is adjustable. The digital baseband signal and the digital intermediate frequency signal may be collectively referred to as a digital signal.

The transceiver may also be referred to as a transceiver unit, a transceiver machine, a transceiver apparatus, or the like. Optionally, a component that is in the transceiver unit and that is configured to implement a receiving function may be considered as a receiving unit, and a component that is in the transceiver unit and that is configured to implement a sending function may be considered as a sending unit. In other words, the transceiver unit includes the receiving unit and the sending unit. The receiving unit may also be referred to as a receiving machine, an input port, a receiver circuit, or the like. The sending unit may be referred to as a transmitting machine, a transmitter, a transmitter circuit, or the like.

It should be noted that the communication apparatus shown in FIG. 18 may specifically be configured to implement steps implemented by the IAB node in the method embodiments corresponding to FIG. 11 and FIG. 12, and implement technical effects corresponding to the communication apparatus. For a specific implementation of the communication apparatus shown in FIG. 18, refer to descriptions in the method embodiments corresponding to FIG. 11 and FIG. 12. Details are not described one by one herein again.

Figure 19:
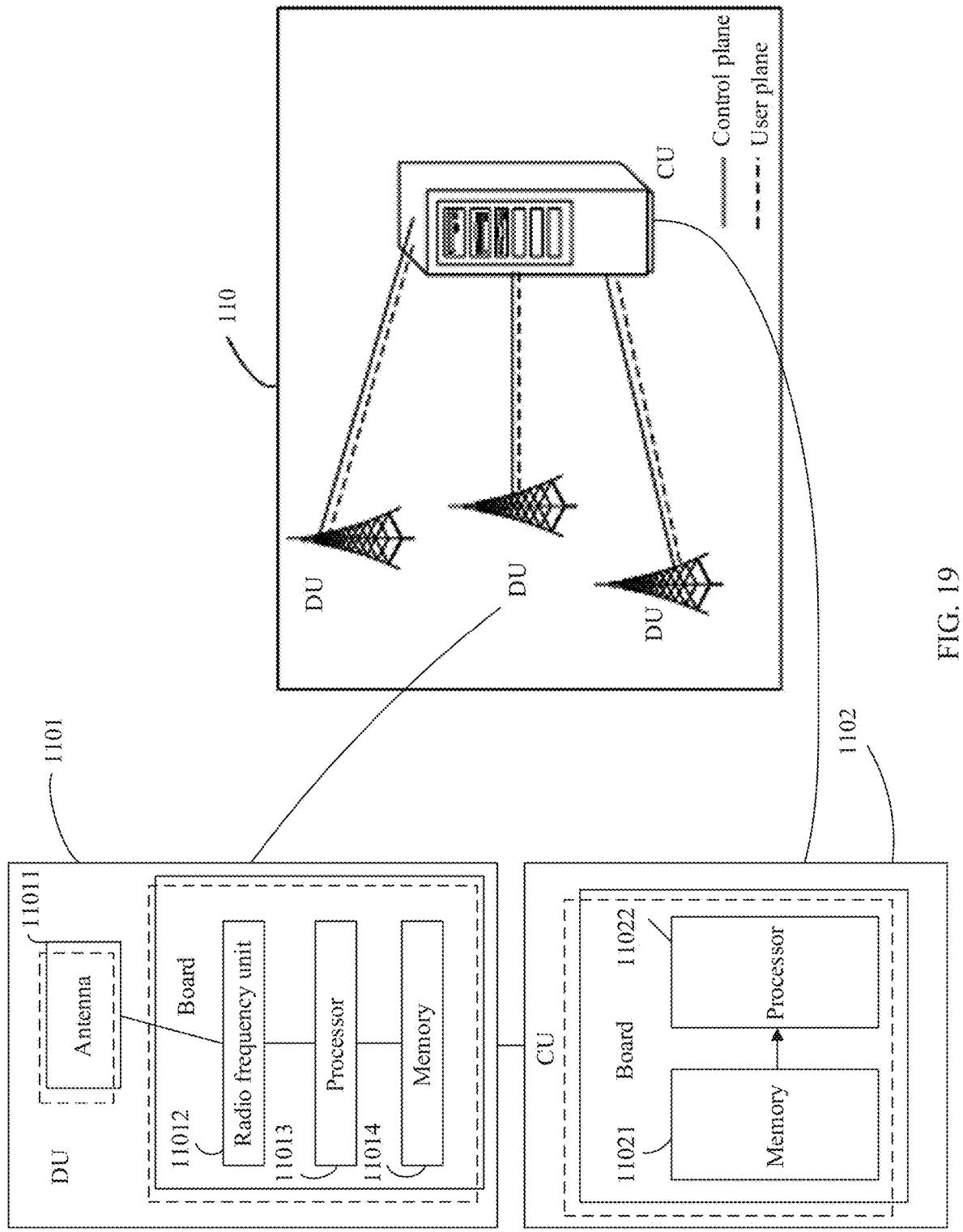

FIG. 19 is a schematic diagram of a structure of an IAB donor according to an embodiment of this application. The IAB donor may be in a CU-DU separation architecture. As shown in FIG. 19, the IAB donor may be used in the systems shown in FIG. 6 to FIG. 10, to implement a function of the first donor node or the second donor node in the foregoing method embodiments.

The IAB donor may include one or more DUs 1101 and one or more CUs 1102. The DU 1101 may include at least one antenna 11011, at least one radio frequency unit 11012, at least one processor 11013, and at least one memory 11014. The DU 1101 part is mainly configured to: send and receive a radio frequency signal, perform conversion between a radio frequency signal and a baseband signal, and perform partial baseband processing. The CU 1102 may include at least one processor 11022 and at least one memory 11021. The CU 1102 may communicate with the DU 1101 through an interface. A control plane (control plane) interface may be an F1-C, and a user plane (user Plane) interface may be an F1-U.

The CU 1102 is mainly configured to: perform baseband processing, control a base station, and the like. The DU 1101 and the CU 1102 may be physically disposed together, or may be physically separated, that is, in a distributed base station. The CU 1102 is a control center of the base station, may also be referred to as a processing unit, and is mainly configured to implement a baseband processing function. For example, the CU 1102 may be configured to control the base station to execute an operation procedure related to the network device in the foregoing method embodiments.

Specifically, baseband processing on the CU and the DU may be divided based on a protocol layer of a wireless network. For details, refer to the foregoing content.

In an example, the CU 1102 may include one or more boards, and the plurality of boards may jointly support a radio access network (for example, a 5G network) of a single access standard, or may separately support radio access networks (for example, an LTE network, a 5G network, or another access network) of different access standards. The memory 11021 and the processor 11022 may serve one or more boards. In other words, the memory and the processor may be separately disposed on each board. Alternatively, a plurality of boards may share a same memory and a same processor. In addition, a necessary circuit may further be disposed on each board. The DU 1101 may include one or more boards, and a plurality of boards may jointly support a radio access network (for example, a 5G network) of a single access standard, or may separately support radio access networks (for example, an LTE network, a 5G network, or another access network) of different access standards. The memory 11014 and the processor 11013 may serve one or more boards. In other words, the memory and the processor may be separately disposed on each board. Alternatively, a plurality of boards may share a same memory and a same processor. In addition, a necessary circuit may further be disposed on each board.

Optionally, the CU 1102 may perform transmission with a child node of the IAB donor by using the DU 1101, and the CU 1102 may be connected to another IAB donor through an interface. The CU 1102 may receive data and/or a message from another IAB donor (for example, a CU of another IAB donor) through the interface, or the CU 1102 may send data and/or a message to the another IAB donor through the interface.

An embodiment of this application further provides a computer-readable storage medium storing one or more computer-executable instructions. When executing the computer-executable instructions, a processor performs the method, for example, the method implemented by the IAB donor, the target parent node of the first IAB node, the first IAB node, or the child node of the first IAB node, implemented by the communication apparatus.

An embodiment of this application further provides a computer program product (which is also referred to as a computer program) storing one or more computer instructions. When executing the computer program product, a processor performs the method, for example, the method implemented by the IAB donor, the target parent node of the first IAB node, the first IAB node, or the child node of the first IAB node, implemented by the communication apparatus.

An embodiment of this application further provides a chip system. The chip system includes a processor, configured to support a communication apparatus in implementing the method, for example, the method implemented by the IAB donor or the IAB node, implemented by the communication apparatus. In a possible design, the chip system may further include a memory. The memory is configured to store program instructions and data that are necessary for the communication apparatus. The chip system may include a chip, or may include a chip and another discrete device.

An embodiment of this application further provides a communication system. The communication system includes the communication apparatus, for example, the IAB donor, the first IAB node, the parent node of the first IAB node, and/or the child node of the first IAB node.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a

What is claimed is:

1. An apparatus, wherein the apparatus is an integrated access and backhaul (IAB) node or is included in the IAB node, and wherein the apparatus comprises:
at least one processor and at least one memory coupled to the at least one processor, the at least one memory storing programming instructions for execution by the at least one processor to cause the apparatus to perform operations comprising:
receiving a first data packet in a first network segment, wherein the first data packet comprises a first backhaul adaptation protocol (BAP) routing identity, the first BAP routing identity is used for transmission of the first data packet in the first network segment, and the first BAP routing identity comprises at least one of a first BAP address or a first path identity;
obtaining a first correspondence;
in response to determining that the first correspondence comprises the first BAP routing identity in the first data packet, determining that the first data packet meets a preset condition;
replacing, in response to determining that the first data packet meets the preset condition, the first BAP routing identity in the first data packet with a second BAP routing identity according to the first correspondence, to obtain a second data packet, wherein the second BAP routing identity comprises at least one of a second BAP address or a second path identity; and
sending the second data packet to a next-hop node in a second network segment, wherein the next-hop node is a parent node or a child node of the IAB node, and wherein the first network segment is managed by a first donor node and the second network segment is managed by a second donor node.

2. The apparatus according to claim 1, wherein the first correspondence further comprises identifier related to the second network segment, wherein the identity corresponds to the second BAP routing identity.

3. The apparatus according to claim 1, wherein:
the first network segment comprises the IAB node and an upstream node of the IAB node, and the second network segment comprises the IAB node and a downstream node of the IAB node;
the receiving a first data packet in the first network segment comprises:
receiving the first data packet sent by the upstream node in the first network segment; and
the sending the second data packet to a next-hop node in the second network segment comprises:
sending the second data packet to the downstream node in the second network segment, wherein a BAP address of the second BAP routing identity is a BAP address of the downstream node.

4. The apparatus according to claim 1, wherein:
the first network segment comprises the IAB node and a downstream node of the IAB node, and the second network segment comprises the IAB node and an upstream node of the IAB node;
the receiving a first data packet in the first network segment comprises:
receiving the first data packet sent by the downstream node in the first network segment; and
the sending the second data packet to a next-hop node in the second network segment comprises:
sending the second data packet to the upstream node in the second network segment, wherein a BAP address of the second BAP routing identity is a BAP address of the second donor node.

5. The apparatus according to claim 1, wherein:
the first correspondence is configured by the first donor node or the second donor node; and
the obtaining a first correspondence comprises:
obtaining the first BAP routing identity and the second BAP routing identity, wherein there is a correspondence between the first BAP routing identity and the second BAP routing identity.

6. The apparatus according to claim 1, wherein the operations further comprise:
obtaining a second correspondence; and
determining, according to the second correspondence, to send the second data packet to the next-hop node in the second network segment over a first backhaul radio link control (RLC) channel of an egress link;
wherein the obtaining a second correspondence comprises at least one of the following:
obtaining the first BAP routing identity and the first backhaul RLC channel of the egress link of the IAB node, wherein there is a correspondence between the first BAP routing identity and the first backhaul RLC channel of the egress link of the IAB node;
obtaining the second BAP routing identity and the first backhaul RLC channel of the egress link of the IAB node, wherein there is a correspondence between the second BAP routing identity and the first backhaul RLC channel of the egress link of the IAB node;
obtaining internet protocol (IP) header information of the first data packet and the first backhaul RLC channel of the egress link of the IAB node, wherein there is a correspondence between the IP header information of the first data packet and the first backhaul RLC channel of the egress link of the IAB node, and the IP header information comprises at least one of a target IP address, a differentiated services code point (DSCP), and a flow label; or
obtaining a second backhaul RLC channel of an ingress link of the IAB node and the first backhaul RLC channel of the egress link of the IAB node, wherein there is a correspondence between the second backhaul RLC channel of the ingress link of the IAB node and the first backhaul RLC channel of the egress link of the IAB node.

7. An apparatus, wherein the apparatus is a first donor node, a second donor node, included in the first donor node, or included in the second donor node, and wherein the apparatus comprises at least one processor and at least one memory coupled to the at least one processor, the at least one memory storing programming instructions for execution by the at least one processor to cause the apparatus to perform operations comprising:
obtaining a first backhaul adaptation protocol (BAP) routing identity and a second BAP routing identity, wherein there is a correspondence between the first BAP routing identity and the second BAP routing identity, the first BAP routing identity is used for transmission of a data packet in a first network segment and comprises at least one of a first BAP address or a first path identity, and the second BAP routing identity is used for transmission of the data packet in a second network segment and comprises at least one of a second BAP address or a second path identity; and sending a first correspondence to a IAB node, wherein the first correspondence comprises the first BAP routing identity, the second BAP routing identity and identifier related to the second network segment, wherein the identity corresponds to the second BAP routing identity, wherein the IAB node is located in the first network segment and the second network segment.

8. The apparatus according to claim 7, wherein the operations further comprise:

obtaining the first BAP routing identity and a first backhaul RLC channel of an egress link of the IAB node, wherein there is a correspondence between the first BAP routing identity and the first backhaul RLC channel of the egress link of the IAB node, and sending the first BAP routing identity and the first backhaul RLC channel of the egress link of the IAB node to the IAB node; or obtaining the second BAP routing identity and a first backhaul RLC channel of an egress link of the IAB node, wherein there is a correspondence between the second BAP routing identity and the first backhaul RLC channel of the egress link of the IAB node, and sending the second BAP routing identity and the first backhaul RLC channel of the egress link of the IAB node to the IAB node; or obtaining IP header information of a first data packet and a first backhaul RLC channel of an egress link of the IAB node, wherein there is a correspondence between the IP header information of the first data packet and the first backhaul RLC channel of the egress link of the IAB node, and sending the IP header information of the first data packet and the first backhaul RLC channel of the egress link of the IAB node to the IAB node; or obtaining a second backhaul RLC channel of an ingress link of the IAB node and a first backhaul RLC channel of an egress link of the IAB node, wherein there is a correspondence between the second backhaul RLC channel of the ingress link of the IAB node and the first backhaul RLC channel of the egress link of the IAB node and sending the second backhaul RLC channel of the ingress link of the IAB node and the first backhaul RLC channel of the egress link of the IAB node to the IAB node.

9. The apparatus according to claim 7, wherein the operations further comprise:

sending, by the first donor node, configuration information to an access IAB node, wherein the configuration information indicates to use a BAP address of the IAB node as a destination BAP address of an uplink data packet.

10. A system, wherein the system comprises at least one processor and at least one memory coupled to the at least one processor, wherein the at least one memory stores programming instructions for execution by the at least one processor of to cause the system to perform operations comprising:

receiving, by an integrated access and backhaul (IAB) node of the system, a first data packet in a first network segment, wherein the first data packet comprises a first backhaul adaptation protocol (BAP) routing identity, the first BAP routing identity is used for transmission of the first data packet in the first network segment, and the first BAP routing identity comprises at least one of a first BAP address or a first path identity;

obtaining, by the IAB node, a first correspondence;

in response to determining that the first correspondence comprises the first BAP routing identity in the first data packet, determining, by the IAB node, that the first data packet meets a preset condition;

replacing, by the IAB node, in response to that the first data packet meets the preset condition, the first BAP routing identity in the first data packet with a second BAP routing identity according to the first correspondence, to obtain a second data packet, wherein the second BAP routing identity comprises at least one of a second BAP address or a second path identity;

sending, by the IAB node, the second data packet to a next-hop node in a second network segment, wherein the next-hop node is a parent node or a child node of the IAB node, wherein the first network segment is managed by a first donor node of the system and the second network segment is managed by a second donor node of the system; and sending, by the first donor node or the second donor node, the first correspondence to the IAB node.

11. The system according to claim 10, wherein the first correspondence further comprises the second BAP routing identity.

12. The system according to claim 11, wherein the first correspondence further comprises identifier related to the second network segment, wherein the identity corresponds to the second BAP routing identity.

13. The system according to claim 10, wherein:

the first network segment comprises the IAB node and an upstream node of the IAB node, and the second network segment comprises the IAB node and a downstream node of the IAB node; and wherein the operations further comprise:

receiving, by the IAB node, the first data packet sent by the upstream node in the first network segment; and sending, by the IAB node, the second data packet to the downstream node in the second network segment, wherein a BAP address of the second BAP routing identity is a BAP address of the downstream node.

14. The system according to claim 10, wherein:

the first network segment comprises the IAB node and a downstream node of the IAB node, and the second network segment comprises the IAB node and an upstream node of the IAB node; and wherein the operations further comprise:

receiving, by the IAB node, the first data packet sent by the downstream node in the first network segment; and sending, by the IAB node, the second data packet to the upstream node in the second network segment, wherein a BAP address of the second BAP routing identity is a BAP address of the second donor node.

15. The system according to claim 10, wherein the operations further comprise:

obtaining, by the IAB node, the first BAP routing identity and the second BAP routing identity, wherein there is a correspondence between the first BAP routing identity and the second BAP routing identity.

16. The system according to claim 10, wherein the operations further comprise:

obtaining, by the IAB node, a second correspondence; and determining, by the IAB node, according to the second correspondence, to send the second data packet to the next-hop node in the second network segment over a first backhaul radio link control (RLC) channel of an egress link.

17. The system according to claim 16, wherein the operations further comprise at least one of:

obtaining, by the IAB node, the first BAP routing identity and the first backhaul RLC channel of the egress link of the IAB node, wherein there is a correspondence between the first BAP routing identity and the first backhaul RLC channel of the egress link of the IAB node;

obtaining, by the IAB node, the second BAP routing identity and the first backhaul RLC channel of the egress link of the IAB node, wherein there is a correspondence between the second BAP routing identity and the first backhaul RLC channel of the egress link of the IAB node;

obtaining, by the IAB node, internet protocol (IP) header information of the first data packet and the first backhaul RLC channel of the egress link of the IAB node, wherein there is a correspondence between the IP header information of the first data packet and the first backhaul RLC channel of the egress link of the IAB node, and the IP header information comprises at least one of a target IP address, a differentiated services code point DSCP, and a flow label; or obtaining, by the IAB node, a second backhaul RLC channel of an ingress link of the IAB node and the first backhaul RLC channel of the egress link of the IAB node, wherein there is a correspondence between the second backhaul RLC channel of the ingress link of the IAB node and the first backhaul RLC channel of the egress link of the IAB node.

18. The system according to claim 10, wherein the operations further comprise:

obtaining, by the first donor node or the second donor node, a first BAP routing identity and a second BAP routing identity, wherein there is a correspondence between the first BAP routing identity and the second BAP routing identity, the first BAP routing identity is used for transmission of a data packet in the first network segment, and the second BAP routing identity is used for transmission of the data packet in the second network segment.

* * * * *